United States Patent [19]

David

[11] Patent Number: 4,747,269

[45] Date of Patent: May 31, 1988

[54] VARIABLE SPEED POWER-TRANSMITTING SYSTEM

[76] Inventor: Constant V. David, 4952 Field St., San Diego, Calif. 92110

[21] Appl. No.: 929,096

[22] Filed: Nov. 10, 1986

[51] Int. Cl.⁴ ............................................. F15B 15/18
[52] U.S. Cl. ...................................... 60/445; 60/489; 60/490
[58] Field of Search .......................... 60/489, 490, 445

[56] References Cited

U.S. PATENT DOCUMENTS 4,244,279  1/1981  Stewart et al. ................... 60/487 X
4,258,548  3/1981  Hall et al. .............................. 60/445

*Primary Examiner*—Gerald A. Michalsky

[57] ABSTRACT

A power-transmitting system provides conservation of (speed) X(torque) product between an input shaft and an output shaft. It represents the equivalent of the power being transmitted through the system. This power is transformed into the form of incompressible fluid flow at high pressure by a volumetric pump coupled to the input shaft. This fluid flow is forced at that pressure into a volumetric motor. The fluid then pushes on pistons which are constrained by a fixed enclined track. The pistons are laterally guided in a rotor and radially arranged therein. The enclined track forms a closed curved surface which surrounds these pistons and the resultant of the reactions of the track surface on the pistons results in a torque being exerted on the rotor. The structure supporting the track surface is slidable in a manner such that the piston strokes are adjustable between zero and a set maximum. For a given power level input, the torque developed by the output shaft and the speed thereof are controlled by adjusting the position of the slidable track with respect to the rotor location.

26 Claims, 4 Drawing Sheets

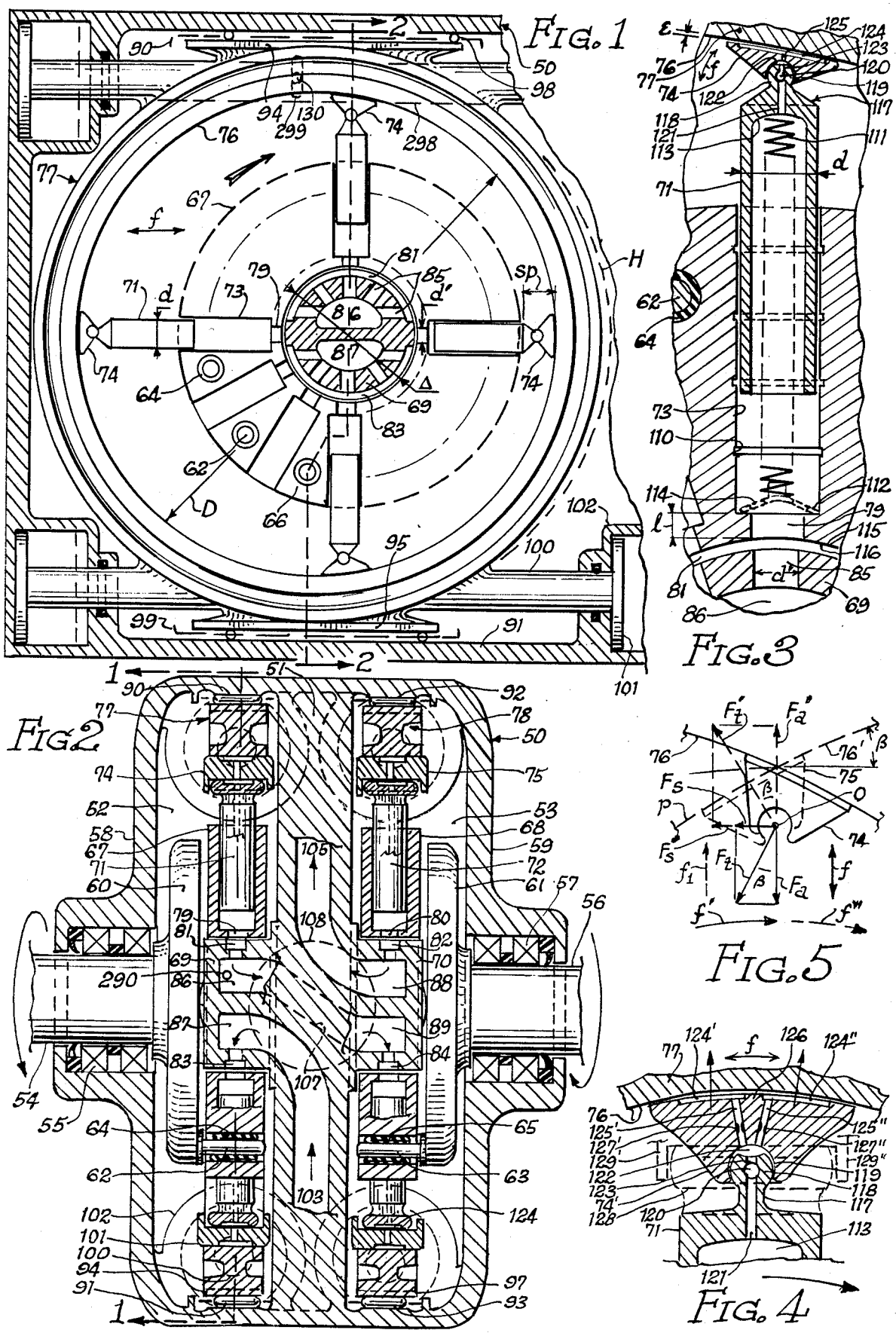

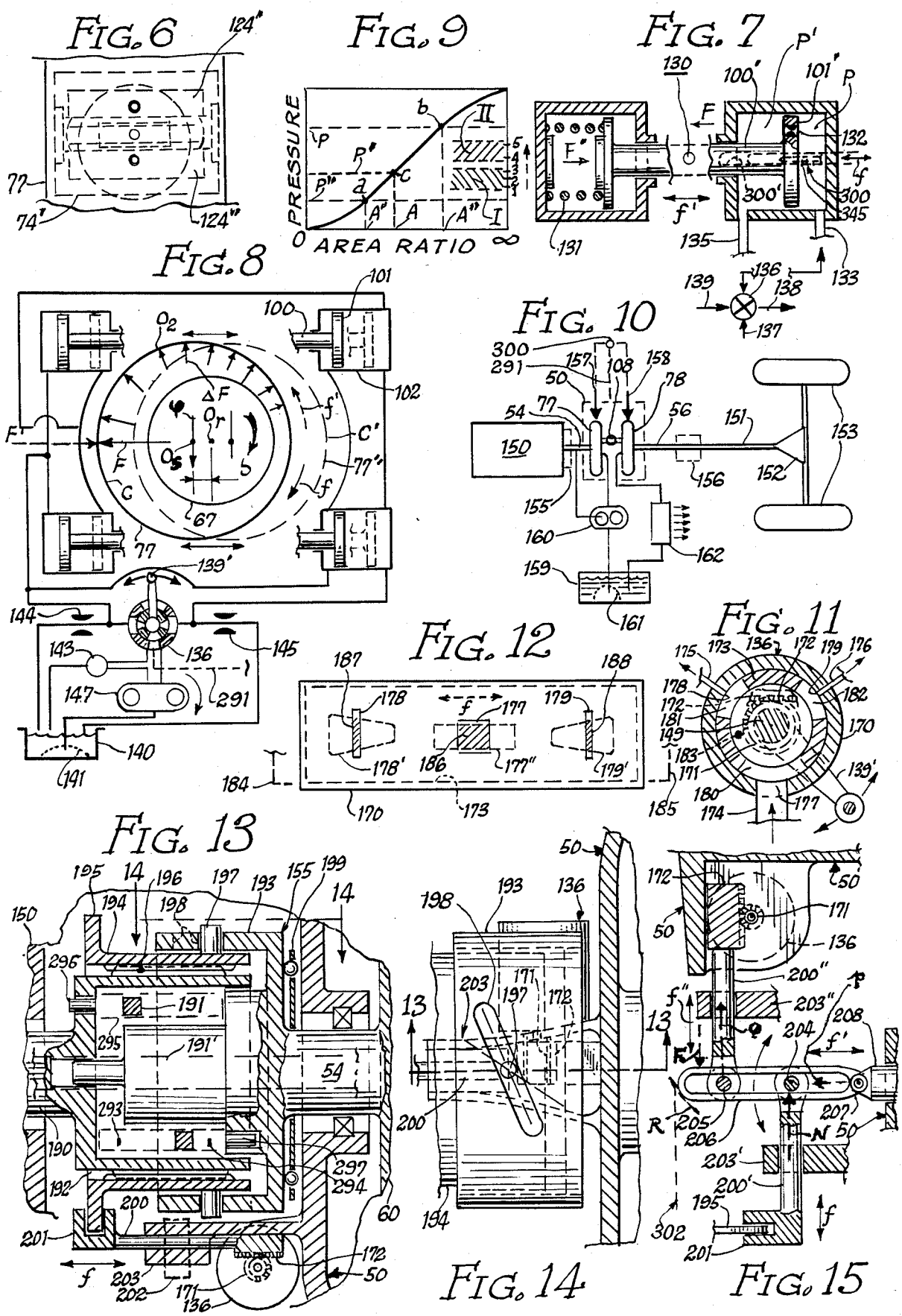

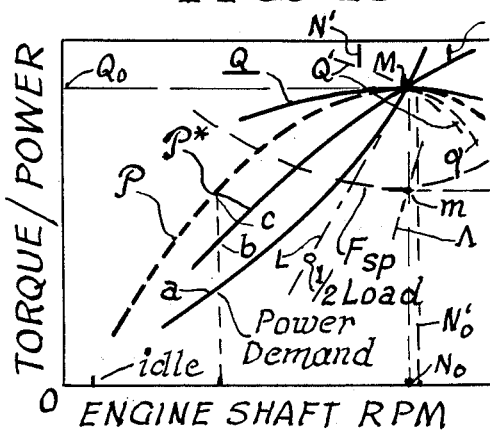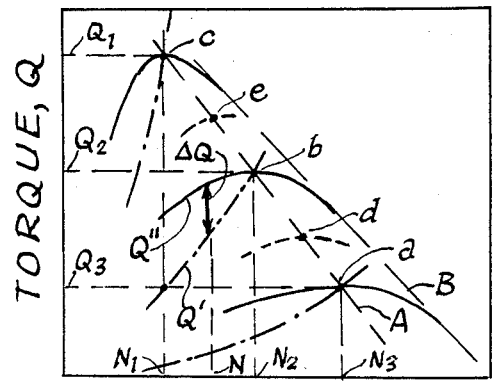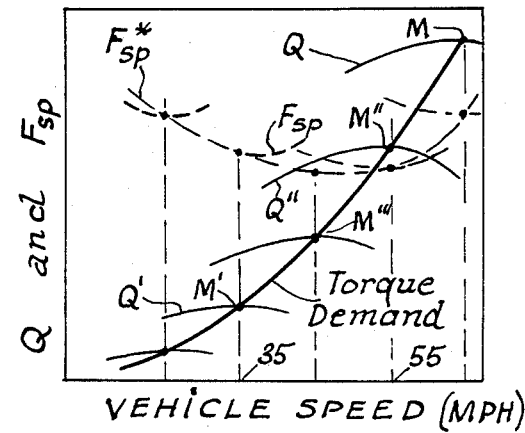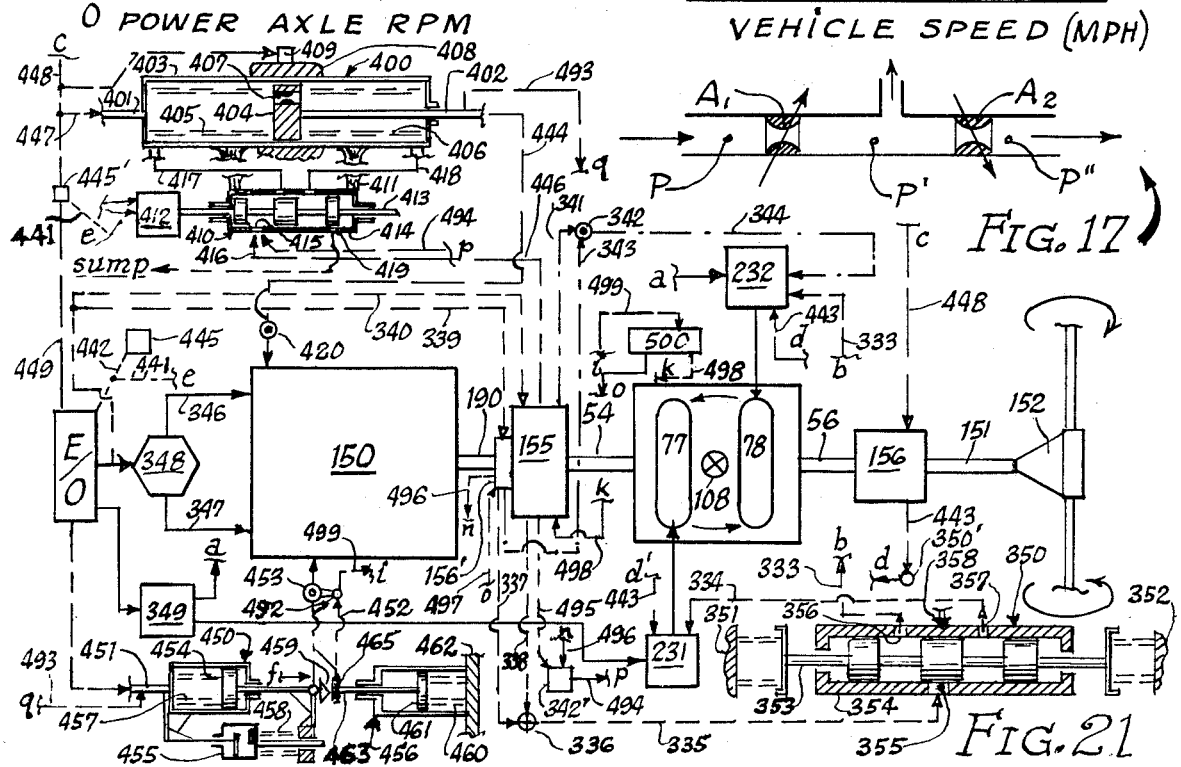

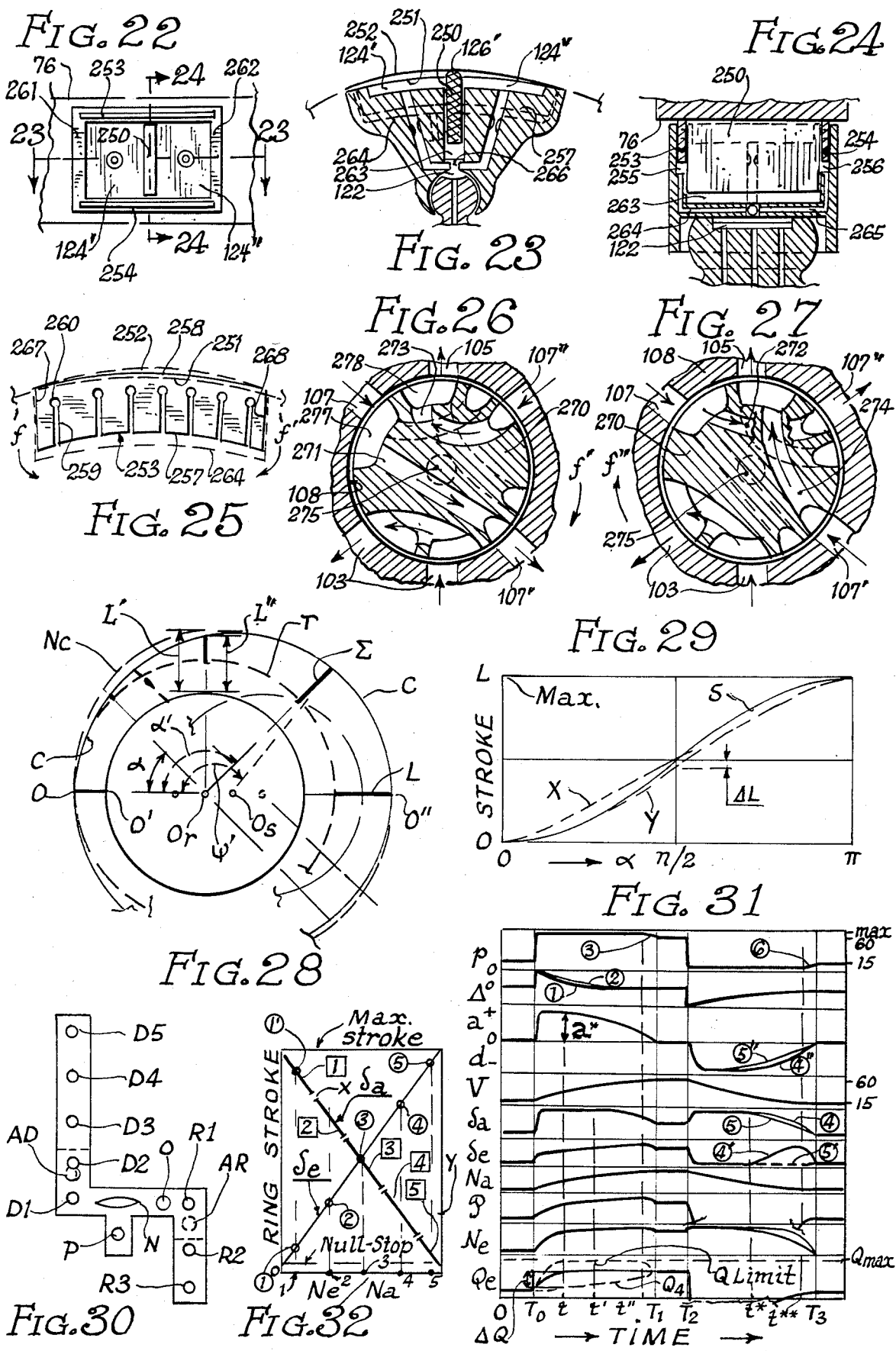

VARIABLE SPEED POWER-TRANSMITTING SYSTEM

BACKGROUND OF THE INVENTION

The present invention relates to a system for transmitting mechanical shaft power in a manner such that the product of the shaft angular speed by the torque transmitted is conserved between an input shaft and an output shaft, assuming that no energy loss occurs within the system. Such mechanisms are also referred to as automatic transmissions in the automobile industry and torque converters in industrial applications. The end results are similar: the ratio of the values of the torques transmitted by the input and output shafts varies as the direct inverse ratio of the angular velocities of said shafts. The power transfer is performed by means of the transformation of mechanical power into hydraulic power, i.e. volumetric flow of incompressible fluid under pressure, and then the process is reversed.

In automatic transmissions, the fluid hydrodynamic power appears in the form of fluid flow rates combined with associated fluid flow velocities. Slippate is inherent to these systems and is more pronounced at low shaft angular speeds. The system efficiency is poor at such regimes of operation. In hydraulic torque converters, the fluid flow velocity is replaced by its equivalence in the form of pressure. However, theoretically, slippage is preventable and the system efficiency is less dependent upon the operating regime of the system. Hydraulic torque converters are not used in the role of automatic transmission for various reasons: cost, ungainly arrangement and weight. The pump component may easily be and generally is separate from the motor component, which offers a flexibility of installation and adaptation to a specific construction.

Efforts are continuously being made to develop variable speed ratio "gearboxes" which provide a continuously adjustable "gear ratio" for application to automobiles. Thus it seems desirable to develop a gearless automatic transmission which takes advantage of the most attractive pertinent features of torque converters. Further, it is desirable to exploit those features which may easily be utilized for optimizing the vehicle operation.

In view of this background, the present invention provides those features, and combinations thereof, that are needed to substantially improve the propulsion of motorized land vehicles. It offers ways to improve fuel consumption and the matching of engine/vehicle characteristics automatically.

SUMMARY OF THE INVENTION

Accordingly, it is a primary object of the present invention to provide a new and improved system that transmits power from a mechanical power sources to a vehicle in a manner such that the torque and the angular speed of the axle propelling said vehicle can be adjusted in a continuously variable fashion for any level of the power generated by the source and transmitted to the axle.

It is another object of the present invention to provide a system that regulates the torque delivered by the power source so as to cause the power source to operate at peak efficiency at the power level required to propel the vehicle.

It is another object of the present invention to provide a system that regulates the angular speed of the power axle so as to cause the vehicle to move at a controlled constant speed.

It is another object of the present invention to provide a system which can perform the function of clutch and of angular speed inverter so as to provide identical capabilities for forward and backward motions of the vehicle.

It is another object of the present invention to provide a system which can be constructed so as to be easily adaptable to existing engine and vehicle constructions and configurations.

It is still another object of the present invention to provide a system that can be continuously automatically controlled by the combined actions of the engine power control system and of the power demand of the vehicle.

DESCRIPTION OF THE DRAWINGS

FIG. 1 is a midsectional elevation view of a rotor and piston assembly taken along section line 1—1 of FIG. 2.

FIG. 2 is a midsectional side view of the invention system taken along section line 2—2 of FIG. 1.

FIG. 3 is a partial midsectional elevation view of a piston shown installed in a rotor and restrained by a ring structure.

FIG. 4 is a partial enlarged sectional view of a piston end showing a self-stabilizing slip pad and articulation thereof.

FIG. 5 is a schematic diagram indicating the various forces acting on a slip pad and associated piston.

FIG. 6 is a schematic drawing of the slip pad of FIG. 4 viewed from the top through the right structure.

FIG. 7 is a diagrammatic illustration of an alternate actuating construction for positioning a ring structure.

FIG. 8 is a schematic diagram of one embodiment of the invention showing the actuating hydraulic system connections.

FIG. 9 is a graph showing how the pressure between two restricting orifices in series varies with the orifice area ratio.

FIG. 10 is a schematic drawing illustrating how the present invention system is arranged on a typical vehicle.

FIG. 11 is a diagrammatic sectional view of the master valve that monitors the positions of the structural rings.

FIG. 12 is a developed view of the registering of the master valve ports which forms the restricting orifices.

FIG. 13 is a midsectional elevation view of a torque regulating mechanism shown mounted on the input shaft.

FIG. 14 is a top view of the torque regulator of FIG. 13.

FIG. 15 is a diagrammatical view of a mechanism for adjusting the level of the torque to be regulated.

FIG. 16 is a midsectional view of an speed regulator shown mounted near the output shaft for sensing its rotational speed.

FIG. 17 is a schematic diagram illustrating the arrangement of two variable size restricting orifices mounted in series.

FIG. 18 is a graphic representation of the characteristics typifying the coupling of an engine with the vehicle it propels.

FIG. 19 is a graphic representation of torque vs rotational speed of the vehicle power axle.

FIG. 20 is a graphic representation of torque and specific fuel consumption as a function of vehicle speed.

FIG. 21 is a diagrammatic representation of the control system arrangement of the present invention system.

FIG. 22 is a planar top view of a conformable slip pad.

FIG. 23 is a view along section line 23-23 of FIG. 22.

FIG. 24 is a view along section line 24—24 of FIG. 22.

FIG. 25 is an elevation view of a conformable pad guard.

FIG. 26 is a sectional view of an inverter valve (forward).

FIG. 27 is a sectional view of an inverter valve (reverse).

FIG. 28 is a schematic diagram of a piston radial displacement during a revolution.

FIG. 29 is a graphic representation of piston travel as a function of piston angular displacement during its revolution.

FIG. 30 is a schematic representation of the operator's torque ratio adjustment control.

FIG. 31 is a graphic representation of various system operational parameter adjustments during transient conditions.

FIG. 32 is a graphic representation of "gear-ratios".

DETAILED DESCRIPTION OF THE INVENTION

Referring to FIGS. 1 and 2, an illustrated preferred embodiment of my invention system shows an outer body 50 which forms the system structure and houses the various system mechanisms. A structural wall 51 extends, in mid-plane, to the casing walls of outer body 50 and divides the casing internal volume in two substantially equal halves 52 and 53. An input shaft 54 is connected to a power source or engine (not shown) and supported by bearing 55. An output shaft 56 supported by bearing 57 transmits the engine power to a power axle (not shown) for propelling a vehicle. Bearings 55 and 57 and in turn supported by side walls 58 and 59. The mounting of outer body 50 casing on the engine is not shown, being state-of-the-art. Each shaft 54 (or 56) drives a coupling flange such as 60 (or 61). Each flange is equipped with a plurality of pins such as 62 (or 63) that engage inside compliant bushings such as 64 (or 65) located in holes such as 66 distributed around the axis of a rotor such as 67 (or 68). Each rotor is centered on and rotates around a trunnion such as 69 (or 70) that is affixed to wall 51. Trunnions 69 and 70 (and shafts 54 and 56) need not be located on the same axis, however a trunnion and its associated shaft must have a common axis.

Each rotor houses and guides a plurality of pistons such as 71 (or 72) distributed evenly around the rotor axis. The pistons in one rotor are identical; however, the number and size of the pistons in one rotor may differ from those of the pistons housed in the other rotor. Each piston fits snugly in a cylindrical cavity 73 substantially radially located in the rotor mid-plane. Each piston free end is equipped with an articulated slip pad 74 (or 75) which glides on a track surface such as 76 of structural ring 77 (or 78) so that the track surfaces may impose a limit on the piston strokes. Each piston cylinder may vent through holes such as 79 (or 80) which alternatively connect with collecting cavities such as 81 (or 82) and 83 (84) cut on the outer cylindrical surface of trunnion 69 (or 70). These cavities are connected by a plurality of holes such as 85 to internal ducts such as 86 and 87 (or 88 and 89) located inside the trunnions.

Structural rings 77 and 78 are guided by linear tracks 90 and 91 (or 92 and 93) located on the flat internal surfaces of outer body 50 casing by means of structural extensions such as 94 and 95 (or 96 and 97), and linear needle bearings such as 98 and 99. This arrangement provides the rings with only one degree of freedom, linearly transversally along the direction shown by double arrow f. Ring 77 (or 78) is connected to actuating rods such as 100 fastened to actuating pistons such as 101 sliding in cylinders such as 102 which cooperate with the pistons to form two oppositely located chambers filled with hydraulic fluid under pressure. These chambers are connected to ducting channels as is well known in the art, thus not shown here for the sake of simplicity.

The working fluid is introduced by means of channel 103 (or 104) and evacuated through channel 105 (or 106) located in wall 51. The ducting of high pressure fluid between internal ducts 86 (pump outlet) and 89 (motor inlet) is done internally through a duct such as 107. As is discussed in the next section, an hydraulic swich valve 108 (shown in phantom lines in FIG. 2) housed in wall 51 between trunnions 69 and 70 enables the fluid connections to be inverted for reversing the rotation direction of rotor 68 when the vehicle is put in reverse. Fluid-flow inverting valve 108 (AKA hydraulic switch valve) is actuated by means externally located and not shown in FIG. 2 for clarity sake, and has two positions which correspond to forward and reverse. The directions of the various arrows indicating flow directions in FIG. 2 correspond to a forward speed of the vehicle for instance. The connections of ducts 103 and 105 to the outside are omitted, such art being well known.

The drawing of FIG. 3 depicts piston 71 construction in details. Internal cylindrical wall 73 of the cavity housing a piston is grooved as shown typically by a plurality of narrow shallow grooves such as 110, intended to limit fluid by-pass leakage and to trap minute particles previously present in the fluid. A compression spring 111 is located inside hollow piston 71 and centered at the bottom of cylinder 73 by retainer 112 anchored above vent hole 79. Spring 111 pushes against the bottom 113 of piston 71 internal space. The spring pushing contributes, at low rotational speeds, to insuring that the piston free end always extends outwardly as far as ring 77 allows. Holes such as 114 in the retainer flange insure that fluid flow in and out of cylinder 73 is not hindered. Cylindrical surfaces 115 and 116 are very close and correspond respectively to the rotor central bore and the associated trunnion under matching surfaces.

Slip pad 74 is articulated on a protruding hinge-type structure 117 fixed onto piston 71 free end. The hinge incorporates a cylindrical male part 118 affixed onto structure 117 and which is retained by female cylindrical lodging 119. A blind duct 120 located along the axis of hinge 118 communicates with piston 71 internal space through hole 121. Hole 120 vents into chamfering space 122 through a plurality of small holes 123 located along the length of blind duct 120. Space 122 is connected to shallow cavity 124 by means of hole 125. The working fluid under pressure escapes out of shallow cavity 124 through the narrow gap ε that surrounds cavity 124 and which corresponds to the distance separating track surface 76 from the slip pad sliding surface. The sizes of holes 123 and 125 are such that the fluid pressure in space 122 is about half of the pressure existing in cavity 124 under "nominal" operating conditions. The area covered by cavity 124 on the pad surface is larger than piston 71 cross-sectional area. Slip pad 74 is free to oscillate along arrow f direction about hinge 118 axis by an amount corresponding to $2\epsilon$.

In the slip pad construction above, line contact between the pad sliding surface and track surface 76 cannot be avoided. In an alternate construction not shown, being state-of-the-art, cavity 124 is replaced by a star-shaped groove arrangement intended to create a hydrodynamic fluid wedge between the pad and the track surfaces. For that reason, it may be said that slip pad 74 glides on track 76. Another alternate slip pad construction is represented in FIGS. 4 and 6. Cavity 124 is divided in two halves 124' and 124" of equal size and separated by land 126. Each half cavity receives fluid through holes 125' and 125" which both contain a restricting orifice such as 127' and 127", respectively. This construction provides a self stabilizing effect as is later discussed in the following section. A profile of the articulation is outlined by phantom lines 128, for reference. Lateral motion of the slip pad is prevented by stops such as 129' and 129" which could be retaining or snap rings. It should be understood that, for either one of these three pad constructions, hydrodynamic isolation of the slip pad surface from track surface 76 can occur only when a fluid high pressure is generated inside pistons 71, which happens only during slightly less than half of each rotor revolution, for either rotor. The reader will readily acknowledge that large forces are created at the sliding interface only if and when high pressures push piston 71 against right 77. In other words, "lubrication" is provided automatically when it is most required. The hinge articulation itself is also lubricated when needed in a similar fashion and at the same critical times.

Because the slip pad sliding surfaces do not actually contact the track surface when under load and moving, those two surfaces and then separated by a mean nominal distance $\epsilon^*$ that is determined by the dimensions of pad surface, duct holes and/or restricting orifices. For this reason, an exact shape matching of these two surfaces is not mandatory. The implications and consequences thereof are discussed in the next section. The rings are prevented from moving laterally (perpendicularly to the plane of FIG. 1) and/or tilting about their transversal axis of symmetry (horizontal line passing through the ring center in the plane of FIG. 1) by their actuating rod/piston assemblies. FIG. 2 graphically indicates how the rotors are prevented from sliding along their axes of rotation (AKA longitudinal axes), which limits lateral displacements of the pistons, hence of the slip pads. To insure that cavity 124 is always fully covered by the track surface, either the pad surface width is made larger than the track width, e.g. case of FIG. 2 drawing, or the track width is made larger than the pad width, e.g. case of FIG. 6 schematic. The rotor/piston/pad assemblies are thus allowed only a very small lateral motion, but somehow are free to self-center between the outer surfaces of their associated trunnions and the track surfaces of their associated rings.

The force diagram shown in FIG. 5 indicates how a slip pad interacts with its track surface, in both cases of the pump (solid lines) and of the motor (phantom lines). Arrows $f_1$ and $f_2$ indicate the piston motion directions and arrows f' and f" indicate their respective rotor rotation directions. The forces shown applied at the center of the slip pad articulation correspond to the action of the ring on the pad (pump case) and of the pad on the ring (motor case). The interpretation and significance of the forces are discussed in the next section.

FIG. 7 illustrates schematically the construction of an alternate embodiment of the ring actuation mechanism. In this instance, actuating rods 100' and pistons 101' are located on one side of the ring structures which are attached to the rods at a point such as 130, typically. The other end of rod 100' pushes against a compression spring 131. Pistons 101' are equipped with a fixed size restricting orifice 132. Hydraulic fluid under high constant pressure is ducted in through channel 133, passes through orifice 132 and exits by means of channel 135 which is connected to metering valve 136, acting as variable size restricting orifice. Channel 137 brings to valve 136 the servo-flow from the other actuating piston, if a pair of actuation mechanisms is used. The metered servo-flow is evacuated through channel 138 and valve 136 is monitored by means of signal line 139. Readers versed in the art of hydraulic servo-mechanisms will understand how actuating piston/rod assemblies (and hence the actuated ring) reach a set position for each given effective metering area set by valve 136 in response to a set signal value, assuming a determined reaction on the part of the ring structure.

A diagram generally representative of the system arrangement is depicted in FIG. 8, in the case of two pairs of opposite actuating pistons. The diagram can easily be modified by a reader familiar with the art to accommodate the actuating mechanism described in FIG. 7, if used; the general system operation remaining the same. In addition to the already identified and recognizable items, the system includes a sump reservoir 140 equipped with a filter 141 containing the hydraulic fluid pumped by pump 142. A pressure regulator 143 insures that the pressure delivered to the actuators remains constant. Two fixed size restricting orifices 144 and 145 play the role assigned to orifice 132 of FIG. 7. The hydraulic fluid lines are connected so as to insure that all actuating pistons cooperate to equalize and add their actions. In any event, the resultant force F' exerted by pistons 101 on the ring structure balances the resultant F of all the other forces applied onto the ring structure, e.g. spring forces, slip pad reactions, ring sliding friction, etc . . . , as is discussed in more details in the next section.

The graphic representations of FIGS. 9 and 17 can be described in conjunction, as they pertain to the same subject and are of general application. When an incompressible fluid of negligible viscosity is caused to flow through two orifices mounted in series, as shown in FIG. 17, from a supply source at constant pressure P to a sink at low pressure P", the intermediate pressure P' existing between the two orifices of areas $A_1$ and $A_2$ can be graphically represented as a function of the ration $A_1/A_2$. Both areas may vary simultaneously, one may be fixed and the other variable, the relationship $P' = \psi(A_1/A_2)$ holds, within limits of course. Such limits may be represented by points a and b on the curve. Segment a-b is of practical significance here. Point c corresponding to a value A of the area ratio and a pressure level P' of the pressure to be controlled represents a typical operating point of interest here, as discussed in the next section.

FIG. 10 illustrates how the system of the present invention could be installed on a vehicle. An engine 150 drives input shaft 54. Output shaft 56 drives power axle 151 coupled to differential 152 which drives propelling wheels 153. A torque regulator 155 is shown installed between engine 150 and outer body 50. A power axle rotational speed regulator 156 is shown installed between output shaft 56 and power axle 151. Rings 77 and 78 are controlled by forces 157 and 158 respectively. The working fluid is pumped out of sump tank 159 by boost pump 160 through filter 161. Flow-inverting valve 108 is located between the two rings. The working fluid leaving the rotor of ring 78 is shown flowing through a radiator 162 for fluid cooling. It is worth mentioning here that the working fluid and the hydraulic fluid could be the same, in which case, only one sump and one filter are used, the boost pump also being in common.

The schematic drawings of FIGS. 11 and 12 indicate how signal 139 is transformed into an area variation of the controlling variable size restricting orifice earlier mentioned. The angular position of actuating shaft 149 of valve 136 is monitored by lever 139'. In an alternate embodiment, shaft 149 is actuated by a pinion 171/rack 172 arrangement show in phantom lines. In either case, an annular sleeve 173 connected to shaft 149 rotates inside valve 136 structural body 170 connected to input duct 174. Ducts 175 and 176 channel the then pressure-regulated hydraulic fluid to cylinders 102 as shown in FIGS. 7 and 8. The inner surface of body 170 exhibits three ports 177, 178 and 179 for servicing ducts 174, 175 and 176 respectively. Shaped openings 180, 181 and 182 cut in sleeve 173 cause annular space 183 to establish communications with ports 177, 178 and 179 respectively, for supplying hydraulic fluid to ducts 175 and 176 from duct 174.

A developed view of the common cylindrical sliding surface between sleeve 173 outer surface and body 170 cooperating inner surface is presented in FIG. 12 schematic to illustrate the manner in which ports 177, 178 and 179 register with corresponding cooperating ports 177', 178' and 179' of the respective openings 180, 181 and 182 of sleeve 173. The inner surface of body 170 is shown in solid lines and the outer surface of sleeve 173 is illustrated in phantom lines and shown in a centered position with respect to body 170 inner surface. Positions 184 and 185 indicate the limits of sleeve 173 angular displacements, as it slides along the direction indicated by arrow f. As is easily identifiable and shown cross-hatched, the uncovered area 186 of port 177 stays constant, whereas the uncovered metering areas 187 and 188 of ports 178 and 179 respectively vary as sleeve 173 rotates. Registered port areas 187 and 188 thus constitute the variable size restricting orifices used for hydraulic fluid pressure adjusting. This valve construction is shown here only as an examplary embodiment of such hydraulic control mechanism. For use with the piston actuation depicted in FIG. 7, only one outlet port such as 187 is required, in which case lines 135 and 137 are connected upsteam of valve 136, and inlet duct 154 of Figure is used as outlet duct 138 of FIG. 7.

A torque regulating system is shown in the drawings of FIGS. 13, 14 and 15. It is installed between engine 150 and input shaft 54 and in line with power delivery shaft 190 thereof. The end of a torsion member 191 is attached to a container 192 bottom fixed to shaft 190, its other end being secured to the bottom structure of an enclosing container 193 fixed on shaft 54. A slidable sleeve 194 having a flange 195 is located between container 192 and 193 walls and connected thereto by longitudinal splines 196 and stubs such as 197 respectively.

Stubs 197 slide in cooperating guiding slots 198 cut helically in container 193 wall. The torsion member may also consists of a torsion bar 191' connected to and located between shafts 54 and 190. The designs and anchoring methods of torsion members 191 (or 191') are discussed in detail in the following section. A planar thrust bearing 199 is located between container 193 bottom and outer body 50 structure so as to maintain torsion member 191 under permanent compression. Splines 196 and stubs-197/slots-198 cooperate in a manner such that a differential or relative torsional movement between the two shafts causes a sliding axial displacement of both sleeve 194 and flange 195 along arrow f.

This axial motion of flange 195 is transmitted to stem 200 by means of fork 201 in either direction, as the flange rotates with both shafts. Stem 200 is affixed to rack 172 which actuates pinion 171 of valve 136. Structure 203 fixed onto body 50 structure guides and supports stem 200 and rack 172. Valve 136 is also attached to body 50 structure. Space 202, outlined in phantom lines, indicates where the torque adjusting mechanism illustrated in FIG. 15 may be located, if needed to vary the torque value at which the torque is to be held by torque regulator 155.

The torque adjusting mechanism depicted in FIG. 15 enables the vehicle operator directly (or by means of the engine control system) to adjust the relationship between the linear displacement of flange 194 and the angular motion of valve 136 axis. To that effect, stem 200 is divided in two segments 200' and 200'', both capable of linear movements in the same direction but offset as indicated by arrows f and f''. The articulated ends 204 and 205 of the stem segments are connected to a push-pull lever 206 capable of oscillations about one end 207 articulated onto actuating rod 208 guided and supported by outer body 50. Rod 208 can move linearly along arrow f' and in so doing alters the leverage ratio between the end articulations 204 and 205 with respect to articulation 207. Such action results in two possibilities: (1) a capability of adjusting the torque level being regulated, and (2) either magnifying or reducing the ratio of the linear displacements of the two stem segments, depending upon which one of the two stem ends is positioned closest to articulation 207, by inverting the lateral locations of stem segments 200' and 200''. The implications and consequences thereof are discussed in the next section in more details.

FIG. 16 drawing presents a rotational speed regulator (or govenor) 156 shown mounted by and connected to output shaft 56. It is supported by outer body 50 structure and driven by a right-angle bevel gearing arrangement in which gear 210 fixed to shaft 56 drives gear 211 coupled to regulator 156 structure. A plurality of balls such as 212 are contained in conically shaped bores such as 213 and restrained between bore bottoms 214 and cups 215. Hydraulic fluid under pressure is brought in annular cavity 216 that services all bores 213. The fluid flows inwardly and thus pushes the balls inwardly against the centrifugal forces generated by body 156 rotation. The balls are thus being balanced between two opposing forces, i.e. one caused by the pressure drop in the annular restricting orifice formed between the ball surface and the bore conical surface, and the other developed by the centrifugal force. As the ball moves inwardly, the pressure drop action decreases much faster than that of the centrifugal force, thereby creating the governing function desired.

The hydraulic fluid is supplied under constant high pressure by channel 217 through shaft 218, then ducted out by channel 219 connecting through shaft 218 with duct 220 which contains adjustable restricting orifice 221. Between channel 219 and orifice 221, duct 222 facilitates access to the then rotational-speed-regulated fluid pressure which is needed to control the angular velocity of power axle 151 by means described hereinunder. The sealing and fluid-collecting groove constructions required between shaft 218, structure 50 and channel 217 and duct 220 are so well known in the art that further description is deemed unnecessary here and would be burdening. Referring to FIG. 17 schematic in which two variable-area restricting orifices are shown, the reader will now recognize orifice $A_1$ as being that which the ball radial positions control and orifice $A_2$ as being that which provides adjusting of the rotational speed level which governor 156 is supposed to help maintain.

Before describing in detail the control actions that the present invention system provides, it is deemed necessary to first explain how a vehicle and its engine usually interact, in a most common case, in an automobile for instance. The graphic representations of FIGS. 18–20 serve that purpose. The engine operating parameters of interest are engine torque Q and rotational speed (rpm) N, both cooperating to define shaft power $\rho$, and the engine specific fuel consumption $F_{sp}$. The vehicle car operating parameters of most interest are the vehicle speed V (or the corresponding power axle rpm) and the torque Q' which is needed to insure that wehicle speed V is maintained. The relationships, and use thereof, between these parameters are discussed in the next section. They are somehow and somewhat illustrated by the various curves shown in the graphs and which warrant a short description.

The curves of FIG. 18 graph indicates how typically Q, $F_{sp}$, $\rho$ and the vehicle power requirement vary as a function of engine shaft rpm, in direct drive (engine and power axle rpm's being the same), with the vehicle rolling on a level road. The torque reaches a maximum at the nominal engine design point ($N_o$ rpm) while the fuel specific consumption reaches a minimum then. Point M at the intersection of the $\rho^*$ curve and power demand curve corresponds to an equilibrium point where the engine torque is equal to the power axle torque needed to maintain a constant vehicle speed $V_o$. Curve $\rho$ would correspond to a design in which the peak torque point and the maximum power point occur at the same maximum rpm value, which is practically never the case. In practice, engine and car characteristics are optimally matched to provide maximum torque and minimum specific fuel consumption (most economical operation) for a cruising velocity of the car which is substantially lower than its maximum speed. Also, it would mean that curve Q should fall off rapidly from point M on as shown by the branch q of Curve Q shown in phantom line, which is quite impossible. Incidentally and for reference, the branches located on the left of point M of curves $\rho^*$ and $\rho$ may be construed for the sake of convenience as representing typical power characteristics of Diesel and gasoline engines, respectively.

The families of curves illustrating FIG. 19 graph correspond to the power requirements of the vehicle as a function of the power axle speed, independently. The solid curves represent torques available from the engine on the power axle and the dashdot curves correspond to the torques needed for enabling the vehicle to reach a set vehicle speed (or power axle rpm). Points a, b and c correspond to a three gear-ratio gearbox; points a, b, c, d and e would pertain to a five gear-ratios gearbox. Curves A (locus of all gear ratio points) and B (curve enveloping all torque characteristic curves) then correspond to an infinitely variable ratio gearbox, or to the system of the present invention. Incidentally, one can assume that $N_3$ corresponds to $N_o$ of FIG. 18 graph (direct drive, gear ratio of 1/1).

The graph of FIG. 20 presents two families of curves, one shown in solid lines for the torques and the other shown in phantom lines for the specific fuel consumption, all as a function of vehicle speed, in direct drive, the engine power and torque being adjusted by the driver (gas pedal action). Curves Q correspond to the engine torque variations as a function of rpm (or vehicle velocity, the two being related by a constant) for a given gas pedal position (or power level imposed by the driver). Curve $F_{sp}^*$ represents the locus of all minima of curves $F_{sp}$.

The schematic diagram of FIG. 21 is a combination of FIG. 10 schematic and of a block diagram depicting the control of the system of the present invention. Essentially, a vehicle operator E/0 actuates an engine power-setting mechanism 230 which imposes a determined operating regime (torque/rpm combination) to engine 150. The engine power output is delivered by means of shaft 190. The remaining part of the system is easily identifiable from the previous description. The ring-structure actuating mechanisms 231 and 232 of rings 77 and 78 respectively may be of either one of the two types previously described, or of any other type as will be made clear in the next section. These actuating mechanisms respond to signals initiated by the torque regulator 155 and the angular-velocity governor 156. The various combinations of possible various control arrangements of the actuating mechanisms are analyzed and discussed in the following section.

The drawings of FIGS. 22–25 pertain to a slip pad construction which enables the pad sliding surface to closely conform to the shape of the ring track surface, at any time during the pad revolution, when the later is cylindrical but not circular. This means that the radius of curvature of the track varies along the length of the track. The pad sliding surface then must conform to such variations of curvature. That is accomplished by causing land 126 of FIG. 4 to become radially mobile as the edge 126' of sliding vane 250 that separates cavities 124' and 124". In adddition, the side gap depth varies with such change in track curvature as is depicted by contour lines 251 and 252 which represent two different radii of curvature of the track surface. In order to minimize the importance of this side gap, two conformable radially slidable side guards 253 and 254 are mounted on each side of the pad.

Each guard consists of a thin flat flexible structure which fits snugly in a cooperating narrow groove such as 255 or 256 located near and parallel to the pad side faces. Full fluid pressure is applied on the bottom edge 257 of the guard. The guard body is thus constantly pushed against the outer face of its housing groove and the track surface. The latter action is facilitated by making the guard structure flexible so as to bend as indicated by arrows f and f', thus allowing its edge 258 to assume any shape and/or position between curves 251 and 252 (FIG. 25). The side gaps are thus constantly closed off, although it is at the cost of a small drag penalty, since edge 258 is continuously forced to keep in contact with the track surface.

The guard structure flexibility is made possible by means of a plurality of narrow slots such as 259 which open on edge 257. Each slot is terminated by a hole such as 260 of diameter larger than the slot width, and located close to edge 258. A plurality of such holes positioned at close intervals provides the mentioned flexibility. The hole position dimensioning is such that the holes are always closed off by the outer faces of grooves 255 or 256. Full fluid pressure is also applied on the bottom edge of sliding vane 250. Cavities 124' and 124" are thus both enclosed, except for any passage caused by the gap forced open between surface 76 and land 261 or 262 by the pressures existing in either cavity or both. Cavities 255, 256 and 263 (below vane 250) are supplied with full pressure working fluid by ducts 264, 265 and 266 respectively. They are connected directly with feed cavity 122 previously described. The ends 267 and 268 of guard 253 structure are slightly curved, although not shown in FIG. 25, so as not to interfere with the free bending movement of the guard plate or body, whilst always keeping the end gaps at a minimum.

Although a small amount of fluid is necessarily constantly allowed to flow between all adjacent sliding surfaces thus created within the pad, it is believed that the leakage flow resulting therefrom is of much smaller magnitude than that of the flow otherwise permitted around the periphery of the slip pad. Therefore, even though the ring track surface may be circular, it may prove advantageous to make use of a conformable pad construction, as is discussed in the following section. Considerations of complexity, cost, additional drag energy losses and decrease reliability will impose the design with the best trade-off features.

FIGS. 26-27 show typical cross-sections of a fluid flow-inverting two-position valve called out as 108 in FIG. 1. It is used to invert the flow direction in the two fluid channels connecting the pump to the motor (107) and the motor to the evacuation channel 105. One valve position corresponds to forward drive and the other position corresponds to reverse. To that effect, channel 103 altogether and the portions of channels 105 and 107 located in structural wall 51 are left undisturbed, whereas the flow directions in portions 107' and 107" are inverted by rotating cylindrical inner body 270 in the direction of arrows f' or f" by means of internal ducts 271, 272, 273 and 274 located inside body 270. The sealing means located between the two sliding surfaces of body 270 and wall 51 are not shown, being well known in the art. A plurality of arrows indicate the directions followed by the fluid and readers familiar with the art will easily understand how the flow inverting takes place when body 270 is caused to assume either one of the two positions depicted in FIG. 26 or 27. Ducts 272, 273 and 274 are located in planes that are parallel but separated so as to prevent physical interferences. No axial displacement of body 270 is required. The lengths of cavities 277 and 278 are dimensioned to accommodate the venting of two ducts thereinto. The inverter valve construction described above is not limitative but shown only to illustrate the principle of the flow inverting operation required.

The schematic diagram shown in FIG. 30 depicts typical arrangements of the equivalent of gear ratios, or torque ratios, that the vehicle operator has at his disposal for monitoring the vehicle operation. The two cases of manual gear selection and of automatic control are presented on the same diagram, but differentiated by the type of lines used to illustrate each case. The manual gear selection configuration construction is represented by solid lines, whereas the simpler automatic control construction is shown in dotted lines. A detailed discussion of the gear (or torque) ratio selection is presented in the next section and further description is not deemed needed here.

The two sets of curves shown in the graphic representation of FIG. 31 illustrate the variations of parameters of interest during a typical acceleration and a typical deceleration of the vehicle, upon the generation of an instantaneous power level demand change made by the vehicle operator, all as a function of time. The various parameters of interest are as follows, from bottom to top of each curve set:

$Q_e$—torque generated by the engine on the power drive shaft;

$N_e$—rpm's of the power drive shaft to the transmission system;

$p$—power level generated by the engine, equal to $Q_e \times N_e$;

$N_a$—rpm's of the power output shaft, sensed by the governor;

$Q_a$—torque transmitted to the power output shaft or axle;

$\delta_e$—off-centering amount of the pump ring (or piston stroke);

$\delta_a$—off-centering amount of the motor ring, or piston stroke;

V—vehicle velocity;

a,d—vehicle acceleration or deceleration, as the case may be $\Delta$—difference between an actual value and demand value;

p—operator's power-level demand.

The interpretation and significance of those parameter variations are discussed in the next section. Suffices it to indicate that they correspond to the case of an ideally operating torque converter which insures that the engine always operates at the nominal optimum design point for which the specific fuel consumption is constantly kept at its minimum during the acceleration phase. Such ideal operation case does not apply to the deceleration phase, of course. However, ideal engine braking can be contemplated and its monitoring is also discussed in the following section.

DESCRIPTION OF TYPICAL POWER-TRANSMISSION SYSTEM CONTROLS

The rationale used for selecting five typical operating modes of the embodiment of the present invention is outlined in a subsequent section. A control system is then discussed at length for each one of these operating modes. Some components, and arrangements thereof, entering in the construction of each control system have already been described in FIGS. 1, 2, 7, 8, 10, 11, 12, 13, 14, 15, 16 and 28. They specifically include: the ring actuating mechanisms (FIG. 1, 2, 7 and 8), the master control valve 136 (FIG. 8, 11 and 12) and function-controlling elements such as torque regulator 155 (FIG. 13-15) and speed governor 156 (FIG. 16). Torque regulator 155, when used in any of the five control systems, is always mounted on shaft 54 (engine torque regulation), but speed governor 156 is used to control the rotational speed of either drive shaft 56 or engine shaft 54 when mounted thereon, in which case it controls engine rpm. In that instance, it is referred to as 156'

(FIG. 21) to avoid possible confusion. At this point, it should be mentioned that one governor assembly 156' can easily be adapted to control simultaneously several shaft speed rpm's, each for a different level, by means of each individually-adjusted assembly of ball 212 and associated housing conical cavity, adjustable restricting orifice 221 and attending servo-flow connections. Two of such specially-adjusted one-ball governors may actually be set at different rpm levels so that their control responses for the same engine operating parameter may have opposite effects, so as to define for instance a rpm range between two rpm values within which the shaft speed is then caused to be confined. Such application is discussed in the next section.

Some of those typical control systems require simple state-of-the-art components and/or mechanisms in addition to those specifically and specially constructed as previously described. They are briefly described hereinunder once in the context of one typical control system description, as applicable. These additional components and/or mechanisms are schematically illustrated in FIG. 21 where the most differentiating and characteristic features of the control system for each operating mode are distinctively grouped in a summary fashion. Four distinct mechanisms are first described below, separately. The description of their functional integration and operation within a specific control system is presented with the description of each control system, so as to facilitate the reader's comprehension.

In the following description, a simplifying assumption is implicitly made throughout: a given pressure level of the controlled servo-fluid flow to a ring actuating mechanism automatically determines one position of that ring, i.e. its stroke. It was earlier shown by means of the curve of FIG. 9 and of the corresponding schematic of FIG. 17 that adjusting the area ratio $A_1/A_2$ between two restricting orifices mounted in series automatically defines a regulated intermediate pressure P' between two constant pressure levels P and P''. This approach is constantly utilized in the operation of the control systems described later on and thus constitutes the basis of all hydraulic regulations herein. Also, for the control systems in which the positioning of a ring structure is directly and positively accomplished by means of manual control of its "gear-ratio", a follow-up hydraulic positioning system is much simpler albeit sufficient.

Such device is well known in the art and needs only a cursory description here, in the context of the present application. A pilot valve 300 in the form of a plunger in FIG. 7 is mechanically actuated in the directions shown by double arrow f. The plunger penetrates inside piston/stem assembly 100' and fits inside cooperating bore 300'. Restricting orifice 132 is replaced by an equivalent variable size orifice then controlled by the cooperation of the plunger and its lodging bore sliding surfaces. As is well known in the art, with correct hydraulic connections, the position of the piston/stem assembly follows that of the plunger along double arrow f'. The role and construction of valve 136 are then different, because the variable area restricting orifice replacing 132 is variable in size and thusly performs the function that is otherwise assigned to master valve 136.

Although the following does not pertain to a mechanism but to a mode of operation of the ring actuation, it should be mentioned and descibed now, being of interest in the case of automatic positioning of the ring structures by application of regulated servo-pressures. As discussed in the next section, in cases where a choice must be made by the control system between which one of the two ring positions should best be adjusted, it might be preferable to adjust the pump ring instead of the motor ring. Thus, upon sensing an adjustment in pressure level, the actuating mechanism of the ring "first in line" for action then preferentially responds to such servo-pressure change, while the other ring actuating mechanism awaits for a higher servo-pressure level adjustment to be required. This preferential election by the ring actuating systems to respond first (or last) to any signal requiring a ring position adjustment stems from the following considerations: (1) the transmission overall gear ratio $r_{p/m}$ is function of both the pump side contribution $r_p$ and the motor side contribution $r_m$ to the making of $r_{p/m}$, and (2) $r_p$ and $r_m$ contribute inversely to $r_{p/m}$ according to the relationship $r_{p/m} = r_p/r_m$. In other words, the transmission overall gear ratio increases when the pump ring stroke increases and/or the motor ring stroke decreases. The conventional reference to low and high gear and/or increase and decrease in gear ratio used for stick-shift gearboxes is adopted here. Thus, the lowest overall gear ratio corresponds to the combination of pump ring minimum stroke and motor ring maximum stroke, and the highest overall gear ratio concomitantly corresponds to combining pump ring maximum stroke with motor ring minimum stroke. For reasons given in the next section, the motor ring minimum stroke should be set at a value much larger than that of the pump ring. Also, whenever possible, it is preferable to maximize the motor ring stroke, even though it may mean minimizing the pump ring stroke.

With these guidelines in mind, further defined and discussed in the next section, and keeping in mind too that only one servo-pressure signal is available for preferentially (i.e. optimally) positioning both rings, means must be provided for causing one ring actuating mechanism to respond first and unequivocally or unambiguously to a servo-pressure change, whilst the other remains unaffected, therefore fixed. This can be achieved in two separate simple ways by properly selecting spring characteristics and arrangements thereof so that: (1) each ring actuating mechanism responds to a different range of servo-fluid pressures, and (2) the two ring strokes vary in inverse fashion as a function of servo-pressure level adjustments for each actuating mechanism.

Referring to FIG. 9, the pump ring actuating mechanism can be constructed so as to cover the whole ring stroke range with variations of servo-pressure P' limited to cross-hatched region I of the graph. Concurrently, the motor ring actuating mechanism may be constructed so as to cover all of its stroke range a for P'-variation range limited to region II, located above region I and corresponding to higher servo-pressure levels. In addition, both ring actuating mechanisms can be constructed differently so that they respond inversely to servo-pressure adjustments. It should also be noted that the two ring actuating mechanisms need not be similar in construction. As an example, the actuating mechanism depicted in FIG. 1 could be used for the pump ring and that illustrated in FIG. 7 could be used with the motor ring. Two pertinent remarks are worthwhile in that regard: (1) the motor ring stroke range needs be practically only half of that of the pump ring, and (2) the relative variations in the motor ring reactions to shaft 56 torque changes are thus less pronounced than those experienced by the pump, as an implicit result of the discussion regarding this subject in the next section.

As a direct result of the above considerations, a preferred motor ring actuating mechanism may be constructed so that: (1) the combined efforts of spring 131 of FIG. 7, of P and P', for lower values of P' (region I of FIG. 9), on piston/stem assembly 101' cause the motor ring to maintain a position of maximum stroke, (2) the ring remains at its maximum value until P' reaches the lower limit of region II, and (3) the ring stroke is then caused to decrease as the servo-pressure P' further augments toward the upper limit of region II, at which time the ring reaches a minimum stroke stop. Region I and II ranges may be adjusted so as to overlap or be separated by a narrow range of P' uninfluential variations. The former case provides a small degree of uncertainty during a ring operation switch-over, whereas the latter case requires an increase in a P' level for such switch-over to take place. At this juncture, only experimental results will help determine which case is of most practical interest.

A servo-fluid connection-switch such as shown in FIG. 21 as 350 may be used instead of or in conjunction with the servo-pressure programming construction just described. Actuating stops 351 and 352 are connected to the pump ring and motor ring, respectively. They both are pushably and flexibly connected by means of springs to rod 353 mounted on a three-piston assembly sliding inside sleeve 354 having port openings that can registeringly cooperate with the piston lands. When pushed to the extreme right, communication is opened between servo-fluid admission port 355 and outlet port 356, vice-versa when the piston assembly is pushed to the left, the latter communication is interrupted and a new communication is opened between ports 355 and 357. Thus it is easy to visualize how the ring actuating mechanisms or the rings themselves may be used to switch the incoming servo-fluid flow, hence its pressure, from one oulet line to another. A spring loaded semi-locking latching device 358 maintains the piston assembly in either one of two positions, extreme left or extreme right. The springs located on either end of rod 353 and spring-loaded device 358 cooperate in a manner such that an appreciable amount of compression of either one of rod 353 end springs is needed to overcome the latching device locking action and let the piston assembly move to the other one of its two extreme positions. Such construction enables switch 350 to overcome the uncertainty earlier mentioned and/or prevent possible resonant oscillations of the two rings from being initiated. This first additional mechanism may be used in conjunction with any of the three fully automatic control systems described later.

The second additional mechanism to be described now is required only in conjunction with a control system that regulates the vehicle velocity at a set value. As explained in the discussion section, during such operating mode, adjustments in engine power level are needed as the road grade changes and vehicle speed is to be maintained. The operator has then relinquished such control to the automatic control system. To enable the control system to intervene in the adjustment of fuel delivery rate to the engine, a self-regulating control loop must be substituted for the human control loop which operates visually and sometimes unconsciously when the vehicle speed control is not on. An examplary embodiment of such mechanical substitution is typified by complying linkage 400 of FIG. 21.

Connecting rod 401 is attached to the "gas pedal" (not shown) with which the operator controls the engine power, and it is linked to actuating rod 402, controlling the fuel delivery rate to engine 150, by means of cylinder 403 and piston 404 sliding therein. Piston 404 is centered between the end closures of cylinder 403 by two opposing springs 405 and 406, and is equipped with a fixed-size restricting orifice 407. Cylinder 403 can be locked in place by clamp 408 activated by actuator 409. A shuttle switch 410 affixed onto cylinder 403 by structure 411 includes an actuator 412 that pushes stem 413 to the right if activated. Stem 413 supports three pistons sliding inside cylinder 414 in which port openings are located so as to registeringly cooperate with stem 413 piston lands, in their sliding motions, in a manner such that the servo-fluid flow admitted by means of port 415 is stopped if actuator 412 is not energized but otherwise allowed to flow through orifice 407 when the latter is energized.

Complying linkage 400 is used as described below. The operator first reaches a steady-state vehicle speed condition at the velocity level which is desired to remain constant (Vo). At this point, preferably on a level stretch of road, actuator 412 is inoperative (not energized) and the servo-fluid is not allowed to flow from inlet line 416 into outlet line 417, its supply outlet port being closed by the land of the middle piston on stem 413. The linking of rod 401 to rod 402 is by means of springs 405 and 406 which maintain piston 404 in a neutral mid-position between cylinder 403 end closures. No servo-fluid passes through orifice 407. The operator engages the speed control system by switching on the activation of actuator 412. Stem 413 and its three-piston assembly is then caused to move to its extreme right position so as to adjust the port-opening/piston-land registering so that: (1) servo-fluid lines 416 and 417 are communicating, (2) the outlet port of line 419 opens so as to open communication with line 418 to return the servo-fluid to a lower pressure level (sump), and (3) the servo-fluid may then freely flow through shuttle switch 410, except for the flow restrictions created by orifice 407 and/or whatever additional restrictions that may be caused upstream and/or downstream of shuttle switch 410, for control purposes.

Whenever such control action is taken, either upstream of line 416 or downstream of line 419, the servo-fluid flow varies and a concomitant pressure drop change occurs through restricting orifice 407, which then causes the hydraulic forces exerted on piston 404 to vary accordingly. Piston 404 then slides to a new position for which these forces are again balanced by springs 405 and 406. In conclusion, a set positiom of piston 404 in cylinder 403 corresponds to a given set of servo-fluid flow conditions defined by pressure level and/or flow rate. The result is a lengthening or shortening of the distance between gas pedal and fuel supplying means to the engine, and either one could be readjusted. However, only the engine fuel-supplying means should be affected, a change of gas pedal position being required to remain ineffective under those circumstances. To lock the gas pedal in place, or its equivalent, i.e. rod 401, it suffices to lock cylinder 403 in a fixed position. This is accomplished by means of clamp 408 which becomes engaged when actuator 409 is activated, which happens concurrently with the activation of actuator 412. The fuel supply to the engine, and thus its power output, become controlled solely by the servo-flow, or by whatever system that regulates it.

The third additional mechanism left to be described is needed whenever the Engine Torque/RPM Optimization Control (or acceleration control) system becomes operative. This occurs, if such control option is provided, automatically when the operator requires a sizable change in vehicle speed fairly rapidly, referred to in the next section as "brusque acceleration". Under such conditions, the fuel supply to the engine is usually excessive and the fuel consumption rises. However, enough fuel must be delivered to the engine so as to maximize the rate at which the vehicle is enabled to accelerate. Also, enough leeway must be provided in the system so as to enable the operator to accelerate the vehicle at low acceleration rates without allowing a control system to take over, each and every time an increase of vehicle speed is desired. This discrimination between slow and brusque accelerations must be provided automatically by the acceleration control itself, independently of the operator, especially in case of emergency such as "get away" situations. As discussed in the following section, the discrimination is performed by means of constantly comparing the engine power demand made by the operator to the actual power level delivered by the engine. Also, when the operator releases the gas pedal brusquely, when the acceleration control system is engaged and if the desired vehicle speed is attained, the system must be automatically switched off without creating the risk of being switched back on erroneously again, when the operator readjusts the gas pedal position to that which corresponds to the vehicle speed level that has just been reached as desired. In other words, the engine fuel supply rate should not be allowed to overshoot or undershoot rapidly at rates faster than those which characterize the response of the control system itself, because of undue troublesome interference on the part of the operator.

To that effect, rate-sensing linkage 450 is inserted between fuel command rod 451 connected to the gas pedal (not shown) and connection 452 attached to fuel metering system 453. Linkage 450 comprises three components: a cylinder/piston assembly 454, switch 455 and dashpot 456. Springs 457 and 458 allow relative sliding motions to take place between cooperating parts, while enabling such parts to otherwise perform their functions. The arrangement of the parts being very simple and the construction thereof being also well known in the art, no further descriptive elaboration is needed here. The following operation description will clarify any questionable detail item thereabout.

Switch 455 responds to relative displacements between rod 451 and piston rod 459, when the whole assembly is prompted to move in the direction of arrow f, corresponding to an increase in fuel delivery rate to the engine, by the operator. The mass of piston rod 459 and dashpot piston 461 assembly is much larger than the mass of switch 455, though compression springs 457 and 458 have similar characteristics. If the operator causes command rod 451 to move slowly (slow acceleration case), no above-mentioned relative displacement takes place because spring 457 exerts a force that exceeds the inertial loads developed by the piston-dashpot assembly during such slow motion. However, when the gas pedal pushes command rod 451 at a rate which exceeds a set level, the inertial loads previously defined reach a level exceeding the combined efforts of springs 457 and 458, which causes switch 455 to close an electrical circuit, thereby activating the acceleration control system, whilst deactivating the control system which was previously controlling the power transmission system.

At the end of a rapid acceleration, when the vehicle has reached a speed approximating the final velocity desired by the operator, the vehicle may still be accelerating and the operator may wish to stop such acceleration instantly. If this occurs, in most instances, the extent of the gas pedal release may far exceed the amount which was needed to give a position to the gas pedal corresponding to that which the desired vehicle speed requires. The acceleration control system, which had just been deactivated as the engine power level delivered began to approach the level providing the vehicle speed desired, must not be reactivated by another brusque advance of the gas pedal. Such involuntary action on the part of the operator may be prevented by causing the gas pedal release to be slowed down to such an extent that a sudden engine braking action is not felt by the operator when the gas pedal is released too rapidly. Such sensation deprivation minimizes the urge on the part of the operator to depress the gas pedal rapidly again. This slowing down of the gas pedal release action is simulated by dashpot 456 by causing the fuel delivery rate to decrease more slowly than that which a brusque release of the gas pedal otherwise causes. Dashpot 456 cylinder is attached to a fixed structure 462 and houses compression spring 460 which causes the fuel delivery rate to automatically return to an idle setting if no command action to the contrary is imposed on stem 463. The positive contact which is normally maintained between piston rod 459 and stem 463 is broken when piston rod 459 is caused to move rapidly in a direction opposite to that of arrow f.

Dashpot piston 461 houses a one-way check valve which does not oppose piston 461 motion toward the right, but closes when piston 461 is pushed by spring 460 toward the left, thereby slowing the return of stem 463 to the left side, hence of the fuel metering system toward the idle setting, also. Dashpot 456 may be air-filled and the clearance between piston 461 and its cooperating cylinder then provides the air flow restriction which regulates the return rate of the fuel metering system to a lower setting. Rate-sensing linkage 450 and complying linkage 400 may be mounted in series, in which case command rod 451 becomes simply an extension of rod 402, although for ease of representation, the two mechanisms are shown separated in FIG. 21 and depicted in association with the control system to which they belong. For the same reasons, fuel metering systems shown as 420 and 453 represent the same basic component, i.e. a metered fuel supply source. The various electrically-activated switches under control of either the engine operator (E/O) or a specific control system that interconnects and integrates two or more of the automatic control systems into one single overall control system are omitted. Here, the use and combination of fully automatic control systems (or operation mode options) are not considered in conjunction with a manually, be it fully or partially, operated system. Each one of five typical control options is diagrammatically shown in FIG. 21 by graphically-differentiated signal lines for ease of recognition. When such lines seem to indicate duplication, it is done so as to avoid confusion between systems. Each one is summarily described below as example only of one possibility of a typical control system embodiment of the present invention.

Fully Manual Control System:

This simplest control system embodiment, depicted with solid signal lines, consists of a fuel metering supply 348 and a "gear" shift 349. Fuel supply 348 here is shown corresponding to a carburettor that actually controls directly the air admission (line 346) and indirectly the fuel metering (line 347) to engine 150. Gear shift 349 controls directly the positions, thus the strokes, of ring structures 231 (pump) and 232 (motor). The details regarding typical gear ratios, and their relationships with the ring strokes, available to an operator are schematically illustrated in FIGS. 30 and 32. These are fully discussed in the next section, the mechanical linkage between gear shift 349 and the ring actuating mechanisms are not shown, being well known in the art. In this instance, the linkage is connected directly to plunger 300 (FIG. 7) which is hollow and channels the servo-fluid inside the pilot valve thusly formed. A controlling hole 345 enables servo-fluid to flow in or out of cylinder 101' when a portion of hole 345 is uncovered by the surface of cooperating bore 300' extending to the right-side flat surface of piston 101'. In such construction, one servo-fluid line connected to the cylinder is not needed, namely 133 or 135 depending on the manner in which the servo-fluid is caused to flow and piston-101'/stem-100' assembly is supposed to operate. If such a construction is used in both ring actuating mechanisms, because the pump ring and the motor ring must respond in inverse fashion to a similar variation of servo-fluid pressure, as earlier mentioned, the servo-fluid flow direction and spring 131 must be arranged differently. Such arrangement variations and corresponding response modes are well known and understood by those readers familiar with the art. $r_{p/m}$ is selected by the operator, but the apportionment between $r_p$ and $r_m$ is adjusted automatically by the manner in which the servo-fluid flow is automatically distributed between the two ring actuating mechanisms, according to their operation modes, as earlier described, and which are built-in into the system.

Semi-Automatic/Partially-Manual Control System:

This control system enables the operator to manually select $r_p$ and let $r_m$ automatically adjust so as to adhere to the ratio apportionment imposed by built-in system constraints and/or programmed directions. The various manners by which this can be accomplished are described and discussed earlier in this section and later in the next section. Interrupted signal line a—a is not needed and is replaced by long-dash/dot signal line 344 that connects torque regulator 155 to motor-ring actuating-mechanism 232, thereby constituting one control loop of the transmission system motor. The remnant portion of the manual control system operates as previously described for the fully manual control system.

Depending on the amount of system sophistication that is possible to attain on accounts of the higher system flexibility offered by this added degree of freedom, and which one might desire, ring actuating mechanism 232 may also be controlled by another servo-fluid flow regulated by speed governor 156'. Another signal line 343 then connects switch valve 342 under operator's control to line 344 so as to substitute its signal to that of line 341 coming from the torque regulator. Switch valve 342 may be a 3-way valve that enables the operator to elect one of the two possible connections, i.e. line-343/line-344 or line-341/line-344. In the first option, the torque regulator is in control, whereas, in the second option, the speed governor (engine rpm) is in control.

Switch valve 342 may also consist of two one-way check valves (non-return) mounted on lines 341 and 343, and arranged so as to enable the servo-fluid to flow from line 341 or line 343 into line 344, depending upon which line is pressurized to the highest servo-pressure level. The servo-pressure in such line then overrides the signal transmitted by the other line and controls the motor ring actuating mechanism. The use and application of such flexibility of operation is discussed in the next section.

Minimum Fuel Consumption Control System:

This control system enables the operator to let the automatic power transmission adjust $r_{p/m}$ steadily and continuously when a quasi steady-state of engine/vehicle operating mode is in effect, regardless of changes in engine loading conditions caused by extraneous interferences such as variations in road grade and/or slow adjustments in vehicle velocity by the operator, so that the engine specific fuel consumption is at or remains near its minimum value. As shown later in the next section, such an operating condition requires that both engine rpm and torque be controlled within set limit values as a function of engine power level demand. The operator is in constant control of the engine power by means of the gas pedal and thereby regulates the vehicle performance. Low level vehicle accelerations are automatically handled by this system, as are all and any influences of road grade changes. The corresponding signal lines in FIG. 21 are depicted in short dash lines which connect the pertinent control elements.

Servo-fluid connection switch 350 may be used in this system in lieu of or in conjunction with a "programmed response" of the ring actuating mechanisms to servo-pressure levels as earlier described. Both pump ring and motor ring stroke adjustments are simultaneously needed here to adjust $r_{p/m}$ continuously. These two adjustments are regulated by two servo-fluids which must control two separate actuating mechanisms in an automatic and repeatable manner, as previously described. To that effect and concurrently, the operator imposes a fuel delivery rate to the engine from the fuel supply system 348 and a set of corresponding values for the engine torque and rpm, by means of signal lines 340 and 339 respectively, at which the engine is to operate. Lines 339 and 340 are not servo-fluid lines, but command connections. Torque regulator 155 and speed governor 156', acting on such signals then generate controlling servo-fluid flows through hydraulic signal lines 338 and 337, respectively. Both line servo-flows are then handled by hydraulic switch 336 which operates in a fashion similar to that of switch 342 previously described. The overriding servo-fluid flow is then ducted through signal line 335 to fluid switch 350. Depending on the servo-pressure level or on the ring actuating mechanism positions, the servo-fluid is then channelled through line 334 or line 333 (b—b) to actuating mechanism 231 or 232 respectively, as the case may demand.

Depending on the ring stroke being adjusted, the other remaining at a fixed position meanwhile, either $r_m$ or $r_p$ values are adjusted in a manner such that $r_{p/m}$ reaches a value which will insure that either engine torque or rpm are corrected so as to conserve that value which is set according to the operator-imposed gas pedal position, as mentioned above. The correspondence between these two set values and the gas pedal positions is established for each given engine-vehicle match and each power output level of the engine. It is preprogrammed in the system by means of mechanical linkage and articulation set adjustments located between the gas pedal actuation and the command levers of the control elements, as is well known in the art.

Vehicle Speed Automatic Control System:

This control system enables the operator to keep a constant selected vehicle speed under varied and varying engine and/or vehicle operating conditions such as road grade, altitude, wind or other power-affecting vehicle operating parameters. If and whenever possible, engine operation at minimum specific fuel consumption conditions is desirable here also. The signal lines corresponding to this system are shown in elongated-dash lines in FIG. 21. As shown in the next section, the vehicle speed is controlled by means of power axle 151 rpm which is sensed by speed governor 156. Then, the engine rpm is regulated by speed governor 156' mounted on engine output shaft 54, by means of fuel-delivery rate adjustment. The gas pedal operation is biased by means of complying linkage 400, which renders the gas pedal inoperative, in the manner earlier described. Again, to each nominal position of the gas pedal and steady vehicle speed level at which the control system is switched on, corresponds an engine rpm value, and consequently an engine torque value in the present case as shown in the next section, which is close to the rpm value for which minimum fuel consumption occurs.

Prior to switching the control system on, the operator sets the steady vehicle speed which is desired to remain constant, on a level-road stretch if possible, by adjusting the engine power output, while the minimum specific fuel consumption control system is in operation, by means of command connection 449. To this vehicle operating condition corresponds a well defined gas pedal position. Then the speed control system is engaged. The position of command connection 449 at that time determines the position of command line 448 (c—c) to speed governor 156, setting shaft 56 rpm value at which shaft 151 rpm is then to be controlled, and establishing a fixed position of cylinder 403 by means of command line 447. Cylinder 403 is then clamped in that fixed position and the gas pedal becomes inoperative. Another controlling means has taken over the regulation or adjustment of the fuel delivery rate to the engine as previously described.

Because either engine torque or engine rpm can interchangeably be used as engine-generated operating and controlling parameter, servo-fluid line 446 is shown emerging out of torque regulator 155 instead of speed governor 156'. This signal line is the same as servo-fluid inlet line 416 to hydraulic shuttle switch 410. Actuator 412 is energized at the time of the control system switch-over and the servo-fluid pressure is then enabled to take over the control of fuel delivery system 420 by means of rod 402 and piston 404, through connecting command line 444. Speed governor 156 is set to regulate shaft 151 at a set rpm value by means of command line 448, and to maintain this rpm value, speed governor 156 generates a controlling servo-fluid flow through signal lines 443 (d—d) or 443' (d—d') which connect to actuating mechanisms 232 or 231, respectively.

The selection of signal line 443 (232) or signal line 443' (231) is done by hydraulic switch 350', either 350 itself or another similar switch operating alike, in the manner already mentioned. However, as discussed and shown in the next section, the fuel delivery to the engine must abruptly decrease when the operator must suddenly brake in an emergency situation, without having the time or thinking to switch off the speed control system. Then, the speed control must immediately be switched off automatically. To that effect, brake system 445 and its hydraulic line system 442 are connected by signal line 441 (e—e) to switch 445' located between E/O and the connection to complying linkage 400. Switch 445', when energized, cancels the signal generated by the switching device which activates the speed control system. Thus, when the brakes are applied during speed control operation modes, said system becomes inoperative and the vehicle operation control automatically returns to the operator and the minimum specific fuel consumption control system.

Until such emergency situation develops, the speed control system operates as follows: (1) shaft 151 rpm, hence the vehicle speed, are kept at quasi-constant values by means of $r_{p/m}$ adjusting, either through $r_p$ or $r_m$, and (2) all adjustments of engine power requirements are handled by the biasing system of complying linkage 400, under the control of engine rpm and/or torque. As previously mentioned for another control system, two separately generated pressure signals may be selectively used to monitor one single control element. The gas pedal is locked in place and the fuel delivery rate to the engine is continuously being adjusted so as to maintain an engine rpm/torque relationship that insures an engine operation mode at quasi-minimum fuel consumption conditions. If only engine rpm or torque is used as signal for controlling the fuel delivery rate, the set value of the engine operating parameter to which the fuel controlling element, be it speed governor 156' or torque regulator 155, responds is determined by the instantaneous position of the command lever of fuel delivery system 420, at which it is adjusted by the biasing action of complying linkage 400. The significance of this condition is explained and discussed in the next section.

Engine Torque/RPM Optimization Control System:

This control system is also referred to as acceleration control system, because it is used exclusively during high acceleration phases of vehicle operation. It insures that no excessive amount of fuel is delivered to the engine during a vehicle acceleration phase regardless of how brusque the engine power demand increase is on the part of the operator. It also insures that a maximum rate of vehicle acceleration is automatically provided by the engine by constantly and continuously adjusting the $r_{p/m}$ of the power transmission. Because this control system utilizes components already described in the context of other control systems in identical operative modes, the graphic representation of this system is greatly simplified by omitting connection and signal lines of obvious nature. The needed diagram lines pertaining to this control system are shown in short-dash-/long-dash lines.

The operator maintains control of the gas pedal during such acceleration phase, however, this control is biased by means of complying linkage 400 and rate-sensing linkage 450 which impose a first correction onto the pedal signal before it is finally transmitted to fuel delivery system 453. This correction happens at the onset of the acceleration phase and is caused by the rate-sensing linkage, as earlier described. The second correction takes place during the bulk of the acceleration period. It is created by the complying linkage in conjunction with the operations of speed governor 156' and torque regulator 155, by means of the servo-pressures that they generate, both cooperating to regulate the rate of fuel delivery to the engine at a variably set level.

During most acceleration periods of interest, the vehicle velocity increases by a factor of two to possibly five and, at any of these velocity levels, the value of $r_{p/m}$ must be adjusted by means of the action of either one of the two ring actuating mechanisms so as to maintain the correct ratio between the rpms of shafts 151 and 54. This continuous $r_{p/m}$ adjustment results from the action of speed governor 156'. The servo-fluid pressure generated thereby controls the ring strokes, thus $r_{p/m}$, as earlier described in the case of the minimum specific fuel consumption control system.

On the engine side of the power transmission system, the engine operation remains to be monitored. Each combination of type, construction and size of engine is characterized by a relationship between torque and rpm values which correspond to the point where engine power output peaks out, for each and every power level demand setting. In the present case, power demand level setting refers to the instantaneous fuel delivery rate setting and not to the gas pedal position, since the latter is biased. A programmed element 500 incorporates such relationships which exist between engine torque and rpm for each one of the various engine power settings from idle to full power. The values of the engine rpm and torque that correspond to any instantaneous position of the command lever of fuel system 453 are used to set a control level for speed governor 156' and torque regulator 155. Again, the servo-pressures generated by either of these two controlling elements or components cooperate in the manner previously described to adjust the relative position of rod-402/piston-404 assembly which, in turn, determines the axial position of command rod 451, rate-sensing linkage 450 (being located between complying linkage 400) and fuel delivery system 453. Because of the presence of springs 405 and 406, a "droop" effect is created in the control loop thus described. It is deemed to have negligible influence. Readers familiar with the art of servo mechanisms will realize that a necessary undesirable closed loop, which does not include the engine, is created between the positioning of the fuel delivery system lever, the setting of engine rpm and torque levels and the actuation of command rod 451. Such construction is not recommended for steady-state control systems. However, in the case of the strictly transitory operation described herein, it is believed that unwanted self-sustaining oscillations, within that closed loop, are unlikely to develop during any acceleration phase.

The essential connection and signal lines between the various control elements are as follows below. Connection line 499 (i—i) links fuel delivery system 453 lever to programmed element 500 which is connected to torque regulator 155 by line 498 (k—k) and to speed governor 156' by line 497 (o—o). A hydraulic switch valve 342' similar to 342 and with similar function receives the signals from speed governor 156' through line 496 (n—n) and from torque regulator 155 through line 495. Signal line 494 (p—p) transmits the servo-pressure to port 415 of shuttle switch 410 which is energized as soon as the acceleration control system is switched on. Cylinder 403 is not clamped in this case, however. The motion of command rod 402 is then transmitted to command rod 451 of the rate-sensing linkage 450 by connecting line 493 (q—q). Finally, that motion is transmitted to the actuating lever of the fuel delivery system 453 by means of connecting line 492. The connecting lines and signal lines between speed governor 156 and actuating mechanisms 231 and 232 are not shown, being similar to those previously described for other control systems. Extensive use is made of interrupted lines, for clarity sake, referred to as 493 (q—q) for example, meaning that line 493 is interrupted at locations indicated as q and linked by an unshown line segment which otherwise would have to be depicted crossing over a large number of other lines.

The distinction between slow accelerations (no control needed) and fast accelerations (control needed) is made by the rate-sensing linkage 450, as earlier described. The command lever of fuel delivery system 453 is linked to actuating rod 402 by means of a variable-length and one-way-acting connecting system that allows the introduction of both a delaying action between the gas pedal and the fuel delivery rate adjustment, and means for determining whether the acceleration control system should be engaged. The delaying action is provided in both directions by the insertion of a flexible coupling between a pair of cylinders and a pair of pistons sliding therein, and which consists of springs 457 and 460. The mechanical contact between rod end 459 and stop end 465 of stem 463 is maintained only when rod end 459 pushes against stop end 465, on account of compression spring 460. However, this contact is broken when rod end 459 is caused to move rapidly toward the left (case of rapid deceleration), because of the slowing action exerted by the dash-pot on the effective return force developed by spring 460 on piston 461. Rod end 459 cannot mechanically pull on stop end 465. The end result is discussed in the next section in more details.

The latter action insures that the acceleration control system is switched on only when the position of rod 401 (gas pedal) changes rapidly, when caused to move toward the right (fuel-delivery rate increase), as earlier described. Switch 455, shown without its electrical connections, closes and thus activates the various hydraulic switch valves that regulate the flow direction of the servo-fluid so as to switch operation to the acceleration control system. Although not shown in FIG. 21, a position holding device locks switch 455 in that closed-circuit position until any later time when the acceleration must be switched off. The acceleration control system is then caused to be switched off, at which time switch 455 is caused to open and de-energize the system. The releasing of switch 455 locking is not shown in the diagrammatic representation of FIG. 21, being well known in the art.

Overall Control System Integration:

The integration of two or more of the control systems described above is not described in detail in this section, but can be visualized by considering the case of the integration of complying linkage 400 in two separate control systems of vehicle speed and acceleration as indicated above in the last two control system descriptions. It is also possible by means of electrical switches and connecting electrical lines therebetween to switch from a full manual control system to a fully automatic control system, if all the components described thereabove are properly arranged and connected. A discussion of such arrangements and connections is presented at the end of the next section.

Summary of Control System Descriptions and Miscellaneous Items:

Because of the descriptive complexity of the various control approaches that can be used to exploit the versatility of the automatic transmission system of the present invention, it might be helpful to summarize the presentation of all control systems described above in a single summary table, with a few notes and pertinent remarks. Also, additional information is needed so as to clarify the construction of programmed element 500 and further define its operation in the automatic transmission system control.

Miscellaneous Items:

It will be obvious to readers familiar with the art that the gear ratio of gearing ratio provided by the invention is infinitely variable (I.V. Transmission) between two extreme limits having a potentiality of reaching ratio values between 1 and 100/1 or more. For practical reasons elaborated on in the next section, such a large ratio range is neither needed nor possible because of motor member efficiency limitations and engine/vehicle coupling characteristics. However, in the intervening gearing ratio range extending between two extreme practical limits, obtainable gearing ratios can assume any value and vary by an infinitesimal amount, though the exact value of that ratio may not be perfectly defined and/or definable. Over a large portion of this range, any such value may yet be dually obtained, i.e. by means of an infinitely variable position of the pump ring and of the motor ring. The removal of such uncertainty is discussed herein and is accomplished in a manner which provides means for maximizing the motor operation efficiency, hence the overall system efficiency. This lack in gearing ratio exact value definition is discussed in the next section and amounts to no more than a few percents of the gearing ratio "nominal value" being controlled, which means that, practically, it has no discernible effects on the engine/vehicle performance. Only mechanical couplings such as gears can provide an exact and repeatable gearing ratio.

In the functional block diagram of FIG. 21, for ease of representation and expediency, three fuel metering and delivery systems are shown. Obviously, only one is present, regardless of how many transmission control systems are combined in one integrated overall control system. However, if only one fuel system were illustrated, too much confusion might be created between the connection lines therewith of the various control systems described therein. Thus callout numbers 348, 420 and 453 refer to a single fuel system, common to all transmission control systems.

The automatic transmission of the present invention and the control systems thereof may be associated with engines of varied types such as gasoline and Diesel engines, gas turbines and external combustion engines (EC engines, U.S. Pat. Nos. 4,399,654 and 4,561,252 amongst others), coupled with vehicles of various types such as automobiles, buses, trucks, tractors, earth moving vehicles, tanks, etc.... Relevant engine characteristics such as torque, rpm and specific fuel consumption and their relationships with shaft power and therebetween vary widely with engine types, and possibly engine designs, e.g. piston engines as compared to rotary engines. Relevant vehicle performance characteristics such as tractive ability, torque/power excess for vehicle acceleration and reverse speed versatility, to name a few, vary equally widely with the type of vehicle and/or its intended application, e.g. taxicab as compared to sport car. Therefore, a set choice of engine/-vehicle operating parameter(s) to be used to monitor the automatic transmission control system(s) cannot realistically be made in a general and universally applicable manner.

The most common and best known combination of internal combustion (IC) engines and vehicles (automobiles) for utility common day transportation is used herein as a model. The difference between gasoline and Diesel engines is briefly alluded to in reference to the shaft power developed by these two types of engines as a function of rpm, in FIG. 18. A case in point can be made of the advantage offered by adjusting the input shaft torque level to be regulated as a function of engine (input shaft) rotational speed (rpm), in other words, whether lines L and Λ may be assumed to be vertical in FIG. 18, for simplification sake. A discussion of this point is presented in the next section. For universality sake, a dependency between torque and rpm is assumed to matter sufficiently. In the summary control system description presented hereinunder, the primarily preferred control system embodiment is shown characterized by torque level adjustment as a function of engine load (gas pedal position p%). In a secondarily preferred control system embodiment, the torque level to be regulated is also adjusted as a function of engine load, but biased by a rpm signal. The control systems to which this applies are specifically the minimum specific fuel consumption control and the vehicle acceleration control. Programmed element 500 plays a vital role in the engine-torque signal-biasing action by the engine rpm signal. This feature is now described in more details.

The drawing schematic shown in FIG. 15 can be used to describe and explain the operation of programmed element 500. The callout numbers previously used for another application are kept, but the new items pertaining to the programmed element function are illustrated in dash lines and have letter callouts. Rod 208 moves along arrow f' in response to an instantaneous fuel delivery rate p shown by an arrow originating at articulation 207. The left end of translating and oscillating lever 206 abuts against fixed guiding ramp R. Articulation 205 is enabled to move vertically along arrow f'' to generate a signal Q transmitted by stem 200''. Concurrently, articulation 204 also moves along arrow f to transmit a signal N by means of stem 200'. Permanent sliding contact between guiding ramp R and lever 206 left end is maintained by means of a spring action represented by arrow F. It is thus obvious that to each and every rod 208 axial position (or value of p) concomitantly correspond a position of stem 200'' (or value of signal Q) and a position of stem 200' (or value of signal N). Although ramp R is assumed to be fixed, it could be rendered adjustable angularly and/or translationally so as to allow the introduction of two additional parameters, for further control refinements. These could be parameters of "external" origin such as ambient air pressure and/or temperature which both affect the engine response to fuel delivery rates. Incidently, it is worth mentioning that the existence of ramp R and its adjustability may also be exploited in the previously-described application. The reader attention is called to the fact that the linkage device just described cannot have a dual function, however. Two separate such devices are required in the most general cases in which two different applications are contemplated, i.e. that previously described and the latter just described.

Control System Description Summary:

A total of six control systems have been described and are discussed in the following section. They are: (1) an all-manual system, (2) a semi-automatic/semi-manual system, (3) a minimum specific fuel consumption system, (4) a constant vehicle speed system, (5) an optimum vehicle acceleration system, and (6) an integrated control system which incorporates control options (1), (3), (4) and (5), control option (2) being then deemed of little interest. These six control systems are summarily described in Table D, in terms of the components they require, the connecting thereof and their associated needed signals.

Some of these six control systems use common components, but sometimes in a different manner, whereas some components are used exclusively in one control system. The same applies to some control signals. Abbreviations and letter symbols are used whenever convenient in Table D, their meanings being defined later in footnotes. pPE means "primarily" preferred embodiment and sPE means "secondarily" preferred embodiment, as previously defined.

TABLE D

SUMMARY OF TRANSMISSION CONTROL SYSTEMS

| COMPONENT | Manual (All) | Semi-Auto. and Semi-Man. | Min. $F_{sp}$ (Fully Auto.) | $V_o$ = Cst. (vehicle) (Auto.) | Accel. (Fully Auto.) | Integrated (Fully Auto.) |
|---|---|---|---|---|---|---|
| Ring Actuating System | P & M by E/O | P by E/O M by Q | for all four systems, both ring positions are on automatic control | | | |
| Servo-Fluid System | one pressure level only | | two pressure levels are used in conjunction with shuttle switch | | | |
| Shuttle Switch | not needed | not needed here | see remark above, but needed only if pressure level ranges overlap | | | |
| Torque Reg. | none | IS → M | | engine torque (Q) regulation only | | |
| Speed Gov. | not needed | | on IS | on OS | on IS | on IS & OS |
| Pilot Valve | P & M | P only | ← generally not needed → | | | |
| 3-way Check valve | not needed | | pPE = no sPE = Y | not needed | pPE = no sPE = Y | pPE = no sPE = Y |
| Complying Linkage (CL) | not needed | | not needed | Y (L)* → Q | Y (F)* → Ne | Y for dual use |
| Displ. Rate Sensor (RS) | not needed | | not needed | | Y → p % for both systems | |
| Dash-pot | ← not needed → | | | | Y for both systems | |
| Programmed Element(PE) | not needed | | pPE = no sPE = Y | not needed | not needed if pPE Y if sPE used | |
| Master Switch (MS) | ← not needed → | | | | | Y for Control Selec. |
| Gas Pedal Position p % | ← controlled by E/O → | | | not active | ← partially active only → | |
| Fuel Deliv. Rate (pf) | ← not needed → | | | control by CL | control by RS&CL | RS & CL, if acc'g |
| Controlling Op. Param. | ← p % → | | p %, pPE = Q sPE = Q&Ne | p % & Vo → Na | pPE = p %, pf & CL → Ne, and $r_{p/m}$ → Q | |
| Overall Gear Ratio ($r_{p/m}$) | E/O | P → E/O M → Q | pPE = Q sPE = Q, Ne | control by Na | control by Q | per control used |
| Brak'g Ind. | ← not needed → | | | active | no need | Vo = Cst. |
| Line Switching System | ← not needed → | | | | | Y for Compon. Conn. |

Table D Footnotes and Remarks:
The definitions of abbreviations and symbols not previously defined are presented below in the order by which they appear in the table, reading from left to right and from top to bottom:

| | | | |
|---|---|---|---|
| Auto. | automatic control | Man. | manual control |
| Min. | minimum | Cst. | constant |
| P | pump | M | motor |
| Reg. | regulator | IS | input shaft |
| → | indication that the symbol on the left applies or per- | | |

TABLE D-continued

| | tains to the symbol on the right | | |
|---|---|---|---|
| Gov. | governor | OS | output shaft |
| = | represents correspondence between the two symbols located on either side thereof | | |
| no | not applicable | Y | present and in control |
| (L)* | in locked position | (F)* | unlocked and free |
| Selec. | selection | Deliv. | delivery flow |
| acc'g | accelerating | Ne | engine rpm |
| Na | output (axle) shaft rpm (indicator of a $V_o$ value) | | |
| Op. Param. | operating parameter(s), either engine or vehicle | | |
| Brak'g Ind. | brake-activated indicating and switching device | | |
| Compon. | components integrated in a control system | | |
| Conn. | system of switches and connecting lines interconnecting all control system components. | | |

The contents of Table D represent a condensed and simplified version of this section descriptions and next section discussion of the six automatic transmission control systems presented herein as preferred examples of the present invention utilization. It can best be used and understood after these two sections have been read and studied. Then it will enable the reader to compare the various control systems and immediately identifiy the differences therebetween. It should be pointed out that "not needed" means only that the component or signal is not used for the specific control system to which the note pertains, although it is present or available for use in another system operation mode.

The distinction between pPE and sPE and its significance were previously mentioned. The reader is again reminded that it indicates whether one engine operation parameter (Q) or two engine parameters (Q and Ne) are used for defining a set engine operating point selected to correspond to an engine/vehicle operation mode for which a desirable characteristic (e.g. minimum specific fuel consumption) can be maintained, regardless of extraneous happenings.

Operation and Discussion:

Hydraulic torque converters have been used for a long time. They consist usually of two similar components operating in a reverse fashion, i.e. two pumps coupled in opposition so that the discharge of one pump is forced into the other. The first pump discharges a fluid flow under pressure and is driven by an external power source. The second pump acting as a fluid flow receiver plays the role of motor and transforms the (flow rate)×(pressure) power input into (torque)×(rotational speed) power output available on the motor shaft. The pump and the motor may be separated by an appreciable distance and are connected by pressure lines ducting the fluid. Such lines may be flexible and enable the motor to move with the load it is actuating. In the construction of the present invention, the pump and the motor are close to each other and the pressure lines are short ducts embedded in the rigid structure which houses and positions both pump and motor.

The present invention application is to vehicle propulsion. In most vehicle designs, be they for automobiles, trucks, tanks, etc., space and weight availabilities are usually limited. Reliability and extended trouble-free lifetime are mandatory, from an economical standpoint. However, transversal space in a plane perpendicular to the engine longitudinal axis is not so limited. With piston pumps, the additive combination of piston length and stroke imposes large minimum dimensions on the pump and motor in the direction of the piston motions. These two minimum dimensions add if the piston motions are along axes substantially parallel to the pump and motor (and engine) axes of rotation. Conversely, if the piston motions are along axes radially distributed in planes perpendicular to said axes of rotation, the system transversal dimension (or length) is made quasi independent of the piston stroke/length.

Another consideration affects the system dimensioning, it is that of the interrelation between the following parameters: piston diameters, number of pistons and fluid port sizing, for a given piston stroke. FIG. 1 drawing illustrates this point well. The interdependence between d (piston diameter), Δ (trunnion diameter) and the number n of pistons in a rotor will be obvious to the reader familiar with the art. The piston axes could be positioned in two parallel planes in the rotor in a staggered manner so as to provide room for more pistons of a given diameter about a trunnion of given size, the penalty however would be that the ring tracks would have to be wider. This practically negates such possible advantage. It is assumed thereafter that all piston centerlines are located in the same plane.

Two other dimensions of interest are λ (width of the land separating two adjacent ports 79) and d' (diameter of ports 79 connecting the piston cavities to collecting spaces 81 and 83). For obvious reasons, λ must always be larger than d' which should be as large as possible to minimize the pressure drop through ports 79. The length l of the ports should be minimum so as to minimize diameter D of the ring inner track surface. Diameter D directly affects the height and width of body 50 which should be both kept as small as possible. Readers familiar with the art will undoubtedly realize that d and n, for a given set of nominal engine rpm and brake power, are also related through the power (or torque) that must be transmited which, for a given working fluid pressure, varies as the volume of fluid pumped. For a given piston stroke, this volume varies as $d^2$, whereas d varies as the inverse of n for a given value of Δ. n can be either an odd or an even number. In order to minimize the chance of resonance between pump and motor, it might be advisable to select an odd number and also a different number for the pump and the motor. Numbers such as 7, 9, 11 and 13 are quite representative of possible values for n, for instance 13 for the pump and 11 for the motor. An average of 12, as shown in FIG. 1 is assumed for both, for the purpose of the numerical application given below as an example.

A set of representative dimensions may be determined as follows for a theoretical case where no energy loss occurs and the power transmission efficiency is 100%. An engine brake power of 120 hp is assumed at 5,000 rpm. 1 hp being equal to 550 lbs.ft/sec, pressure being usually expressed in psi and dimensions being measured in inches, the horsepower is expressed in lbs.in/sec in the following. The power to be transmitted is then about 800,000 lbs.in/sec. Again, for the purpose of this exercise, it is assumed that d=1.0 in. and that the piston maximum stroke is about 3.0 in., which means that an average working fluid of approximately 330 psi must be generated by the pump and supplied to the motor. Other dimensions may also be arbitrarily established such as l=0.125 in., d'=0.7 in., piston length: 4.5 in., slip pad dimension sp=1.25 in. and minimum distance between contiguous pistons: between ⅛th and 3/16th of an inch. For 12 pistons, the value of Δ is then approximately 4 in. and the corresponding value of D is slightly more than 18 inches.

The values of 4 and 18 inches may appear high. However, the average pressure level of 330 psi is low and piston pumps can generate much higher pressures by at least a factor of 3 (1000 psi) or even much more. Assuming that the nominal average pressure is 1,000 psi, the product of n by piston-stroke can be lowered by a factor of 3, everything else remaining equal. Seven pistons having a maximum stroke of less than 2 inches can transmit the same power amount. The value of Δ becomes then less than 2.5 in. and that of D is reduced to about 15 inches. The amount of piston lateral guidance at maximum piston extension is kept constant here (1.5 in.) though it could also be reduced proportionately to the maximum stroke reduction. The number of pistons could be 12 and the piston stroke could be reduced to 1 inch. Δ would remain the same, but D would be reduced to one foot. This numerical exercise illustrates how flexible and adaptable the system design is, dimensionwise.

Other considerations influence the selection of piston size, number and strike. They concern the system efficiency and reliability or, more exactly performance repeatability. Examining the drawings of FIGS. 1, 5 and 8 reveals that the "slope" of the "inclined plane" which the piston slip pad must follow is necessarily gentle (angle β) because D is large compared to the piston maximum stroke, in all cases. This means that, for the pump pistons, the wedge-like action of angle β is progressive and efficient, whereas, for the motor pistons, the transformation of a radial force exerted by the piston against the ring track surface into a tangentially oriented, force for torque generation, is not efficient. This explains the need for hydraulically-supported slip pads that are practically friction free. Nevertheless, it is advantageous to maximize the peak value of β which occurs at approximately at piston mid-stroke. The reader will understand that the importance of this problem is magnified at all motor operations for which smaller peak piston strokes are required.

Also, the positioning of ring 76 (value of δ) is accomplished by means which necessarily either display or have a fixed amount of built-in hysteresis, e.i. positioning error. The magnitude of such unavoidable error is almost constant for a quality of production manufacturing. The relative error, the only one of interest here, of course decreases directly as the inverse of the piston stroke, which indicates that minimizing the maximum piston stroke will adversely affect the system repeatability. In conclusion, the value of D will most likely be the largest that the overall external dimensions of the space available for installing the system allow, for a given combination of engine and vehicle. A maximum piston stroke of 2 to 2.5 inches appears realistic for the engine size earlier defined.

A piston guiding length of 1.5 d was earlier assumed at piston maximum extension, which is very conservative. Referring to FIGS. 1 and 8, the reader will see that the piston stroke hardly varies at that time and that the slip track is "parallel" to the rotor outer surface. This means that no, or very small, side forces are then exerted on the pistons. Whereas maximum side forces are created only when the pistons are in mid-stroke position when the pistons guidance has increased considerably. Because the amount of play between piston OD and cavity ID must necessarily be kept small in order to minimize pass-by leaks of pressurized fluid, a minimum guiding length equal to the piston diameter may prove to be adequate. This means a reduction of D by one inch in the numerical case studied above.

Two general aspects of the system construction need be discussed now, before more specific items are analyzed. They concern the piston (and slip pad) creeping rotation and the rotor drive. Referring to FIGS. 3 and 4 it appears evident that the piston/slip-pad assembly is free to rotate around the piston axis. The only restraint opposing such movement is provided by slip pad 74. The only solicitation imposed on the piston for such movement is caused by spring 111, if present. A helically coiled spring develops a small torque when compressed, depending on the spring connection construction. The amount of torque transmitted to the piston can be made negligible by inserting a thrust ball-point adapter beteen the piston internal dome and the upper end of spring 111. The slip pad has a length larger than the piston diameter d and exhibits a curvature along such length, said curvature being forced by the piston outwardly motion to conform with the curvature of the ring track surface. Thus the pad "sliding" surface is coerced into automatically adopting an angular position that enables the piston to extend outwardly as far as possible. Any deviation therefrom will generate a small restoring torque on the slip pad, resulting in a self-aligning condition of the piston/slip-pad assembly. The smaller D is, the more pronounced such action also is. Mechanical angular restraint of the piston or pad is of course possible but seems unwarranted.

In order to minimize fluid leakage, the amount of play between the trunnion OD and the rotor bore ID must be very small, a fraction of a mil (thousandth of an inch). The alignment of shaft 54 (or 56) axis with the axis of its corresponding trunnion cannot possibly be insured with such accuracy. Thus a complying connection between these two components must be provided for allowing misalignments of as much as a few mils. This function is performed by compressible bushings 64 and 65. They are made of elastomeric materials impervious to the working fluid. The rotors may thus freely center themselves on the trunnions and cause the bushings to adapt their shapes for conformance with the positions of points 62 and 63, without exerting excessive loads on the rotor. For all practical purpose, it will be assumed that each rotor is floating freely on its trunnion.

System Efficiency:

The term efficiency here refers to the ratio of ideal power transmitted to that which could be theoretically obtained on the power axle, were it not for the power lost in the form of working fluid leakages through gaps located between cooperating piston cavities. Losses due to frictions, be they of solid or viscous nature, are ignored as being inherently low and thus negligible. Furthermore, for simplification sake, all flows are assumed to be turbulent, although pressurized fluid flows escaping through gaps are most certainly of a laminar nature. However, the assumption is conservative and more than compensates for neglecting other minor energy losses.

For ease of computation, it is assumed that the nominal sizes of the gaps corresponding to clearances (or play between contiguous sliding parts) are 1 mil for diameters and that the piston dimensions are as previously mentioned. The gaps through which working fluid may escape are: (1) between the piston and cavity surfaces, (2) between the rotor bore and the trunnion outer cylindrical surfaces, (3) between the sliding surfaces of the inverter valve (if used), (4) through the restricting orifice arrangement controlling the ring position, and (5) through the restricting orifices used for the slip pad operations. Basically, the unit of power is the fluid flow between one pump piston and one motor piston, the fluid flow loss in the inverter valve and in the ring actuation mechanisms being 2/n for each set of two cooperating pistons. The fluid servo-flow around the slip pad periphery also corresponds to a 1-mil gap, but at a reduced pressure level. The gap areas available for fluid leaks are then:

1. around the trunnions: $2 \times 2 \times \pi \times \Delta \times 0.0005/2$, for 2 rotors;
2. around the inverter valve ports: $2 \times \pi \times d'' \times 0.0005$, for 2 ports;
3. around the slip pad periphery: $4 \times 0.001$, for each pad;
4. ring actuator restricting orifice: $\pi \times (0.1)^2 \times 4/4$, for 4 sets;
5. around each piston: $\pi \times 1.0 \times 0.0005 \times 2$, for a pump/motor pair.

For ease of calculation, the value of $\pi$ is assumed to be 3, the trunnion diameter $\Delta$ is 3.0 in., the diameter $d''$ of the inverter valve ports is 1.0 in., the diameter of a restricting orifice is 0.100 in. and the inner edge of a slip pad cavity 124 is assumed to be 4 in. long.

The total gap area across which full pressure is applied is 0.057 sq.in of which 0.036 sq.in correspond to leak paths around the pistons (major portion). The total gap area across which partial pressure is applied is 0.08 sq.in, if only half of the pistons are exposed to the full pressure at any one time. The sum total of these areas appears large, but includes all gaps or openings available for fluid leakage. The average length of the gaps around the pistons is about 2 inches and the laminar nature of the flow through such passages must be taken into consideration. The equivalent turbulent-flow orifice section area is much smaller, at least by a factor of 5. The size of the restricting orifices controlling the ring actuators is determined only by the response time required of the ring structure, which is not fast. Orifices having half the area assumed above would be adequate in that respect. The volume of fluid pumped at high pressure corresponds to the displacement of 2 inches of an average of six pistons continuously. The leakage flows through the restricting orifices and the slip pad gaps are caused by lower pressure levels, because they are mounted in series with another fixed size restricting orifice. For that reason, it is assumed that the effective areas of these gaps is only ⅔ of the nominal values previously calculated.

Taking into account the three factors just discussed, the sum total of the effective gap areas is about 0.1 sq. in, of which almost half could be further trimmed down, i.e. the slip pad gaps and the restricting orifice sizes. For the purpose of this numerical evaluation, the number 0.1 sq.in will be used. This corresponds to 0.0167 sq.in per pressure-generating piston. At the maximum stroke operating condition of the piston (2 inches), it is further assumed that the ratio of the effective sum total of all gap areas to the cross-sectional area of one piston represents a fair amount of the percentage of fluid flow lost through leak as compared to the flow pumped by the piston per stroke. That ratio is 0.0167/0.786 or 4.7%. The fluid flow lost does not contribute to the production of torque on the power axle. With the assumptions made above, the system efficiency can be estimated at 95%. The nature and magnitude of these assumptions are arbitrary, as the reader will easily understand, however they provide a starting point for further refinement and for meaningful discussions of the criticality of important construction dimension features: i.e. fabrication tolerances and part-matching clearances. It is obvious that the 1-mil nominal clearance value already assumed cannot be increased without additional substantial efficiency losses. For some dimensions, however, it can be decreased. This is discussed later in the next section.

It was assumed that working fluid is used to power the actuators of the ring structures for the sake of expediency. Hydraulic fluid can be used instead. However, the power loss penalty would still be roughly the same. The influence of the fluid leaks ocurring at the slip pad articulations was ignored. As can be estimated from examining the drawings of FIGS. 3 and 4, a clearance of 0.0005 to 0.001 in. between the diameters of axle 120 and of socket 119 restricts the gap available for fluid leakage to a negligible fraction of the other gap areas, though full fluid pressure is applied across it.

As was earlier mentioned, the other losses such as pressure drops through the various channels between the pump and the motor, the internal friction losses within the working fluid due to fluid viscosity, etc., are deemed negligible. The cross-sectional areas of the channels or ducts are made large in order to minimize such pressure drops. The amounts of drag exerted on the slip pads are also minimized by using a "ground-effect" support of the pad and not a viscous oil "wedge". For these reasons a low viscosity fluid is considered, of the type which is used in conventional turbine-type automobile automatic transmissions. Experimental development work and testing will help determine the optimum characteristics of the working fluid best suited for such applications. From past experience with piston pumps used on jet engines for pumping JP-4 up to 2,000 psi, it is felt that fluids having similar viscosity levels would be good candidates and generate negligible pressure losses, and friction in the system.

Clearances, Tolerances and Part Dimensional Matching:

The numerical calculations carried out above indicate that the dimensional matching between two cooperating parts is critical. It would be unrealistic to assume that parts having tolerances of 2-3 tenths of a mil on diameters of 1 to 3 inches can be mass produced at a reasonable cost. They can only be manufactured with larger tolerances and then matched to provide a clearance (or play) of 0.0005 to 0.001 inch between themselves. In the case of the flow-inverting valve, seals could be provided around the ports located on the valve outer cylindrical surface.

Part dimensional matching is thus required for those parts for which the gaps therebetween cannot be sealed, by a sliding O-ring for example. Thus, matching appears mandatory for the pistons and their rotor cylindrical cavities, the trunnions and the rotor bores, and the piston/slip-pad articulations (axle and socket pair). The size of the gap between a slip pad and the ring track surface is determined by two factors: (1) the ratio between the area of the upstream restricting orifice and the size of pad cavity 124, and (2) the ratio between the piston cross-sectional area and that of cavity 124, as is explained further on. At this juncture, it is worth mentioning that the gap area formed by any slip pad (for a given pad/ring separation distance) varies linearly with cavity 124 contour length, but that the pressure created (and needed) inside the cavity varies as the square of that dimension, for a given piston diameter and operating pressure level.

Theoretically, the size of the upstream restricting orifice could be made very small, thus reducing the width of the gap to a fraction of a mil. The cooperating curvatures of the ring track and pad surfaces can be made to match nominally within a few tenths of a mil. However, practically, another consideration arises: that of the dynamic oscillation response of the pad to torque solicitations about its axis of rotation. A detailed analysis of such pad solicitations and responses thereto is beyond the scope of the present discussion. However, it is believed that gaps much wider than 1 mil could also induce unwanted oscillatory motions of the slip pad (chattering). The threshold of such unstable behavior is also dependent upon the angular velocity of the rotor, which sets the frequency of the occurrence of such torque solicitations. Though the ring track surface can be machined to be perfectly cylindrical, it could deform under the action of the radial loads imposed by the pistons. So as to minimize the amount of such deformation, the cross-section of the circular ring structure is shaped like an I-beam. The force diagram of FIG. 8 shows how the piston reactions are applied onto one half of the ring track surface. The drawing of FIG. 1 indicates how well both halves of the ring are supported along their mid-portions. The equatorial portion of the ring structure can easily be given additional stiffness by increasing the I-beam section height, as shown by phantom line H. For all practical purposes, the ring structure can be assumed to behave as an infinitely rigid body, provisionally. The influence of the shape given to the ring track surface is discussed later, in conjunction with a conformable slip pad operation.

It is believed that state-of-the-art part-matching techniques can provide the following clearances between the three types of matching parts mentioned above:

Pistons/Cavities: 0.0005 to 0.0008 inch on a diameter of 1 in.;

Trunnions/Rotor-bores: 0.0006 to 0.0009 inch on a diameter of 2 to 3 in., provided that the attachments (and their construction) of the trunnions to structural wall 51 are properly designed; and Axle-118/Socket-119: 0.0004 to 0.0007 inch on a diameter of possibly about ¼ inch.

These clearances are somewhat smaller than the 0.001-in. value previously assumed in the numerical leakage-flow calculation, the results of which can be interpolated down by the ratios of the clearances. It is assumed that pistons 101 are equipped with sliding seals, which means that, except for the consideration of actuator time responses as previously discussed, restricting orifices 101' could be made quite small. The major contribution to working fluid flow leakage thus becomes that which is needed for the pad sliding operation. That specific subject is discussed below.

Conformable Slip Pads and Ring Track Surface Shape:

As a rule, the ring track surface needs not be perfectly cylindrical. For manufacturing reasons, at first glance, it appears logical to give it a cylindrical shape. However, it may prove advantageous, functionally, to give it a shape which deviates from that of a perfect cylinder. Furthermore, it may not be necessary to provide such "non-cylindrical" shape by means of complex and costly machining, but it may be possible to cause such desirable shape to result from preprogrammed deformations starting from an ideal cylindrical surface, under nominal loading conditions.

The schematic diagram of FIG. 28 and the curves of FIG. 29 illustrate the influence of the track surface shape on the relationship between piston travel, at the ring maximum stroke position, and piston (or rotor) angular displacement. In FIG. 28, point 0 represents the start of a piston stroke (motor) or the end of a piston stroke (pump). Circle C represents the profile of a cylindrical ring surface, whereas curve NC (non-circular) represents the profile of an adjusted ring surface which yields a possibly more desirable piston displacement characteristic, as a function of the rotor angular displacement $\alpha$. It is assumed here for the sake of simplicity that the slip pad angular position does not affect the piston radial displacement and that the pad sliding surface would follow circle $\Gamma$, if the pistons were not caused to extend outwardly. Circles C and $\Gamma$ are tangent at point 0, but any distance between them such as $\Sigma$ (piston travel) represents the piston partial uncompleted stroke, or radial displacement.

The variation of $\Sigma$ as a function of the rotor angular displacement $\alpha$ is shown in FIG. 29 as curve Y for circle C. Circle Y is not a sinusoidal curve (illustrated by solid line S for reference). It might be desirable to impose on the piston a displacement as a function of $\alpha$ that corresponds to curve X for instance. To obtain such a relationship between $\Sigma$ and $\alpha$, the profile of the ring track surface must then be changed from circle C to curve NC. When the piston has reached a position for which $\alpha = 3\pi/4$, having revolved about point $0_r$, the piston end has moved a smaller angular amount $\psi'$ with respect to the track surface, about center $0_s$ of circle C, which explains two characteristics of interest: (1) the dissymmetry of the piston travel curve Y, and (2) the fact that a larger number of pistons push on the ring in the left quadrant than in the right quadrant. The importance of the second characterstic is discussed in a later section. Its existence is inherent to the arrangement and cannot be significantly altered. The first characteristic can easily be modified though by changing the ring track surface shape, i.e. C becoming NC.

For a piston position where $\alpha = \pi/2$, the piston travel difference $L'-L''$ of FIG. 28 is represented in FIG. 29 by $\Delta L$. In both cases of curve S and X (symmetrical curves), $\Delta L = 0$ and midstroke happens when $\alpha = \pi/2$. It is not known how desirable a characteristic such as that represented by curve X (and curve NC) might be. However, it is of interest to point out that the portion of the ring where the deviation between curves C and NC is maximum occurs roughly at mid-quadrant where the ring structure can most easily be rendered structurally most deformable.

Whether the ring track surface is made to assume the NC contour profile by construction or by means of preprogrammed structural deformations, edges 258 of the side guard plates and edge 126' of vane 250 constantly drag on the track surface. The total force exerted by these edges on the track is small by nature, but it is nevertheless important to minimize the amount of the drag force generated thereby, for two reasons:

firstly edge wear and secondly energy loss through solid friction. The first reason is the most important by far. The likely material for these parts is carbon-fiber reinforced graphite which provides low friction and will not gall or damage the track surface.

The gap areas created by the clearances between these graphite parts are negligible. The only gaps left, of any significance, are those between lands 261 and 262, and surface 76. If a nominal clearance of 0.001 inch is assumed, for a land length of 1 inch, the total gap area is 0.002 sq.in., or half of the value earlier calculated for a non-conformable slip pad. However, the reader familiar with the art will understand why conformable pads are more effective in their generation of a restoring torque. Thus it would seem that a nominal average clearance of 0.0007 inch will provide here the same pad attitude control as a 0.001-inch does in the case of a non-conformable slip pad. Also, the solid friction provided by the side guard plates in their sliding against their groove outer restraining face will help minimize the possibility and/or extent of pad chattering. As earlier mentioned, such a feature contributes to allowing a safe decrease of the size of the restricting orifices controlling the pressure in cavities 124' and 124". A concomitant decrease of fluid servo flows results, thereby reducing one of the major contributing factors to power transmission efficiency losses.

Slip Pad Operation and Ring Loading:

The schematic diagrams of FIGS. 5, 8 and 28 are of most interest for the discussion of these two subjects. FIG. 5 presents a diagram of the forces acting and reacting on a single slip pad and FIGS. 8 and 28 indicate how these forces combine to act as a whole on the ring structure. It is assumed hereafter that: (1) the pistons only transmit the action of the pressure existing inside their housing cavities, (2) the same such pressure exists in each such cavity and is applied only in one of the two fluid collecting cavities of each rotor, (3) side friction between piston and cavity guiding wall is negligible, (4) side loads exerted on piston and cavity walls are normal to their surfaces, (5) all of the pads slide frictionlessly on the ring surfaces and the loads exerted therebetween are consequently also normal to said surfaces, and (6) the piston/pad articulations are frictionless.

In FIG. 5, all forces are assumed to be applied at the center of such articulation. Forces shown in solid lines pertain to a pump pad/piston, forces shown in phantom lines pertain to a motor piston/pad. Piston/pad indicates that the piston pushes the pad toward the ring and in so doing creates a torque applied on its rotor, whereas pad/piston means that the pad forces the piston inwardly to generate working fluid pressure and for so doing requires a torque from its rotor. Angle $\beta$ corresponds to the inclination of the track surface with respect to a circular path p as previously indicated and is shown to have the same value for pump and motor, for simplicity sake. The reader understands that the apparent inclination of the track surface does not vary much between points 0 and 0" (FIG. 28) for either a NC or a C surface. However, it changes direction at both points 0 and 0" in both cases. Consequently, the direction and amount of tilting of the pad plane of symmetry with respect to the piston centerline also remain the same between 0 and 0" and reverse themselves at these two points. This means that the pad/surface reaction is applied slightly ahead (relatively to the direction of rotor motion) of the intersection line of such plane with such 76, in the case of pump pistons. Conversely, the corresponding reaction of a motor piston pad is applied slightly behind the intersection line, which means that, in the forward drive condition, the ring surfaces appear as C for the pump and C' for the motor in FIG. 8 schematic. The torque related side forces thus have the same direction in FIG. 5, one corresponding to an action on the piston by the rotor (pump), the other corresponding to an action of the piston upon the rotor (motor). To facilitate identification, the magnitudes of these forces are assumed to be different.

The following discussion pertains to a pump piston. The similarity between the two sets of forces is graphically maintained by calling each corresponding force for pump and motor the same, differentiating between them by means of a ['] index for the motor piston. All forces are applied at point 0 which represents the articulation center (FIG. 5). Force $F_t$ is the resultant of all forces exerted on the articulation. Force $F_a$ is an axial component thereof and force $F_s$ is the side component thereof which impels the piston to revolve about the rotor axis. $F_s'$ is the side component of $F_t'$ that produces the motor torque. The relationships of interest between these forces are: $F_s = F_a \tan \beta$ and $F_5 = F_a/\cos \beta$. The magnitudes of $F_t$ and $F_t'$ are of prime importance because they determine the amount of radial loads applied on both rings, thus the stresses and deformations resulting therefrom, all directly functions of the fluid pressure level and angle $\beta$. In the schematic of FIG. 8, each elemental force $\Delta F$ corresponds to a force $F_t$ of FIG. 5.

At this juncture, it must be pointed out that points such as $0_f$ where forces $\Delta F$ are applied are not equidistant and that the distance between them increases with the value of $\delta$, for a given value of n and ring diameter. All vales of $\Delta F$ (or $F_t$) are identical at any given time. The sum total of all forces $\Delta F$ represented as $\phi$ thus generally does not pass through the center $0_s$ of circle C, most likely not through the center $0_r$ of the rotor and is not perpendicular to line 0-0" of FIG. 28, although it is shown otherwise in FIG. 8, for expediency. An exact determination of the magnitude and orientation of resultant $\phi$ is well beyond the scope of this disclosure, but in general terms the following applies: (1) as $\delta$ increases, an actuation force F of increasing magnitude is required to counteract an horizontal component of force $\phi$ that results from a higher concentration of forces $\Delta F$ on the right upper quadrant of the pump ring of FIG. 8, (2) the vertical component of force $\phi$ is reacted by structure 94 of FIG. 1 and the system body structure by means of track 90, (3) the uneven hoop loads applied onto the ring upper half structure produces a complex loading of the lower half which contributes to minimizing the deformation of the upper half, and (4) the ring deformation must remain small but could be programmed by dimensioning and shaping the ring structure cross-section once an exact determination of the hoop loads and of the variations thereof has been made. If a flow-inverting valve is used to change from forward drive to reverse, the pump ring loading remains the same, but the motor ring loading goes from the ring upper half to the lower half. If a flow-inverting valve is not used and a reversal of the pump or motor actuation is used instead (circle C' of FIG. 8), the ring loading remains applied to the same half of the ring, but the loading density distribution is inverted. The implications thereof are discussed in another section later on.

Ring Structure Actuation:

Two basic actuation systems were previously described, one uses a power-piston and reacting-spring configuration (FIG. 7) and the other opposes two identical power-pistons (FIG. 1). An analysis of the actuating forces developed by both is first conducted. To simplify the analyses and for easy comparison, only one set of actuator is taken into consideration. Also, in both cases, the diameters of common components are identically called. The piston diameter is D and the piston stem diameter is d, the constant full pressure is P and the variable servo-pressure (between restricting orifices) is P'. The simplest case of the piston/spring arrangement is first analyzed.

Piston/Spring Actuating System:

Force F' developed by the spring varies linearly with piston 101' displacement. A net force F needed for positioning the ring structure 77 is force F of FIG. 8, and is the difference between the net pressure force acting on the piston and F'. Equilibrium state yields equation $F = \pi D^2 P/4 - \pi(D^2 d^2)P'/4 - F'$. It can be rearranged as: $F = \pi[D^2(P-P') + d^2 P'] - F'$ (1). This means that, as P' becomes a smaller fraction of P, $d^2 P'$ becomes smaller and $D^2(P-P')$ becomes larger. The proper combination of the value of ratio D/d and of the variation of F' with piston displacement establishes a direct and singular relationship between P' and F. It was earlier mentioned that another direct and singular relationship existed between F and the ring structure position, or of piston 101'. In conclusion, for a given constant pressure P, this actuating system imposes one set ring position (or value of δ) for each value of P' lower than P.

Opposed-Piston Actuating System:

With the same assumptions, an equation defining a state of equilibrium can be derived. No spring is used and the volumes on either side of pistons 101 are interconnected as shown in FIG. 8 and full constant pressure P is generally applied on neither side of the piston. Servo-pressures P' and P'' are applied on opposite sides of the pistons, but inverted for each piston. With these conventions, the resultant F of all the pressure forces acting on the two opposite pistons is given in the equation below: $F = \pi(D^2 P' - d^2 P'')/4 - \pi(D^2 P'' - d^2 P')/4$. Simplifying and rearranging the terms yields: $F = \pi(D^2 + d^2) \times (P' - P'')/4$ (2). Equation (2) shows that F is equal to the pressure difference (P'−P'') multiplied by a constant. If P'=P'', F=0 and δ=0. As (P'−P'') is caused to increase, so do F and δ. In this case again, the ring structure position is singularly determined by the value of two servo-pressures. As was earlier described, their variations are coordinated and synchronized so that their difference is directly and singularly determined for each given position of their monitoring valve.

System Comparison:

Neither system is a positive positioning device. The performance of either system depends on the relationship between F and δ being invariable. It was earlier demonstrated that F varies with $F_t$ (or ΔF), which, in turn, varies as $F_a$ which is proportional to the working fluid pressure P. It can be presumed that the values of P' and P'' also vary in proportion with P. This indicates that, as a first approximation, if working fluid is used as hydraulic fluid, and at the same pressure P, variations of P may be ignored and will not appreciably affect the system performance in the second case. Working fluid at pressure P is tapped at location 290 in oulet duct 86, upstream of inverter valve 108 if used, as shown in FIG. 2, channelled to control system 300 of the transmission system, then to the actuating mechanisms of rings 77 and 78 (FIG. 10). Thus, this arrangement replaces the independent hydraulic fluid system depicted in FIG. 8 previously described.

However, in the first actuating system case, the presence of spring force F' in equation (1) indicates that the same does not apply here. F' is proportional to and varies exclusively with δ. Thus, the values of F and δ are not singularly related. An element of uncertainty is then introduced. It is beyond the scope of the present disclosure to determine the significance of such uncertainty. For that reason, although slightly more complex, the opposed-piston actuating system seems preferable at this point. For discussion purpose, the actuating system represented in FIGS. 1 and 8 is used later as the model used in the analysis of a typical control system for the ring actuations. In FIG. 8, this means that high pressure line 291 connects to valve 136 and components 140, 141, 142 and 143 are eliminated.

Another possibility for adjusting the ring structure position is available. It is predicated on a positive positioning, the influence of P on the exact ring position being recognized, accepted, but neglected as small and inconsequential. It uses the piston/spring approach, a separate hydraulic fluid system (FIG. 8) and is based on the assumption that the forces developed by both spring and piston are appreciably larger than the ring reactions. Two remarks need be made here: (1) hydraulic fluid pressures can easily be regulated at a constant level much higher than the variable working fluid pressure, and (2) the values of force F may prove to vary too erratically to be the most desirable means for determining the value of δ. The first remark indicates that, without inordinately increasing the size of piston 101', much larger actuating forces can be generated with the use of hydraulic fluid, in opposition to much larger spring forces, thereby minimizing the influence of force F magnitude and variations thereof. The second remark indicates that any feedback effects between P, F and δ are rendered negligible. The latter could prove very advantageous in the case of a manual control of the torque ratio (i.e. "gear" ratio) adjustment. This approach is used as a model for the manual control discussion.

Torque Regulator Operation:

As a general rule, it seems that torque regulation is of interest only as it applied to the engine torque. However, the engine torque can be affected directly by ring 77 as well as indirectly by ring 78, by means of the working fluid pressure. It is therefore assumed at this point that torque regulator 155, though mounted on the engine power shaft, can be used to control servoflows of ring 77 or 78 actuating mechanisms. The following discussion applies to either case.

The typical torque regulator shown in FIGS. 13–15 uses a mechanical approach to torque sensing and signal generating. Identical results could be obtained with an electrical/electronic design. In either case, the torque transmitted by shaft 54 is indirectly measured by means of the shaft torsional deformation. In a mechanical approach, this angular relative displacement must be large enough to provide an accurately measurable movement. In an electrical/electronic approach, the use of strain gauges enables stress level detection accurately with minimal shaft torsional relative displacements, and the shaft itself can be used to support the strain gauges. Electrical connections with the gauge leads by means of slip-joint is state-of-the-art. However, amplification of gauge signals is needed and transformation of electrical outputs into mechanical outputs is still required. FIG. 13-15 mechanical configuration is preferred for illustrating the role played by the torque regulator in the power transmission system control. This should not be construed as a limitation inherent to or imposed on the present invention.

The torsional deformation of a typical engine power shaft is characteristically small as the engine torque varies between extreme values. In addition, the shaft rotates. Means for amplifying these deformations and for transforming such rotating deformations into non-rotating displacements of an easily accessible mechanical part is illustrated in FIGS. 13-14. The angular deformation is mechanically amplified by means of either a helical torsion spring (191) or a torsion bar (191'). Two basic differences between the operations of thse components are self-evident: (1) helical springs yield large angular displacements for a set torque variation, but also produce either an axial force/displacement or both as the transmitted torque varies, and (2) torsion bars produce negligible axial forces and displacements with torque variations and that can easily be eliminated by means of slidable splines located at either end of the torsion bar, but yield small angular deformations, much too small for practically providing the mechanical amplification needed.

The advantages of each approach is exploited here while the effects of the drawbacks are minimized. Incidentally, the so-called "helical" spring is not really a single free spring but consists of a plurality of springy structures formed by cutting helically shaped parallel through-grooves (or slots) in a cylindrical sleeve 295 between stations such as 293 and 294, all shown in phantom lines. Sleeve 295 is terminated by a plurality of stubs 296 and 297 for engagement with cooperating holes in the bottoms of concentrical cooperating structures 192 and 193. Two concentrically-positioned sleeves 295 properly dimensioned but having reverse helically-cut grooves can be used, so that: (1) as the torque direction is reverse (case of engine braking) or magnitude varies, the net axial force exerted by the spring system and its length remain constant, by causing the two springy sleeves to be pre-torqued in opposite directions, and (2) the spring assembly operates as a torsion bar and behaves as such, while yielding much larger angular deformations for a given applied torque and the same peak stress level. In such instance, flat thrust bearing 199 is not required and the dual-sleeve assembly can be axially "free-floating" mounted, as would be a torsion bar.

The combination of mechanical amplification and transformation of angular into linear displacement is illustrated in the drawing of FIG. 14, where it is assumed that helical spring deformations are much larger than those of a torsion bar. This basic difference is reflected by the angular orientation of slot 198. The transformation between the two displacements need not be reversible, but repeatability is essential and slack between stubs 197 and the sides of slot 198 is to be minimized, but impossible to eliminate altogether. The inclination of slot 198 with respect to the system axis can easily be set at 20-25 degrees (line 203) and 65-70 degrees (slot 198), which would provide an adjustment in amplification ratios as high as 7/1 to 8/1, without noticeably affecting the system performance.

Another method of altering the amplification ratio is provided by the linkage system depicted in FIG. 15 which is used to manually adjust the level of regulated torque. To that effect, the positions of articulations 204 and 205 with respect to articulation 207 can be inverted. Such inversion can easily provide a fourfold variation in the amplification ratio. The reader familiar with the art will easily understand that the configuration and design flexibilites mentioned above provide adequate means of compensating for the much different angular responses of torsion bars and "helical" springs. Because the amount of slack either caused by wear or necessarily built into mechanical devices, it appears that, at the detection point, the amplitude of the detected deformations should be maximized, which favors the spring system. However, the introduction of sizable elastic shaft angular deformations, which vary as a function of torque level, between the engine and the transmission, could have detrimental effects on the behavior and performance of the transmission system and of its control system. Such effects can only be speculated on at this juncture, but are mentioned here so that a reader familiar with the art will appreciate the value, advantages and limitations of the two choices offered and discussed here.

Speed Governor Operation:

The present power transmission system can utilize one or two speed governors, either for vehicle speed or engine rpm control, or both. The reasons why and the manners in which two speed governors can be used simultaneously are elaborated on later. Also the manners in which the governor actions are integrated in the control system are discussed further on. Suffice it to indicate now that the speed regulation of either shaft (54 or 56) may be used to control the position of either ring 77 or 78. The point of interest here pertains to the possibility of using one shaft speed to control the positions of two rings, independently.

If needed, a speed governor can be installed between the outer left wall of body 50 structure and rotor 67 as is shown in FIG. 16 in the case of shaft 56 speed governor 156. Such governor might serve to regulate the rotational speed of the engine power shaft, as this may prove advantageous, as discussed later. In addition, a second speed governor can easily be incorporated in parallel with governor 156. This second governor also senses the rotational speed of shaft 56 but can be made to regulate either ring actuation mechanism at a speed level quite different from that which the first governor regulates.

This is simply done by having a second set of ducts and conical bores such as 213 arranged in a plane orthogonal to that of FIG. 16. A second adjustably variable restricting orifice such as 221 can then be used to control any other function served by this second governor. An example of possible use of this second speed governor could be that of an override-type of system. More details are given in the forthcoming control system section.

Reverse Drive Operation:

As all conventional power transmission systems do, the present invention system must also provide the capability of rotation reversal of drive shaft 56, so as to enable a vehicle operator to drive in the equivalent of reverse gear. Examining all possible variations of pump/motor coupling reveals that either the direction of some fluid flows can be reversed or one ring structure can be caused to move in the opposite side (negative value of $\delta$). Combinations of both are possible and in some instance necessary. The table below summarizes four possible practical approaches.

TABLE A
SPEED REVERSAL CONFIGURATIONS

| Condition | Ring Positions | Flow-Inverting Valve | Remarks |
|---|---|---|---|
| Direct Drive | Both on same side | Optional | Nominal |
| Reverse | Both on same side | Valve Needed | Stops* |
| Reverse | Motor Ring Shifts side | No Valve | One Stop |
| Reverse | Pump Ring Shifts side Motor Ring Unchanged | Dual Valve Needed | Least Attractive |

*means that the rings are prevented from changing side.

Obviously, the second and third alternative are simplest and of most interest for providing reverse speed operation. The fourth alternative is most complex and of least interest. Thus, the first two approaches to speed reversal are discussed below. The similarities and differences between the two are summarized in Table B below, for easy comparison.

TABLE B
SPEED REVERSAL CONSTRUCTIONS COMPARISON CHART

| Items | Flow-Inverting Valve | Position-Inverting of Motor Ring |
|---|---|---|
| Ring Structures | Remain on one side (two positive δ's) Null-Stop/both sides | Pump Ring remains on one side, Motor Ring on either side - One Null-Stop (Pump Ring) |
| Ring Actuating Mechanisms | Same Construction for Pump and Motor Rings | Dual-Stroke capability for Motor Ring System |
| Ring Track Contour Shape | Need not be circular (Pump and Motor alike) | Motor Ring should be circular |
| System Outer Body Dimensions | Minimum Space required | Motor side must be wider |
| Control System Connections | Remain the same for Direct Drive and Reverse | Must be adjusted for the Motor Ring |

It is self-evident that the ring actuating pistons reach a stop at the ends of their travels, which fixes the maximum value of δ, not of a critical nature. However, the minimum of δ cannot be left to be established by chance, based on a favorable stack-up of manufacturing tolerances. The null-stop mentioned in Table B refers to an adjustable mechanical stop which sets the minimum value of δ, if a ring is actuated only on one side of the neutral point (i.e. zero travel for a rotor piston). This is not the case if a ring must travel on either side of the neutral point, in which instance no positive null-stop is possible. Adjustable provisions may be made, though, to ensure that such a ring can be prevented from erring about its neutral point unless positively solicited to move in either direction by its actuating system. The reader is reminded that any torque exerted on or by a rotor automatically prompts that rotor to return to the position that will minimize the torque magnitude, if a working fluid pressure is either generated or sensed by the pistons of that rotor, although such behaviour should obviously not be left to chance.

The inversion of the servo-flow directions in the actuating piston control-fluid lines can be performed by a smaller and simpler valve than valve 108. It needs not be described or discussed in further detail. Suffice it to indicate that the connections of the servo-pressure lines to cylinders 102 from control valve 136 must be inverted so that pressure P' and P" are reversed. As indicated by equation (2), the sign of force F becomes inverted, which means that force F is then applied in an opposite direction. The motor ring is then forced toward circle C' (position 77") and the motor rotor reverses direction, from f to f' (FIG. 8). If a piston/spring system is used (FIG. 7), provided that spring 131, the piston and its cylinder are all properly designed, inverting the two pressure line connections 133 and 135 has the same effects. It is worth pointing out at this juncture that, in reverse "gear", the motor characteristics need not be a mirror image of those typical of forward drive. This particularly applies to a piston/spring actuating system.

Engine Braking:

To increase the lifetime of brake linings, it is useful and sometimes mandatory to use the engine braking technique during vehicle deceleration or on long down grades. In such instances, the energy is provided by the vehicle, transmitted to the engine and absorbed thereby. This means that the motor then operates as a pump, whereas the pump turns into a motor. Obviously, the motor and pump rotors should not and cannot reverse their rotation directions, being directly solidly connected to shafts 54 and 56. For reverse "gear" operation, either one of two construction features must be provided: (1) a flow-inverting valve, or (2) a position-inverting actuating mechanism for the motor ring. Although it might be tempting to use either one to assist in engine braking during forward motion of the vehicle, this is not quite possible directly and a short analysis of the available possibilities is needed at this time.

Referring to FIG. 2 drawing, one sees that in direct drive, duct end 87 is the pump inlet duct end 86 is the pump outlet, duct end 89 is the motor inlet and duct end 88 is the motor outlet (return to sump). During engine braking, the motor becomes a pump and the pump becomes a motor. If a flow-inverting valve is used for reverse, both rings must remain on the same side. Thus, duct end 86 becomes an outlet (to sump), duct end 87 serves as a high pressure inlet, duct end 88 is then a high pressure outlet and duct end 89 must be an inlet. This requirement is quite different from that of reverse, which incidentally corresponds to the fluid flow changing from 87-86—89-88 to 87-86—88-89. Such representation means that "-" is an internal connection through pump or motor and that "—" is an external connection between either of those two members. If no flow-inverting valve is used for reverse, but a position-inverting ring is used, the duct and connections must be as follows if the ring position-inversion is to be utilized of: 88-89—87-86. However, if the position-inverting feature is ignored, the situation is identical to that previously mentioned in which the rings remain on the same side and flow-inverting is not being used. To keep the system simple and analogous in operation to that of a gear-shift car operation, it is assumed that the vehicle operator takes an action similar to that of down-shifting gears, by causing a second flow-inverting valve to change the nominal 87-86—89-88 end duct connections to 89-88—87-86, without interfering with the "gear"-reversing system available, be it of either kind. The commands for actuating such a "brake-valve" may be either manual or automatic. If manual, it is up to the operator to use it as he (she) would use "gear" downshifting. If automatic, this action could be taken by the control system in response to a signal generated by a brusque torque or working fluid pressure change.

It should be noted that, if working fluid pressure is utilized for actuating the ring pistons, the servo-fluid pressure cannot be allowed to vary drastically and for an appreciable length of time. Otherwise, the power transmission control system would not operate properly. It was earlier indicated that the servo-fluid supply is tapped from duct end 86. However, during reverse and/or engine-braking operations, the high pressure fluid source disappears from duct end 86 as previously discussed. Depending on the flow configuration resulting from either altered mode of vehicle operation, high pressure fluid is still available in either duct end 88 or 89. To simplify matters, the high-pressure working fluid is tapped from a small common chamber connected to duct ends 86, 88 and 89 by channels such as 290. A check (or one-way) valve is inserted between each tap hole 290 and the common chamber, so as to insure that high pressure fluid is always present in that common chamber and that no fluid leaks back through either one of channels 290 connected to duct ends in which only fluid boost pressure then exists.

Another matter related to engine-braking or the equivalent thereof needs be addressed also. It corresponds to the operation condition in which the operator releases the power demand lever/pedal, so as to let the engine reduce its speed to idle eventually, as the gearshift is left in high gear. A minimal amount of engine-breaking then takes place, though the operator has not yet down-shifted. In such event, the engine cannot produce torque or should not be expected to and appreciable engine-braking may be then totally unwarranted. However, the motor could become a pump and generate high pressure in duct end 88. To such effect, it is necessary to create a flow restriction in duct 106, if a braking action is desired by means of fluid flow throttling. An adjustable size restricting orifice is caused to be inserted in duct 106 when the power demand level reaches the idle position, e.g. foot taken off the gas pedal. The area of this throttle valve orifice and the stroke $\delta_a$ of the motor ring structure may be adjusted coordinatingly by the transmission control system so as to provide an optimum and gradual rate of braking by the motor member. This should only be considered and used as a gap-bridging momentary action, not meant to replace true engine-braking, unless additional provisions are made to cool the working fluid in a very effective manner. In such an instance, the fluid throttling may be coordinated with the action of the vehicle brakes by means of the transmission control system.

Especially when the working fluid is also used as "hydraulic" fluid, provisions must be made that a minimum flow at full pressure is delivered by the pump, and the motor if the position-inverting construction feature is not present, at idle speed. This can be easily provided by the null-stop adjustment and be in an amount such that, at idle speed setting, slightly more fluid is pumped than is required to compensate for the leaks and the servo-flows. In addition, the rings of both members, pump and motor alike, should always be prompted to increase the $\delta$ values, so as to cause the system to prime itself, even in case of failure of the boost pump. This is not practical in the case of the piston/spring actuating mechanisms, but very much so in the case of the opposite-piston system. To that effect, a weak spring, much weaker than spring 131, may be used to constantly push the ring toward a position of maximum eccentricity. The weak force exerted by such spring only causes a slight adjustment in the levels of pressures P' and P" of equation (2).

Actuating-Mechanism/Ring-Structure Connection:

In the schematic representation of FIG. 1, the pistons and the stems attached thereto are shown rigidly connected to rings 77 and 78 for the sake of graphic simplicity. Because of manufacturing considerations, it should not be so. A practical design approach is to break the actuating member into four basic parts, a rod or stem connecting one piston to its opposite counterpart, a set of two pistons equipped with sliding seals and a rod mounting ring device for axially locking the rod to the ring structure. Each ring may be bored as depicted by phantom lines 298, at the top of FIG. 1. Locking pin 130 arrangement shown in FIG. 7 can be used here also as an example of a typical satisfactory attachment. A pin 130 is locked in the stem and is caused to engage slots 299 cut into the ring structure. Such type of connection allows some slack in a plane perpendicular to the stem axis, but none axially so that the assembly of pistons/stem/ring still moves as one unit and insures a slack-free positive positioning of the ring.

In such an arrangement, the two stems located in diametrical opposition with respect to the ring may allow a small degree of transversal leeway to the ring. This amount of lateral slack is limited by the amount of clearance provided between the stem diameters and the bore 298 diameters. It is no more than the amount required to satisfy the tolerance stack-up requirements imposed by well known state-of-the-art manufacturing techniques.

Engine/Vehicle Performance Matching:

As alluded to in the description section, one of the roles of an "infinitely"-varying-ratio automatic power transmission of a vehicle is to enable the engine to operate under conditions for which the specific fuel consumption is kept at its minimum value, regardless of the actions of the operator and/or response of the vehicle. First, an analysis of the ideal engine/transmission/vehicle interaction and inter-response is presented so as to establish the foundations and bases for a quasi-ideal transmission control system.

The curves of FIG. 18–20 graphs are used as typical models for characterizing the standard coupling of internal combustion (IC) engines and automobiles. It is assumed that external combustion (EC) engines will yield similar characteristics, except for the specific fuel consumption which should be less sensitive to engine rpm's than it is for IC engines. Typical EC engines utilizing free-piston combustors are described and discussed in my U.S. Pat. Nos. 4,399,654 and 4,561,252, and numerous pending applications, namely No. 789,451 (10/25/85), now U.S. Pat. No. 4,653,274, 866,946 (5/27/86), now U.S. Pat. No. 4,665,703, 780,961 (9/27/85), now U.S. Pat. No. 4,653,273, 866,944 (5/27/86), now U.S. Pat. No. 4,702,205, 866,945 (5/27/86), now U.S. Pat. No. 4,672,813, etc. . . . where (x/y/z) represents the application date.

For the purpose of this discussion, it will also be assumed that Diesel engines have charateristics similar to those of gasoline engines, though their torque and specific fuel consumption vary differently with rpm, as is indicated by the differences indicated between curves $\rho$ and $\rho^*$ (Diesel) of FIG. 18. The differential between power demand (point a) and power available for a Diesel-powered car (point b) and a gasoline-engine-powered car (point c), during a vehicle acceleration, is large. It means that cars powered by Diesel engines: (1) are appreciably more sluggish than cars using gasoline, and (2) need a large number of gears. The above would probably also apply to vehicles powered with gas turbines. Because the number of gear ratios optimally required of the gearbox is of no consequence here, in FIG. 19, a three gear-ratio gearbox is portrayed by the solid curves representing torque variation as a function of power axle rpm.

Using a gasoline engine as a model for representing the power source of an automobile, the graph of FIG. 18 also indicates that the torque peaks corresponding to nominal design point M do not occur at a fixed engine rpm value as the "loading" level of the engine varies. Line L indicates how these torque peaks vary as a function of engine rpm, the half-load point being shown as reference. Also, the minimum of the specific fuel consumption curve does not occur at the engine rpm corresponding to the torque peak point, but at lower rpm values. Again, in order to simplify the discussion, two assumptions are made as they pertain to optimizing an ideal automatic transmission: (1) during steady-state engine operating conditions, the engine should operate at a regime that yields near-minimum specific fuel consumption, (2) during vehicle accelerations, the engine should operate under conditions that maintain the engine torque near its maximum for the engine loading corresponding to the power demand made by the operator, e.g. the foot pedal setting.

The curves of the graphs of FIGS. 19 and 20 show how these assumptions and the results thereof may be graphically illustrated, in the case where a continuously-variable gear ratio is provided. In FIG. 19, curve A represents the variations of engine torque, corrected by the gear-ratio (normalized), with power axle rpm (equivalent to vehicle velocity). Points a, b and c correspond to the optimum engine operating points at the three gear ratios selected for the gearbox of that vehicle. In the intervals a-b or b-c and/or beyond, the engine cannot operate at its peak torque. The torque variations as a function of axle rpm corresponding to off-optimum engine operation are not shown, but deviate from the solid line curves. However, if the gear (torque) ratio is allowed to vary automatically so as to maintain an optimum operation of the engine at peak torque, for all axle rpm values between $N_1$-$N_2$ and $N_2$-$N_3$, or beyond, as exemplified by points d or e, the ratio between $N_e$ and $N_a$ (or $Q_a$ and $Q_e$) must be adjusted so that points d and e are aligned with points a, b and c of curve A. Thus, during either accelerations or steady-state operations, the engine is operating at the peak torque of that engine loading. In order to enable the transmission control system to differentiate transient conditions from steady-state engine operating conditions, if specific fuel consumption is also to be minimized during steady-state operating conditions, means are needed by the control system for determining under which type of conditions the engine is expected to operate. This can best be achieved by comparing the vehicle actual speed to the speed demanded by the operator, if automatic speed control is present. If not, this can also be done by comparing the actual torque value to that which the operator is demanding. Assuming, for the time being, that all these construction features are available, one can depict how the various parameters characterizing a continuously-varying matching of engine/vehicle performance will vary with time.

This is represented in FIG. 31 graph as a function of time by curves depicting the variations of these parameters between times $T_0$ and $T_1$ (acceleration), $T_1$ and $T_2$ (steady-state), and $T_2$ and $T_3$ (deceleration). In addition to the parameter definitions previously presented in the preceding section, $\Delta$ and p require an extra elaboration. $\Delta$ represents the difference value mentioned above between "actual" and "demanded", be it of vehicle speed or engine torque. p represents the operator's power demand, in whatever form: fuel flow rate (Diesel), air flow admission rate (carburetor) or air-flow/fuel-flow rate ratio (EC engine). For ease of representation, the change of p is shown as being instantaneous, at times $T_0$ and $T_2$.

The differences in response time that normally exist between Diesel and gasoline engines are again ignored for expediency sake. During the deceleration phase, engine braking is assumed to take place at a rate which produces the maximum braking effect. Each parameter and the variations thereof represented by each curve can now be discussed separately.

The case of a typical acceleration from a vehicle coasting velocity of 15 mph to a cruising speed of 60 mph immediately followed by a deceleration of 60 mph down to 15 mph again is used as model for discussion purpose. During the deceleration phase, the operator does not use the brakes, only optimum engine braking. Position-reversing of the motor ring is not used for engine braking. The time periods 0-$T_o$, $T_1$-$T_2$ and $T_3$+ correspond to steady-state operations, i.e. 15 mph, 60 mph and back to 16 mph respectively. $\Delta$ has a null position (0) in the middle of its range, and a and d share the same abscissa line, for easy reference, they are further identified with the signs + and −. It is assumed that an operator first increases p from the 15-mph level to the max. position, then reduces p at time $T_1$ to the 60-mph position. At time $T_2$ the operator reduces p to 0 until $T_3$, at which time p resumes its original value of 15 mph. Dotted-line curve $Q_v$ represents the engine torque which would be required to move the vehicle at a constant speed V, at any time t during the acceleration phase. The difference $\Delta Q$ between the torque generated by the engine and the equivalent torque defined above generates acceleration a* at time t which causes the vehicle speed to increase. Time correspondence between the various curves can easily be established. Acceleration Phase:

As the value of p goes from 15 to max., the value of $\Delta$ goes from 0 to a peak. Curve ① would correspond to torque regulation and curve ② would correspond to a power axle axle speed governor action (vehicle speed control), depending upon which parameter is used as a limiting factor. The engine torque, rpm and power increase rapidly, which increases the working fluid flow, and causes $\delta_a$ to reach its peak value. This causes the drive (or power) axle torque (not shown) also to increase to satisfy the relationship $Q_a = Q_e \times N_e/N_a$. $N_a$ necessarily varies as the vehicle velocity V which results from the time integration of the acceleration. The curves V and $N_a$ thus necessarily have the same shape. $\delta_a$ conserves its maximum value until a time t' at which it is caused to slowly decrease wile $\delta_e$ steadily keeps increasing. The ratio $\delta_e/\delta_a$ (or $N_a/N_e$) of course represents the equivalent of the gear ratio of a stick-shift car. The acceleration level slowly decreases because the amount of torque $Q_v$ increases with V and the amount $\Delta Q$ available to further accelerate the car becomes smaller and smaller up to time t'' when either one of two things happens, i.e. the operator adjusts p (segment ③) or a limiting parameter comes into play. In any case, all variable parameters then adjust down to their steady-state values corresponding to 60 mph, which may differ from the values that they all had reached at time t", except for V and $N_a$.

Deceleration Phase:

At the end of steady-state period $T_1$-$T_2$, the operator brings the value of p back to the 0-point, so as to obtain the maximum amount of engine braking (NO brakes!). $\Delta$ immediately reaches a negative peak and $Q_e$ (and $\rho$) reverse their signs. As earlier described and discussed, the motor has become a pump and vice versa, though the fluid flow reversal cannot be shown by the curves. To maximize the degree of engine braking, $\delta_a$ peaks again and $\delta_e$ decreases so as to maximize $N_e$, assuming that a speed governor is present between the engine and the transmission. $\delta_a$ remains constant until time t* until $\delta_e$, adjusted by the $N_e$ governor, reaches its lowest value and then starts creeping back up as V and $N_a$ decrease concomitantly. It is unclear, at this juncture (time t*), what is the best way to proceed: i.e. adjust $\delta_e$ or $\delta_a$, or both simultaneously. The set of curves ④, ⑤, ④', ⑤', ④'' and ⑤'' indicate the range of variation rates that $\delta_a$, $\delta_e$ and d will respectively experience in either instances. The influence of the deceleration rate variation on the duration of the deceleration is ignored (same total deceleration time for an equal speed change).

Finally, at a time t** when the vehicle speed nears 15 mph, the power level demand p increases from 0 back to 15 (segment ⑥) and all parameters adjust back to the normal values that they had before $T_o$. Again, identifying the parameter that causes this action is not important. For all that matters, the operator could be the cause. In any case the engine and the vehicle settle back into a steady-state operating condition (15 mph).

The reader will understand that applying the car brakes will only result in a higher rate of deceleration. This would greatly reduce the time period $T_2$-$T_3$, however, it will not appreciably affect the functional relationships previously described. This could be perceived as only a contraction of that time period.

Albeit idealized, the functional and operational description given above of the behavioral response of a desirable automatic transmission system can now be used as a guide to determine how the mechanisms and constructions previously described and discussed can be arranged and mounted to simulate such as ideal system.

Control System of the Power Transmission:

The curves of FIG. 31 graphic illustration of various parameter responses to operator's commands can be used as a guide to define control systems that enable the power transmission system of the present invention to operate in manners such that the coupling vehicle/engine is optimized. Two basic approaches are discussed. They correspond to a simple construction on one hand and a more complex constructure on the other. In both cases, no clutch is needed and "gear" is changed either by the operator (simple), called "manual", or automatically (complex) and called "automatic" and performed by the control system. The command means available to the operator in both cases are presented schematically in FIG. 30. The gear ratios provided in either case are represented in FIG. 32 graph in relation with the ring strokes.

Manual Control System:

As an example and for illustration purpose, five gear ratios corresponding to five positions of the gear-shift command lever (not shown) are depicted for forward drive and three for reverse. They are shown in solid lines and identified in FIG. 30 by D1, D2, D3, D4 and D5, and R1, R2 and R3 respectively. P indicates a command lever position for parking and N corresponds to neutral. The difference between P and N is the same as that which characterized conventional automatic transmission systems and needs no further elaboration, i.e. the vehicle may freely move in neutral but a locking device prevents vehicle motion in parking. The selection of the gear ratio (or torque ratio) is left to the operator as is the case in a stick-shift car, depending upon the operational trade-off that he (she) wishes to excize, e.g. maximum vehicle acceleration rate vs maximum fuel saving, vehicle rate of climb vs fuel saving again, etc .... Under standard normal operation conditions of the vehicle, a change in gear should be made when the engine rpm, which should then be made visually available to the operator, goes beyond specified limits. A set of rpm limits, high and low, must be given to the operator for each gear ratio, because an optimum engine rpm exists for each engine load, as described in FIG. 18.

At this juncture, two possibilities are offered: (1) having each gear ratio define a fixed position for each one of the two rings, or (2) defining only one ring position for each gear ratio and letting the position of the other ring adjust in response to the solicitation of a signal either generated by the operator or semi-automatically, independently thereof. The graphs of FIG. 32 may be used for illustration. The ratio $N_e/N_a$ represents various gear ratios and points 1, 2, 3, 4 and 5 on the abscissa coordinate represent the gear ratios of shift positions D1, D2, D3, D4 and D5, respectively. If a fully manual command is used, each ring stroke is fixed and is depicted graphically by points such as ① for one ring and ①' for the other ring. However, if the adjustment of one ring stroke is semi-automatic, the other being set manually, the stroke of the former ring can vary as is shown by line segments such as [1], [2], [3], [4] and [5]. Short intervals such as X, between segments, serve to indicate that they do not overlap, although they could just as well, which is a matter of constructional arrangement. If the adjacent ends of two contiguous segments coincide or overlap, these segments constitute a continuous straight line extending from the Null-Stop (minimum ring stroke) position to the Max. (maximum ring stroke) position.

It was previously mentioned that engine rpm could be the significant parameter observed by the operator. In such case, ring 77 stroke is to be fixed for each gear ratio, the stroke of ring 78 being available for adjustment. However, depending on the manner in which a specific vehicle is to be most effectively operated, the vehicle velocity might prove to be a parameter of greater interest. In such event, the rpm of the drive shaft which represents the vehicle speed for a given nominal gear ratio can be used upon being transformed into a speed indication. In such instance, the operator monitors the vehicle speed, the gear ratios are set by fixed positions of ring 78 (FIG. 21) and, if the other ring stroke is left self-adjustable (77), the line segments are located on line $\delta_e$. It is noted at this juncture that the minimum stroke settings need not be the same. As a matter of fact, because of the influence of wedge angle $\beta$ (FIG. 5) on the efficiency of the motor, it is much preferable to have the Null-Stop value of $\delta_a$ located at a point such as Y (FIG. 32). For discussion purpose, it will be assumed that: a fixed value of ring-77 stroke corresponds to a set gear ratio, the minimum stroke settings of both rings are the same and engine rpm is the operator-monitored operational parameter. The two cases of fixed versus non-fixed positions of ring 78 are discussed separately. In both cases, it is assumed that the actuating mechanism of a ring destined to remain fixed for any set gear ratio is directly, unequivocally and unambiguously controlled by the operator's gear choice. The system construction which enables the last assumption to be satisfied is first discussed. Next discussed is the case of a system having both ring positions concomitantly fixed (simplest). Then the case of one fixed ring and one adjustable ring concurrently operating is finally analyzed.

Two constructions of ring actuating mechanisms were earlier described and discussed. The possibilities of utilizing either hydraulic fluid or the working fluid were discussed, as well of the advantages and drawbacks thereof, the end result being that it is possible to obtain a quasi-positive correspondence between ring position (or actuator stroke) and the adjusted level of the actuating fluid pressure. If the "quasi-positive" qualification is not considered satisfactory enough, a totally positive actuation construction may be used. In such instance, using the construction of FIG. 7 as a model, the position of piston 101′ may be positively determined by a pilot servo-valve located inside stem 100′ and shown in phantom lines as 300, save for the negligible influence of the "droop" usually present in a directly proportional servo-system. Servo-valve 300 is directly actuated by the gear shift lever used by the operator and in cooperation with ports located on the bore housing the plunger of the servo-valve assumes the role otherwise played by control valve 136. The construction and operation of such hydraulic servo-systems are well known in the art and need no further elaboration here. It is noted here that such a servo-valve arrangement may also be used in conjunction with the opposed-piston actuating mechanism illustrated in FIG. 1, using piston stems 100 for lodging the servo-valves. In such case, two sets of servo-valves are required and the motions of the valve plungers mounted in opposition must be synchronized and coordinated. Such constructions are also well known in the art and need no additional description. It has therefore been established that positive, unequivocal and unambiguous positioning of either ring, or stroke setting, is possible, if necessary, using working fluid is hydraulic fluid, if required. In conclusion, to a determined position of the gear shift lever corresponds one set fixed position (or stroke) of the ring directly monitored by said lever. If the positions of both rings are concomitantly set by the gear shift lever, two set positions, one for each ring, are thusly defined for each position of the gear shift lever. Combinations of both ring positions are described and discussed below as indication of possible gear ratio arrangements.

First, as the reader will undoubtedly realize, when a ring is positively positioned by a gear shift lever, there is no need for a null-stop or minimum stroke adjustment. Second, because a combination in which the pump ring partial stroke is larger than the motor ring partial stroke causes the equivalent of an "overdrive" condition, the gear ratio of the differential gear drive must be adjusted accordingly so as to conserve the correct ratio between peak engine rpm and vehicle wheel peak rpm in highest gear. In the numerical examples below, the following values are assumed as a design guide: pump ring smallest stroke position→25% of maximum stroke; motor ring smallest stroke position→40% of maximum stroke; pump and motor ring maximum strokes are equal and called 100%; five "drive" gear ratios are used, and in geometric progression; stroke adjusting is used concomitantly between both rings; the ratio between the two extreme gear ratios is 10/1; and consequently the ratio between any two contiguous gear positions is approximately 1.78 or 1/1.78 (0.562). $(1.78)^5$ equals roughly 17.8 which gives a ratio of 10/1 between the lowest and the highest gear ratio, as specified above.

These is of course no reason for the lines $\delta_e$ and $\delta_a$ of FIG. 32 to be straight. It is desirable to minimize the operation time of the motor pistons at small values of $\beta$, for reasons already mentioned. Thus it is preferable to adopt combinations of ring partial strokes which call on the pump ring to provide most of the small stroke positions. With such guidelines, a possible set of partial stroke combinations are given in Table C below.

TABLE C

| GEAR RATIOS AND RING STROKE COMBINATIONS | | | | | |
|---|---|---|---|---|---|
| Gear Shift position: | D1 | D2 | D3 | D4 | D5 |
| Nominal Gear Ratio*: | 0.100 | 0.178 | 0.317 | 0.564 | 1.000 |
| Pump Ring Stroke**: | 0.25 | 0.35 | 0.50 | 0.72 | 1.00 |
| Motor Ring Stroke**: | 1.00 | 0.787 | 0.632 | 0.511 | 0.40 |
| Resulting $r_{p/m}$: | 0.250 | 0.445 | 0.792 | 1.410 | 2.500 |

*Gear Ratios r* of D1–D5, using D5 strokes as unity
**Partial Strokes are expressed as ratios of the maximum stroke
$r_{p/m}$ Apparent Gear Ratio between engine rpm and drive shaft rpm In Table C, the pump partial stroke values are chosen quite arbitrarily to represent simple fractional numbers in quasi-geometric progression, the motor partial stroke values being calculated to yield the resulting overall ratio $r_{p/m}$ between the rotational speeds of the engine and drive shafts. The relationships of interest between gear ratios and ring partial strokes can be expressed as $r_{p/m} = m/p$ where m and p represent the fractions of the ring partial stroke for the motor and the pump respectively as ratioed to their respective stroke maximum values. Assigning values to any two of these three parameters automatically results in determining a corresponding value for the third. Using this technique and fixing more desirable values for m yields the values of $r_{p/m}$, p and m given below in a continuation of Table C:

| m = | 1.00 | 0.85 | 0.75 | 0.60 | 0.40 |
|---|---|---|---|---|---|
| $r_{p/m}$ = | 0.250 | 0.445 | 0.792 | 1.410 | 2.500 |
| p = | 0.250 | 0.378 | 0.594 | 0.846 | 1.000 |
| p′ = | 0.25 | 0.38 | 0.60 | 0.85 | 1.00 |

The values of p′ correspond to the rounded off values of p. The ratios p′/m very closely approximate $r_{p/m}$ ideal values which correspond to the theoretical values of r* assigned to each gear ratio of D1 to D5. However, these new motor partial strokes have higher values than those previously determined, as desired.

The extreme case of m remaining equal to 1.0 and constant is worth mentioning. $\beta$ then remains fixed at its maximum value. The values of p then are 0.100, 0.178, 0.317, 0.564 and 1.000 for D1 to D5. Another simple case in which only D5 provides an overdrive would have the following values for p: 0.178, 0.317, 0.564, 1.00 and 1.78, with m=1.00 for D1 to D4 and m=0.562 (overdrive). In the last instance, $\beta$ is only reduced by less than half of its maximum value for the D5 gear shift lever position (overdrive).

In the last two examples, the pump ring minimum stroke is reduced from 25% to 10% in the worst case. The consideration of repeatability of the lowest gear ratio comes to mind. The reader is aware that the "gear ratios" assumed or calculated above cannot be set and fixed as a ratio between actual gears is. They vary as the ring position slightly departs from any nominal position. As a result, the actual gear ratio obtained for any of the fixed set positions of the gear shift lever will slightly differ from a nominal value defined in Table C. It is of interest to estimate the value by which the smallest gear ratio (D1) may practically deviate from its nominal assigned value. For the purpose of this estimation, the maximum ring stroke is assumed to be 2.00 in. and the actual position of the ring actuating piston is assumed to always remain within 1/64 in. of its nominally assigned position, in either direction. The total error is 1/32 in. and this corresponds in percentage of the partial stroke to 16% of the smallest partial stroke (0.2 in. or 10% of 2.0 in., D1) in the worst case. The actual value of D1 gear ratio could thus vary between 9.2% and 10.8% or remain indeterminate within roughly ±1%. The error becomes truly negligible for D2 to D5 gear ratios. It is assumed hereinunder that the gear ratio obtained is the gear ratio which the gear shift lever position normally indicates, for the purpose of further discussion.

It is also obvious that the equivalent of an overdrive can be created by having the product of number of pistons n by their maximum stroke in the motor smaller than that of the pump pistons. The diameter of these pistons may also differ between pump and motor, as earlier noted. This additional degree of design flexibility is worth mentioning at this juncture.

Another source of error between gear shift lever and ring positions (or gear ratios) is caused by the linkage mechanism that connects said lever and the servo-valve monitoring the ring actuating pistons. Such error is minimum if only one ring is controlled by the gear shift lever, i.e.: (1) the other ring remains fixed, as previously discussed, and (2) the other ring position is adjusted by independent control (semi-automatic case). In such cases, a mechanical linkage will easily provide a positioning accuracy of the order of that of the actuating pistons. However, for a construction in which both rings are positively positioned, two coordinated and set positions of the pilot piston (or plunger) of the servo-valve must be ascertained for each one of the D1 to D5 positions of the gear shift lever.

As reviewing the corresponding values of p and m in Table C reveals, the ring strokes vary in inverse direction and according to a non-proportional relationship. Various types of mechanical linkages, well-known in the art, are available for transforming one part single motion into two part linear motions in a manner such that the two parts move differentially and non-linearly. As an example, although pertaining to a different application in the construction of the present invention embodiment, the linkage mechanism shown in FIG. 15 drawing indicates how this can be easily be achieved. Rods 200' and 200" could each be connected to an actuating piston servo-valve and the free end of lever 206 on the left side could be actuated in response to the gear shift lever displacement, shown schematically by phantom line 302, concomitantly and coordinatingly with the axial displacement of stem 208. Properly programmed and coordinated movements of stem 208 and lever connection 302 result in the desired displacements of servo-valve actuating rods 200' and 200". The positioning errors on each one of the two actuating rods compound, but those errors pertain to actuating piston strokes that are at least 2.5 times larger than the minimum stroke of 10% of the D1 gear ratio considered previously as a basis for evaluating the relative gear ratio error estimation. It can therefore be concluded that the influence of the uncertainty on the ring positioning on the actual gear ratio obtained compared to a nominal value is negligible.

The discussion above pertained to gear shift lever positions for forward drive. The case of reverse drive requires a special discussion. Two ways to obtain reverse were previously described: (1) by using a flow inverting valve, and (2) by reversing the direction of the motor ring travel. If the first construction is used, the gear ratio arrangements provided for forward drive stay the same for reverse. This case needs no further discussion, except for stating that, in the schematic diagram of FIG. 30, reverse operation could be caused by moving a two-position lever from point 0 to R1 and operating the gear shift lever used for forward drive to the D positions, which then become R1, R2, R3, R4 and R5. This construction may be of particular interest on vehicles such as tractors or for some trucks and military vehicles.

If a flow inverting valve is not used, three positions of the gear shift lever such as R1, R2 and R3 should be more than adequate to handle the requirements of automobile-types of vehicles. A safe maximum reverse vehicle speed can be assumed for defining a gear ratio corresponding to R3 at maximum engine rpm. The gear ratio corresponding to R1 can be predicated on another practical requirement such as the safe maximum pulling force which the vehicle may be expected to develop for maximum engine torque. The gear ratio corresponding to R2 may be determined by another consideration such as that of providing a convenient intermediate reverse gear ratio between R1 and R3. Again, it is emphasized that low gear ratios should be obtained by minimizing the pump ring stroke while the minimum motor ring stroke should be maintained at as high a value as possible.

The system construction corresponding to the manual semi-automatic gear ratio shifting may now be addressed. Because the motor ring minimum stroke has a more crucial importance than that of the pump ring, the following examplary arrangement is used as the model for the discussion of this construction. The five forward drive basic gear ratios are obtained positively manually by the operator by means of a gear shift lever, as just described, using the direct positioning means of the pump ring. The gear ratios may be numerically spaced as shown in Table C for r*. The value of m is neither fixed nor set by the operator and a fixed position of either a command lever or the motor ring. Depending on the engine characteristics and the vehicle performance needed, a choice may be made between the individual contributions expected from the pump and motor ring positioning, in terms of gear-ratio range covered by either one. Arbitrarily and as an example, it is assumed for the purpose of the following that: (1) a gear ratio range of 10/1 is provided by the pump ring positioning system as was the case in the fixed motor ring construction previously discussed, and (2) a gear-ratio-adjusting range of 2/1 is provided in addition and which can be compounded with either one of the five gear ratios provided by the pump ring positioning.

In such a construction, the motor ring automatic adjustment corresponds to a minimum stroke of 50% of maximum, which is more than adequate from the standpoint of satisfying angle $\beta$ minimum requirements. Furthermore, because the ratio between any two contiguous gear ratios is 1.78/1 for the pump ring positioning and the gear ratio provided by the motor ring positioning between minimum and maximum motor ring strokes is 2/1, overlapping of such gear ratio ranges is possible for each one of the manually selected gear ratios. In other words, within the four gear-ratio overlap ranges, two adjacent positions of the gear shift lever will provide the same overall gear ratio. If the motor ring minimum stroke is 60% of its maximum value, no overlap exists. If the motor ring minimum stroke is 56.3% of its maximum value, neither overlapping nor gaps (see FIG. 32) exist. Only extensive experimental work will determine with certainty the degree of desirability of each one of these construction options. For the time being, overlapping is deemed more desirable and is considered below.

In an idealized version, the mean position of the motor ring (70.7% of maximum stroke) should correspond to the nominal five drive positions D1, D2, D3, D4 and D5, if the engine is to operate optimally at such points. Thus, the overdrive maximum gear ratio becomes 1.414/1 and the minimum gear ratio is 70.7% of D1 gear ratio, which means a total possible range of gear ratios extending over 20/1 with four overlap ranges of roughly from 1/1 to 1.26/1. Incidentially, such overlap ranges extend by an amount considerably larger than the uncertainty error amount previously estimated.

The questions now are: (1) how can this feature be best exploited, and (2) how can the motor ring be made to respond automatically to solicitations not generated by the operator?. Applications to automobiles are used as models for construction examples, being most pertinent and generally best understood. Two major considerations are used to measure the desirability of a given type of engine/car matching, although compromises and trade-offs therebetween are of course always possible and sometimes desirable. It is assumed here that: (1) fuel consumption is of primordial importance, for many car owners, and (2) car performance in terms of acceleration is even more important for others. A compromise between the two being most desirable when extensive city driving is considered during the car lifetime (case of taxicabs). Two examples are discussed below, one for each of the two operation models indicated above. For ease of representation and interpretation, identical engine and car characteristics are assumed prior to engine/car matching by means of the automatic transmission. In either case, the performance curves of FIGS. 18-20 are used as being a useful representative means for illustration purpose.

In the first case, economy is deemed of prime importance. The engine must then operate at points which correspond to the minima of the family of $F_{sp}$ curves which represent the variations of specific fuel consumption as a function of either engine rpm or vehicle velocity, the two being directly related for any fixed gear ratio of the power transmission. The relationships between $F_{sp}$ and engine rpm or vehicle speed can be expressed either in function of engine loading and engine rpm or engine torque and vehicle speed, to name two meaningful combinations. Engine loading corresponds to either the engine power demand signal (gas pedal position usually) during steady-state operating conditions or a combination of engine torque and rpm, always true under any type of engine operating conditions, transient and steady-state. Because gross transient operating conditions are handled by the manual portion of the power transmission control under the operator's jurisdiction, only the case of quasi-steady-state operating conditions is truly relevant here. Consequently, the simplest detection means available should be selected as controlling parameters for the actuation of the motor ring. These are "gas pedal" position, expressed as a fraction of the total pedal travel, and engine rpm, neither one being directly dependent upon the value of the instantaneous gear ratio existing at any time.

Line L of FIG. 18 depicts a typical relationship between the engine torque peaks and rpm's. A similar curve $\Lambda$ passing by point m (minimum of curve $F_{sp}$) represents the locus of points m as a function of engine rpm as the engine loading varies. The exact shape and slope of the curve are not important, only that it is singularly related to engine rpm. Engine rpm detection can be performed by a speed governor such as that shown in FIG. 16. mounted on engine shaft 54, in which the size of servo-flow controlling restricting 221 is then adjusted as a function of the power level demand, concomitantly and synchronously with fuel delivery to the engine. The rpm-controlled servo-flow is connected to the actuating mechanism of the motor ring, by means well known in the art, in a manner such that piston 101' assumes one position for each servo-flow pressure level that is adjusted by the governor.

An example of the motor ring position control operation is given below. It is assumed that the operator has the gear shift lever in position D4 which sets the pump ring at 56.4% of its maximum stroke (fixed). The gas pedal occupies a position which results in a steady vehicle velocity of 55 mph. The engine rpm is $N_o$ (FIG. 18) and the engine is operating at minimum $F_{sp}$ (point m on curve $\Lambda$). The motor ring is at a position corresponding to 75% of its maximum stroke, and the road level is horizontal. Suddenly, the road grade changes so slightly that the operator does not notice. The car slows down slightly also, as does the engine rpm. Balls 212 that were in equilibrium in cavities 213 move inwardly which causes the fluid pressure delivered to piston 101' cylinder to vary in a manner such that actuating piston 101' repositions the motor ring at a slightly larger stroke value, for instance 80% of maximum stroke, thereby slight reducing the overall gear ratio of the power transmission system. The torque demanded by the motor increases, the engine rpm decreases even further as a result and the vehicle slows down even more until the operator decides to re-establish the vehicle speed at 55 mph by augmenting the power level demand.

Two things result therefrom: (1) more fuel is supplied to the engine and its torque increases, compensating for the torque increase demanded of the motor, re-establishing the vehicle speed, and (2) controlled orifice 221 area is concomitantly readjusted to a value which insures that the motor ring position comes back to 77% of maximum stroke, for instance. An exact numerical example is not necessary here and it will be assumed that the following steady-state operating conditions are reached after a few transitory steps: vehicle speed 55 mph, engine rpm $N_o'$ slightly higher than $N_o$, new $F_{sp}$ minimum m', motor ring position 77% of maximum stroke, power level demand increased by 5% for instance and overall gear ratio r which was then 0.732

(0.564/0.75) is now 0.713 (0.564/0.77). Because of the arbitrary positive slope given to curve $\Lambda$, the engine rpm had to increase $N_o \times (0.732/0.713)$ while the overall gear ratio $r_{p/m}$ decreased concomitantly so as to maintain the same vehicle velocity. However, this is accomplished without direct operator's intervention, such as manual gear shifting. A much steeper road grade change would require a much larger gear ratio adjusting, of a magnitude such that the motor ring position would be beyond the maximum stroke value. It is understood that, in such event, the operator will adjust the manual gear shift from D4 down to D3 for instance. The sign of the curve $\Lambda$ slope determine the manner in which the engine rpm governor and the motor ring actuating mechanism are hydraulically connected. Similar transient behaviors can be visualized by the reader in which the road grade becomes negative (descent), the operator wishes to increase or decrease the vehicle velocity, etc . . . . The various steps followed by the parts and mechanisms just described and discussed will take place in a similar fashion. The reader will kept in mind that this construction provides only for a type of "trimming" of the gear ratio shifting.

In the second case of gear ratio trimming application, optimum car performance is predicated on the basis that peak acceleration of the vehicle is most important. First, it should be pointed out that FIG. 18 graphs do not necessarily represent a most general case, but a rare case in which the torque peaks at a rpm value for which the specific fuel consumption reaches its minimum. This means that the same value $N_o$ for engine rpm is used also as a starting point, which is absolutely coincidental. Peak car accelerations are obtained when the engine torque is maintained at the maximum value that the engine can deliver for a given power demand setting. Thus, ideally, to keep the engine operating optimally from that standpoint during an acceleration, point M on curve Q should remain between rpm limits such as N' and N'', with the provision that the operator shifts the manually-controlled gear ratio at or near the N'' limit. The range N'–N'' must of course be larger or at least equal to that which two contiguous gear ratios of the pump ring positioning provides.

An example of this control type of the motor ring position is presented below. The car is cruising at the rather low velocity of 35–40 mph in D4 gear and the engine is operating at point M where the torque Q is at its peak at an engine partial load and at $N_o$ rpm. The operator needs to perform a quick "get away" and to reach 55 mph, in a hurry, without shifting manual gear ratio. The motor ring position is near 100% because a low gear ratio is needed with a D4 gear at low vehicle speed, so that the automatic control of the motor ring had caused the ring stroke to reach a high value as compensation for the D4 gear ratio which is then somewhat too high. The operator increases suddenly the power demand to a higher level. As shown in FIG. 20, engine operating point M' must move to M'' and the curve Q' along which the engine operated becomes new curve Q''. The torque required (Torque Demand) of the engine is shown increasing with vehicle speed and must represent the locus of all of torque curve peaks, assuming that the transmission gear ratio is constantly and continuously being adjusted so as to move the Q curves as is shown in FIG. 20. The Torque Demand curve of FIG. 20 translates into line L of FIG. 18 which is the locus of points M when torque is plotted as a function of engine rpm. Thus, for each power level demand or engine loading level, there is a point M where torque Q peaks at a value $Q_o$ for an rpm value $N_o$. Ideally, all through the acceleration phase duration along line L, there exists an equivalent of point M (e.g. points M', M'' and M''' of FIG. 20) and the maximum car acceleration rate will be sustained through the acceleration phase if, for any and all combinations of engine rpm and actual engine load, the peaks of the instantaneous Q curves are caused to remain on line L or the Torque Demand curve. The curves of FIG. 19 represent Q as a function of power axle or drive shaft rpm's. For any set overall gear ratio, drive shaft and engine rpm's are directly proportional and, for reasoning purpose, one can be substituted for the other.

Assuming that: point b of FIG. 19 corresponds to point M of FIG. 18, curves Q' and Q'' represent the torque demand and torque available on the engine shaft respectively; the difference $\Delta Q$ between these curves at an instantaneous rpm value N represents the amount of excess torque which is available for accelerating the vehicle. $\Delta Q$ is the parameter that needs be variably maximized for any and all values of N during the acceleration phase. This excess torque $\Delta Q$ differs appreciably in nature and amount from an excess torque which may result from a power demand by the operator much higher than is needed to sustain a 55 mph speed. The latter would yield a higher acceleration rate at the cost of excessive fuel consumption. Whereas, in the former case, a lower but optimized acceleration rate is obtained, at no extra fuel cost and without appreciably exceeding the power demand level corresponding to the 55 mph final velocity required. In this case, sudden, overshooting and fuel-costly power demands are not required in order to obtain a usually satisfactory acceleration rate.

Here, because the overall gear ratio should be continuously adjusted according to what the engine yields and to what the vehicle requires, the influence of the power demand level, inasmuch as it affects only future events, cannot be directly exploited, except to the degree that it has already affected the engine response. Therefore, some benefits resulting from a sudden and overshooting power demand can still be reaped, but to a lesser degree and in an improved manner. The cost is an increased degree of complexity, because both instantaneous values of engine torque and rpm must be constantly detected, processed and utilized so as to control the servo-valve that is used for monitoring the motor ring actuating mechanism.

Electrical/electronic and hydraulic systems may be used for detecting and processing signals indicative of the values of rpm and Q as a function of time. Modified versions of the torque regulator of FIG. 13 and speed governor of FIG. 16 can be used for generating hydraulic signals that can then be combined so as to actuate a servo-valve which determines the metering area of a variable-size restricting orifice. The servo-fluid flow control exercized by that orifice determines the position of pistons 101 or 101', as earlier described and discussed. The motor ring thus is caused to move in a manner which maximizes Q for any and all values of the engine rpm. The motor ring travel may be stopped by either maximum or minimum stroke stops during its attempt to provide a torque peak, in which case the acceleration maximizing attempt becomes limited by the gear-ratio adjusting limits imposed by the motor ring construction.

The above lengthy discussion pertaining to acceleration optimization may also serve to show that adjusting the motor ring position for monitoring the overall gear ratio is quite inadequate for handling rare large fast changes in engines regime (or car speed). Such limitations can only be overcome with the coordinated use of the manual control or of a full automatically controlled system.

Fully Automatic Control System:

A fully automatic control system performs as a semi-automatic control system if and when ideally complemented by an operator who would adjust the manual gear shift, up and/or down, each time the motor ring reaches a stop, maximum or minimum stroke alike. A basic rule should be followed in the definition of the multiple possible combinational arrangements of pump and motor ring strokes, for reasons made clear previously: lower gear ratio combinations must be such that the motor ring position continuously remains closest to its maximum stroke stop. The pump ring thus is assigned the task of major gear ratio adjustments and the motor ring plays the role of adjustment trimmer. In other words, the automatic control of the pump ring replaces the input provided by the operator in the manual semi-automatic system. Therefore, most of the arguments and the bulk of the discussion presented above remain valid and need not be repeated here.

An obvious method of insuring that the motor ring adjustment does not come into effect until and unless the pump ring has reached its maximum stroke is to use a hydraulic switch that is actuated whenever the pump ring reaches its maximum stroke stop. The switch is normally closed and interrupts the fluid servo-flow which controls the actuating mechanism of the motor ring which is then caused to remain at its maximum stroke position until and unless the opening of the switch by the pump ring allows said fluid servo-flow to assume control of the motor ring position, for stroke reduction if so directed. Table C gear ratios no longer apply.

Three typical ways in which such a control system may be most beneficially used are: (1) to minimize the fuel consumption, (2) to regulate the vehicle velocity, and (3) to optimize the engine rpm and torque combination. The basic components needed for implementing a control system capable of operating according to either one of the three ways listed above, or combinations thereof, have already been described and/or discussed in details. The arrangements of and interconnections between these components are graphically represented in FIG. 21 functional block diagram in distinctive fashions, one for each of those three ways. Each way is presented and discussed separately below.

Minimum Fuel Consumption Control: This control mode pertains mostly to steady driving on highways and freeways with up and down grades during which transient conditions develop gradually and/or are characterized by low gradients. It should be emphasized here that, for any given engine load, engine torque peak and minimum specific fuel consumption do not occur at the same engine rpm value. Typically, the minimum of $F_{sp}$ may occur at four thirds of the rpm value at which the torque may peak, but is fairly flat over a sizable rpm range. The torque peak usually occurs at a fraction of the maximum value of the engine rpm, but is also fairly flat. A practical engine rpm range over which variations of $F_{sp}$ and Q can be ignored may be as much as 20% of the engine rpm corresponding to the engine nominal design point. Thus, engine rpm detection or measurement is not very critical. However, it should be mentioned that the engine should be caused to operate at half or less of its maximum power if fuel consumption is to be minimized substantially. This not new and is well known by wise motorists who always attempt to cruise at the highest possible gear position, as long as the engine keeps running smoothly.

At high vehicle speeds, the overall gear ratio adjustment is performed mostly by means of the motor ring trimming action, the pump ring being at its maximum stroke position. At lower vehicle speeds, the motor ring remains at its maximum stroke position and the pump ring must then reduce its stroke so as to enable the engine to increase its rpm, e.g. case of 25-mph cruising on a flat road/street stretch. This indicates that the control fluid servo-flow must be diverted from one actuating mechanism to the other, i.e. from motor to pump. This can easily be accomplished by means of a second switching position of the hydraulic switch that senses the motor ring maximum position. An illustration of such switching arrangement of the servo-fluid flow is presented in FIG. 21. Its operation is described and discussed at the end of this section along with an alternate possibility which is predicated on the pump ring and motor ring actuating mechanisms operating at different servo-pressure levels and in opposite direction. In both constructions, the positions of both actuating pistons are singularly defined directly by the servo-fluid pressure level.

In the second case, for both ring actuating mechanisms, the servo-fluid line connections and the restricting orifice locations therein are arranged in a manner such that: (1) increasing servo-pressure levels cause the pump ring to augment its stroke and the motor ring to reduce its stroke, (2) the servo-pressure level required by the motor ring actuating piston to reduce its stroke from its maximum position is slightly higher than the level required by the pump actuating piston to reach its maximum stroke, and (3) one single servo-pressure level thus determines the positions of both rings and concomitantly the overall gear and torque ratios. It will be assumed that, in this control mode and under quasi steady-state engine operation conditions, only a servo-fluid pressure needs be established to fix the gear ratio. Therefore, it remains only to determine how that pressure level may best be made to adjust automatically to engine operating conditions that will insure that parameters influencing $F_{sp}$ such as engine rpm, engine power demand level, vehicle-propelling torque requirements and power-transmitting gear ratio are properly combined. It is assumed that vehicle speed is under the direct control of the operator (human visual servo-loop) by means of power demand level adjustment, which means that the vehicle-propelling torque requirements are handled through this human control loop.

For a given engine construction, type and model, a single line A of FIG. 18 relates minimum fuel consumption to engine rpm and power demand level or engine load. The gas petal is then connected to the device controlling the area of variable-size restricting orifice 221 of speed governor 156' that is then mounted on shaft 54. The servo-pressure lines are connected in such a way to the ring actuating mechanisms that an increase of engine rpm causes the gear ratio $r_{p/m}$ to increase. Such action results in a torque demand increase and a concomitant engine rpm decrease, for a set engine load or power demand level (gas pedal position). The engine rpm becomes thus automatically regulated by the preprogrammed relationship between engine load and rpm, and builtin into the transmission control system construction by means of servo-fluid connections and linkage construction between the gas pedal and a variable-size controlling orifice.

Readers familiar with the art will understand that either one or both connections and linkage may easily be changed, re-arranged by means of adjusting and/or switching mechanisms under the operator's control and/or operated by signals generated by other components of the overall control system. Such situations might arise when other modes of gear ratio control are also provided and need be put into action, e.g., during engine transient operating conditions such as accelerations, engine braking and/or automatic control of the vehicle velocity. The same remark also applies to the other two control modes that are discussed below. For ease of understanding and clarity, the grouping of two or more gear ratio control modes into one overall control system is discussed separately in a later section.

Vehicle Speed Automatic Control: This control mode pertains to steady driving on highways, freeways and/or lengthy speed zones without obstacle that might interrupt the driving steadiness too frequently and make it unattractive. This control mode can be easily and advantageously combined with the previously-discussed control mode, albeit being discussed herein by itself. The road grade variations are thusly automatically handled by means of gear ratio adjusting. The drive shaft (power axle) rpm represents the vehicle speed for given tire size and degree of inflation and wear thereof, as is assumed thereafter. Speed governor 156 mounted on shaft 56 is used as vehicle speed detector (actual speed). The signal representing the vehicle speed value to which the car is to be automatically limited is introduced by the operator in the form of the area offered by restricting orifice 221 to the servo-flow, which of course establishes a set servo-pressure level.

That servo-pressure level then constitutes a first signal to be used in conjunction or combined with a second signal representative of an engine operating parameter chosen to represent the engine regime of most interest. One is identified above, minimized fuel comsumption, another could be engine torque, a third is a compromise between the first two. Fuel consumption cannot be detected directly, but may be estimated indirectly by means of engine load and rpm. Engine rpm and torque can easily be detected and monitored as was earlier mentioned and discussed. Because engine rpm regulation was already used and described in the previous control mode discussed, engine torque is selected as the measure of engine regime in this application.

Referring to the drawings of FIGS. 14 to 15, it was earlier described how the engine shaft actual torque is variably combined with a signal representative of the engine load so as to generate and hydraulic signal by means of valve 136. A digression is called for at this juncture, however. A reader familiar with the art will intuitively know that engine load must be permitted to adjust to road grade conditions if the vehicle speed is to be sustained at a constant value. Gear ratio adjusting is generally not a sufficient action, furthermore absolutely inadequate if another engine regime-indicating parameter is to be concurrently controlled, which is the case here. Therefore, if the operator desires to maintain a constant vehicle speed, he (she) must relinquish his monitoring of the power demand level control, during that mode of power transmission control: thus there cannot be any set engine load to refer to or utilize!

Because of the earlier mentioned flatness of both the torque and $F_{sp}$ curves as a function of engine rpm in the range thereof of interest (20% of the engine optimum-design-point rpm), it is assumed that a fixed engine rpm value can be selected to define the engine regime which should optimally be maintained. A biased correction as a function of vehicle speed, which is set, may be used to cause this rpm value to be adjusted in order to approximate a "simulation" of the slopes of curves L or Λ of FIG. 18. If an engine rpm tachometer is used for displaying engine rpm as is becoming more common, the signal thereof may be used in parallel for actuating a fluid servo-valve which provides the signal representative of engine regime. Otherwise, a speed governor may be used by mounting it on shaft 54, the latter providing the rpm-representative signal needed. In either event, a car-speed biased hydraulic signal representing engine rpm, as indication of the regime thereof, is generated and made available for use in cooperation with the first signal preeviously identified.

The only indetermination remaining is that of deciding which of the two signals will monitor which one of the two inter-dependent variable parameters to be set: (1) overall gear ratio, and (2) engine power demand level adjustment (e.g. fuel flow rate). It was earlier mentioned that the first signal could control the gear ratio, in which case, the second signal will control the gas pedal position. In a second possible alternative, the first signal may be caused to control the gas pedal, and the second signal will then control the gear-ratio adjusting. Controlling the gear ratio with a hydraulic signal needs not be discussed here again. Adjusting the gas pedal or fuel delivery rate is new here and is worth a few words, although well known in the art.

Because car-speed control should be considered as an addition to and not as a substitution for conventional car speed handling by the operator, a system for controlling fuel delivery rate, either by means of a carburettor or a fuel injection pump, must be constructed in a manner which enables a smooth transition to take place between one mode of operation and the other. This can most easily be performed hydraulically in the present case, since hydraulic servo-fluid flow and pressure are available, the pressure being in fact the signal itself. The schematic drawing of such a dual-usage power-level demand linkage is depicted in the functional block diagram illustrated in FIG. 21. It represents only an examplary construction and should not be construed as a limiting embodiment feature of the power transmission control system presented herein. This dual-usage linkage is described in an earlier section. It permits switching by the operator from normal driving to speed-regulated driving by actuating an electric switch which causes the rerouting of the servo-fluid flow.

It is assumed in the following that the fluid servo-flow generated by the speed governor mounted on drive shaft 56 is used for controlling the overall gear ratio. Concurrently, the servo-flow generated by the speed governor mounted on engine shaft 54 is caused to adjust the length of the link between a fixed reference point and the fuel metering system, so that a set position of the fuel metering valve corresponds to each servo-fluid pressure level. The fixed reference point position is determined by the value of the speed level at which the operator wants the car to be held. Simultaneously, an area is set and fixed for the restricting orifice 221, which depends upon the vehicle speed that the operator previously selected (bias mentioned earlier).

The system then operates as follows, hereinafter. As a starting point, it is assumed that the car is driven at a steady 55 mph on a flat horizontal road. The grade suddenly changes, which would otherwise cause the vehicle speed to drop to 45 mph, if nothing else were changed. However, with the automatic speed control engaged and in operation, the following series of events then takes place. First, the car slows down by a mile or two. Second, the shaft 56 speed governor causes the servo-pressure to vary in a way that causes the overall gear ratio to increase slightly, in an attempt to re-establish the demanded car speed, contrarily to what manual gear shifting would normally attempt to do because the operator would concomitantly adjust the power demand level upward, which is done automatically here later. The advent of increase in overall gear ratio causes the engine rpm to decrease. The engine rpm governor is thus caused to adjust the servo-pressure it generates in a manner such that the fuel delivery rate to the engine is caused to augment. The engine rpm is thus reestablished while the engine delivers a higher torque. This torque is large enough to cause the car speed to reach and then go over the 55 mph level demanded (overshooting). This latter action causes the overall gear ratio to be readjusted downward to a value close to that which it had before, at the start of the disturbance. At this juncture, in an unstable or undamped control system, the incipient oscillatory process just incited could go on until it dampens out and settles back to a constant 55-mph level or grows in amplitude and becomes unstable. The response times of the control system and of the vehicle differ so largely, by a factor higher than 10, that in a simple proportional control system of the type described unstable conditions are unlikely to develop. As a matter of fact, critical damping conditions can be easily created in the system, as is well known in the art. A resonance-like condition could evolve between the two loops of the control system which interact directly, i.e. the engine-rpm/fueldelivery loop and the vehicle-speed/gear-ratio loop, by way of a common operational link between the two, i.e. the engine torque. It is believed that adjustments in gear ratio can be made much slower than the engine response to fuel delivery rate adjustments, innocuously. This will eliminate any possibility of resonance.

The reader familiar with the art will understand how the reverse process corresponding to encountering a road down grade is handled by the control system. The change rate of the road grade does not affect the response of the system, it occurs usually at a much slower pace. It is self-evident that the operator cannot accelerate by using the gas pedal, then ineffective, and that if the brakes are applied, the engine will attempt to compensate and oppose the braking action. In an emergency case, such situation could prove disastrous. An operator may panic and forget to switch off the automatic speed control system. Thus, means must be provided for connecting the brake system to the speed control in a manner such that applying the brakes automatically and momentarily turns off or shunts the speed control system, in a way that causes the fuel delivery system to immediately assume the idling position, as happens in conventional car operation. When the brakes are released, if the automatic speed control system is still switched on, it will resume its operation and automatically treat this interlude as though there had been a brusque lowering of vehicle velocity. The system then provides the acceleration needed, until the regulated speed level is again reached (55 mph here).

Engine Torque/RPM Optimization Control: The application of this control system was discussed in the case of the manual semi-automatic control system described earlier. Combined with a minimizing fuel consumption control system, its use is particularly advantageous during city driving. It is discussed hereunder as an adjunct to such system and which takes over when quick "get away" type of short acceleration bursts are mandatory at times.

Two assumptions are first made: (1) the results of the discussions presented earlier still apply, and (2) the ring position control shifts from one ring actuating mechanism to the other automatically according to the rule previously stated. The results were: (1) a compromise is acceptable regarding $F_{sp}$ during an acceleration period, (2) the engine torque may be regulated at a level corresponding to an engine rpm higher than that of its peak and slightly lower than such peak, (3) the engine rpm relationship to power demand level overrides that which pertains to minimum fuel consumption whenever a demand is made by the operator for an increase in power beyond a set percentage of the existing steadystate power level, and (4) the switching back over to the minimum fuel consumption system is accomplished automatically whenever a power level delivered reaches a set percentage of the power demand earlier made by the operator at the start of that acceleration phase. This means that the operator is responsible for adjusting the power demand level down as soon as the vehicle speed nears or reaches the velocity intended, as is done in conventional driving, unless vehicle-speed control is concurrently engaged.

A major difference exists between the present application and that of manual/semi-automatic control, in which only the motor ring is affected by gear ratio adjustments, the pump ring position remaining fixed unless and until changed by the operator manually and directly. Here, the overall gear ratio $r_{p/m}$ is adjustable automatically, according to the shifting sequence limitations earlier discussed, i.e. one ring at a time. The corollary result is that much larger gear ratio adjustments or variations must be handled by the control system by means of the position control of two actuating mechanisms. In this application, the control system is enabled to maximize acceleration rates over ranges of engine rpm's and vehicle speeds extending from low initial levels to maximum ending levels during one single uninterrupted acceleration phase. Thus it is important that the engine shaft power be continuously maximized at any transient operating conditions of the vehicle/engine coupled ensemble, excluding thereby the engine rpm large and sudden changes that occur during stick-shift gear shifting. This improved performance potential, inherent to the power transmission system of the present invention, should be fully exploited and a digressive discussion of the vehicle/engine coupling is first presented so as to identify engine operating parameters that are of most significance or importance during such transient conditions.

During extended vehicle acceleration phases, in response to a brusque large increase in power level demand, the amount of power developed by the engine in excess of the power needed for propelling the car at the instant speed that it has then reached is of crucial importance, for it determines the car acceleration rate. This consideration goes one step further than the torque consideration previously discussed, it involves engine rpm's. Power is the product of torque by rpm. In FIG. 18, both power and torque are shown occurring at the same rpm value $N_o$. These $\rho$ and Q curves are shown normalized for illustration purpose and should not be construed to correspond to one another. The fact that the relationship between $\rho$ and Q is represented by $\rho = Q \times N$ (1) indicates that the maxima of $\rho$ and Q at any and all engine regimes can never practically happen at the same rpm value, $\rho$ always peaking at a higher engine rpm value than does the corresponding Q.

For any and all combinations of engine regime and loading, a singular curve relates Q and N, or $Q = F(N)$, which may too be expressed by the inverted equation $N = \phi(Q)$ (2). For each level of engine loading, or gas pedal position p%, there exists a singular equation (2), a family of similarly-shaped curves representing various equations (2) covers the gamut of engine characteristics from idle to maximum rpm, one curve for each value of p%. The N values at which $\rho_{max}$ occurs, which correspond to the $Q_{max}$ value of each one of the Q curves, are then related to p% by a singular equation such as $N = \psi(p\%)$ (3). Replacing N and/or Q by an equivalent expression, i.e. equation (2) or its inverted form and equation (3), in equation (1) yields either one of the two following equations of interest: $\rho_{max} = F(N) = \psi(p\%)$ (4) and/or $\rho_{max} = \phi(Q) = \psi(p\%)$ (5). One of the two equations (4) and (5) is necessary and sufficient to determine the $\rho_{max}$ value as function of p% (known) and of one detectable and controllable engine operating parameter (N or Q). Such $\rho_{max}$ value will be obtained and maintained for each combination of a p% value and of a detected value of the parameter selected, for representing the engine instantaneous operating conditions at any given time, if the control parameter, Q or N, is caused to constantly and continuously reach and maintain the value defined by the applicable equation, at any and all time during an acceleration. Characteristic equations (2) or (3) can be determined experimentally by engine testing so as to numerically define equations (4) or (5), as is deemed most appropriate, depending on the selected control system.

In the control system to be discussed now, the variations of engine torque Q are used to regulate the power level and the demanded p% level value determines the engine rpm value which will be controlled by the fuel delivery rate to the engine during the major portion of the acceleration phase. Fast variations of gear ratio are not required, thus it is assumed that engine rpm and Q respond much more quickly than the overall gear ratio to fuel delivery rate adjustments. A typical vehicle acceleration from 25 mph to 65 mph is contemplated on a level road. Initially, the car is under minimum $F_{sp}$ control and is cruising at low speed. The engine rpm $N_e$ is lower than that which needs to be maintained during the acceleration phase. The overal gear ratio $r_o$ is higher than that which is required at the beginning of the acceleration to obtain the maximum acceleration rate and the corresponding engine rpm is appreciably lower than that which the new demanded p%'' value imposes on the engine. The initial gas petal position corresponded to an initial value p%'. The difference (p%'' − p%') is large enough to cause the acceleration control system to take over the minimum-fuel-consumption control system role. The following sequence of events then takes place.

The fuel supply to the engine increases suddenly. The engine rpm reaches the positive slope line that represents equation (3) along an engine characteristic Q curve that intersects said line. Because the variations of Q and N occur simultaneously, such intersection points actually define a locus curve situated on the left side of said line, in a graphic representation such as that of FIG. 18. It is assumed here that point M at the intersection of line L and curve Q' represents an operating equilibrium point during the acceleration phase. Line L is assumed here to represent the variations of N imposed by each value of p% levels. New curve Q' represents the engine torque variations as a function of Ne at the p%'' level. Because M corresponds to a power curve peak for the p%'' value, point M is located on the right of curve-Q' maximum, as was earlier explained, and curve Q' necessarily has a negative slope at point M. To simplify matters, it is assumed that, before point M is finally reached, a series of points M' (not shown) represents the locus of intermediary equilibrium points on lines L' (not shown) when the overall gear ratio has only slightly decreased and the vehicle speed has only slightly increased. Let's assume for the time being that M represents one of such points M' for which the engine rpm is too low, the overall gear ratio is too high and line L' corresponds to a curve parallel to line L and located on its left.

This means that the engine rpm must augment and the overall gear ratio $r_{p/m}$ must decrease while the engine torque must also concurrently increase. The large increase in fuel delivery rate causes a surge in shaft power availability. This means that both instantaneous values of $N_e$ and $Q_e$ are prompted to increase simultaneously, first without any controlling action being taken. The vehicle inertia opposes a fast change in $N_e$ because $r_{p/m}$ has not had time to adjust. Torque $Q_e$ level thus rises at a rate comparatively much higher than that of $N_e$ and reaches a set level which corresponds to the regulated level Q' set by the p%'' value demanded by the operator. The torque regulator mounted on engine shaft 54 is set by means of control actuating rod 208 responding to p%'' selection by the operator to regulate $Q_e$ at that value. Torque regulator 155 then causes the servo-fluid pressure controlled by a valve such as 136 (or equivalent) to make the pump ring decrease its stroke, thereby reducing $r_p$ and concomitantly $r_{p/m}$. The engine torque is then prevented from increasing and the $N_e$ value is thus allowed to increase at an accelerated rate, until point M is reached on the descending branch of curve Q'.

When this occurs, the rise of $N_e$ must be stopped, otherwise the engine shaft power will fall below $\rho_{max}$ level along the descending right branch of the power curve. However, at point M, the engine torque falls off relatively faster than the rate at which $N_e$ increases, their product being engine power, which has topped or passed its peak. The end result is a reversal in the action of control valve 136 in response to a decreasing torque signal that causes a concomitant reversal in the servo-fluid pressure action on the pump ring actuating mechanism and an increase of the pump stroke or of $r_p$. The overall gear ratio then increases, which automatically causes the engine rpm to decrease slightly, which in turn causes the engine torque to increase. The process continues to alternate between $N_e$ and $Q_e$ increasing/decreasing and decreasing/increasing respectively. An automatically control state is eventually reached between $Q_e$ and $N_e$ within a narrow variation range for both, the product of the mean values thereof representing an approximate value of $\rho_{max}$.

Depending upon the total $r_{p/m}$ amount that is required to adjust until the vehicle speed desired by the operator is reached, the stroke of the motor ring may have to be controlled, once the pump ring stroke has reached its maximum. This eventuality would materialize if, for instance, p%" were to be made 100%, i.e. gas pedal is fully depressed position. In such case, the combined values of $Q_e$ and $N_e$ for the 100% power demand setting reach levels of vehicle speed which correspond to $r_{p/m}$ values higher than $r_p$, if $r_m$ remains 1/1. $r_m$ must thus be allowed to adjust downward if $r_{p/m}$ values larger than 1/1 become necessary during the last portion of the acceleration phase. In such an instance, as earlier discussed, the servo-pressure signal generated by torque regulator 155 is caused to take over the control of the motor ring actuating mechanism, while the pump ring position is caused to remain at its maximmum stroke setting. The controlling process and steps continue to take place as previously just described, except for the rerouting of the hydraulic signal from the torque regulator. In either event, when the vehicle speed reaches a value approaching the level desired by the operator, say 60 mph in the numerical example of an acceleration from 25 to 65 mph for instance, the operator is required to: (1) adjust the p% of the gas pedal position to a value which approximately corresponds to the vehicle speed now reached so as to obtain the approximate 65-mph speed desired, then (2) if provided and suitable, switch to the automatic speed control system previously described and discussed, or (3) if provided and suitable, switch to the minimum-fuel-consumption control system earlier discussed.

In either one of the three eventualities above, the conditions imposed by the engine torque/rpm optimization system on the coordinated controlling of $Q_e$ and $N_e$ are suddenly removed. At that instant, the engine torque and rpm, and $r_{p/m}$ values are unlikely to be those which will satisfy the new conditions imposed on (and values of) these three engine operating parameters. In a very general case in which p%" is 100% and the finally-adjusted gas pedal position corresponds to a p% of only 65%, for instance, and the control is switched to the minimum $F_{sp}$ operation mode, the engine torque $Q_e$ must be adjusted downwardly, $N_e$ must be adjusted downwardly also, but $r_{p/m}$ needs be adjusted upwardly. This is accomplished automatically by the control system now in charge, in the appropriate and applicable manner as described and discussed earlier for either of the last two control systems. It is self-evident that this cannot be done by the operator, because means are not available for directly adjusting $r_{p/m}$. It is most likely that a "default"-type of control-system selecting approach needs be built-in into the overall control system of the automatic power transmission system. It is assumed that the minimum $F_{sp}$ control system is used here as a basic system and that, when no selection to the contrary is made, the basic control system is automatically chosen by default.

In the above discussion, it was implicitly assumed that point M is always located during an acceleration period in an $N_e$ range that corresponds to a positioning of the power curve peak within such range. Ideally, this is the case and could be assumed to be so for the discussion purpose. However, if occasionally point M were to fall beyond a set $N_e$ range, the system operates in a similar fashion, but less effectively, provided that the lowest value of $N_e$ corresponding to the worst case of point M positioning does not fall on the left of curve Q' peak. Such eventuality is very unlikely because such peak is always situated at a much lower value of $N_e$. If occasionally point M becomes located on the right of $N_e$ range upper limit, the control system again will operate less effectively. $N_e$ range upper limit is quite lower than the engine maximum rpm, possibly between 70%–80% of such value. However, if the lowering of the effectiveness of the acceleration control system were then to become objectionable, the situation just described can easily be remedied.

To that effect, it suffices to limit $N_e$ by means of a speed governor such as 156' adapted to generating a servo-fluid flow having its pressure vary is such a way as to bias torque regulator 155 servo-pressure signal. The use of such biasing method results in an apparent raising of curve Q'. Thus causing an increase of the regulated value of $Q_e$ that causes $N_e$ to be adjusted downward and to provide the equivalent of a corrective adjustment to equation (5). But, a more general aspect of one provision which must be incorporated in the control system pertains to the passage by point M (or any point M' for that matter) through curve Q' peak, which occurs at an early stage of the acceleration phase. The condition is always potentially present, though it may not materialize each time an acceleration takes place. The following is an attempt at clarifying this point and at providing an operational bias that is always present and available as and if required.

The most critical situation, in which an acceleration is initiated from a low $N_e$ value and a low p% setting with the minimum $F_{sp}$ control system in charge, is used as a discussion model. Under such conditions, the path followed by points M' (or their locus) may intersect curve Q' on its left side ascending branch, left of its maximum. If this happens, torque regulator 155, as constructed and connected for this application, causes $r_{p/m}$ to increase when the torque increases, instead of to decrease, the engine coupling between torque and rpm being then shunted (non-operative $N_e/Q_e$ loop). A preferred biasing corrective construction consists in preventing the servo-fluid flow controlled by torque regulator 155 to reach the pump ring actuating mechanism until and unless the engine rpm has reached a value of $N_e$ appreciably higher than the engine rpm level at which the Q'-curve maximum occurs. This insures that, no matter which path points M' follow, point M is always located right of said maximum point when torque control becomes effective. Such action can be provided by a set of variable restricting orifice 221, ball 212 and cooperating conical cavity, in speed governor 156' mounted on shaft 54. It should be re-emphasized at this point that one speed governor assembly 156 has the capability of providing a number of individually adjustable speed-governing functions, one for each set just defined. Such a set is allocated the function of providing a servo-fluid pressure the switches an ON/OFF valve located on the connection line of the servo-fluid flow controlled by the torque regulator. It is worth mentioning here that another valve similarly installed and operated by another ball/conical-cavity/adjustable-restricting-orifice set can be arranged to provide the $N_e$-biasing function previously mentioned for the $N_e$-range upper limit. This latter discussion will also serve to indicate how torque regulator 155 and speed governor 156' with its multiple rpm-governing-level capability can be coupled by means of the hydraulic signals which they generate so as to enable one single control system assembly to provide the flexibility of combining individual component operations in a plurality of ways such that several controlling functions may be assumed by said assembly. Readers familiar with the art will undoubtedly conceive additional ways in which such flexibility may further be exploited.

During the controlled-acceleration phase, it is understood that all the automatic power transmission control systems must be inoperative. These systems must become incapacitated automatically and dependably at the start of the acceleration and be reengaged as soon as a signal indicates that the acceleration is near completion. As earlier indicated, the operator may perform these tasks by manually switching operation from one control system to another. It is however preferable to have those performed by the only command function of which the operator must have control constantly and continuously during all of the acceleration: that of engine power level. For the sake of simplifying the following discussion, it is assumed that small vehicle accelerations are handled by the control system then in charge, e.g. most likely the minimum-$F_{sp}$ control system. Extended accelerations cannot practically be handled by this system, unless the operator so desires, at the cost of excessively low acceleration rates but with fuel consumption remaining beneficially low. The operator may slowly augment power, and concomitantly vehicle speed, by gradually moving the gas pedal from idle to maximum position. It is however unlikely that such would be the general case. On the contrary, once the operator decides to have the vehicle accelerate from a low speed to a much higher speed, he (she) will want the process to take place in a more reasonable amount of time and be willing to expend a reasonable extra fuel amount therefor.

To initiate a controlled acceleration, to end it and then to sustain it between start and finish, a comparison must constantly and continuously be made between two engine power levels: that which is demanded by the operator $\rho_d$ and that which is actually being developed $\rho_a$ at any instant by the engine. $\rho_d$ is measured directly by p% which is an indication thereof. However, $\rho_a$ or actual instantaneous shaft power produced is more elusive to detect directly. It is equal to the product $Q_e \times N_e$. An indication of $Q_e$ value is provided by p%" as soon as the locus curve of points M' has intersected curve Q' of FIG. 18, which remains valid during the major part of the acceleration phase. $N_e$ is also known and detectable, being also a function of p%" (equation (3)), in an ideal case. However, in non-ideal practical cases, it was earlier mentioned that an engine rpm signal can easily be generated to represent the lower ($N_l$) and higher ($N_u$) limits of the engine rpm range, as a function of p%, in which point M must remain located. If the latter is not available, a signal indicative of $N_e$ value can be generated by one of shaft-54-mounted speed governor 156' multiple servo-fluid signals. In any one of these three eventualities, a signal representative of the instantaneous engine rpm value can be made available: either N*, ($N_l - N_u$)/2 or $N_e$ as most applicable. N* represents the numerical value of N in equation (3) which corresponds to the value p%". The appellation N* is used from now on to designate the engine actual rpm signal value that is utilized in determining $\rho_a$, regardless of the manner by which N* is obtained. A signal p* representative of $\rho_a$ and resulting from combining the N* signal with another signal representing p%" is now available for comparison with p%' (initial measure or indication of $\rho_d$ value) or p%", as applicable. Whenever p%" exceeds p%' by a specified amount, the acceleration control system is automatically switched on. Whenever p* nears p%" within a specified amount, the acceleration control system is switched off, if the operator allows such a situation to develop. In cases where p%" is 100%, the vehicle will then reach a speed possibly much higher than that which the operator wants (level-grade road). In such an event, the operator either lowers the value of p%" when the car speed approaches the desired value or switches off the acceleration control system. In the former case, the lowering of p%" by the operator brings the difference p%"−p* within the specified differential amount that causes the switching-off action previously mentioned. In either one of these events, the result is the switching-off of the automatic acceleration control system and the resumption of the previously used mode of control. An examplary construction of a preferred embodiment of such an automatic switching mechanism is illustrated in the diagram of FIG. 21 and was earlier described in a previous section.

If the operator were to increase p%" very slowly from any low value to 100%, and the car accelerated fast enough, p%" would also increase very slowly and the difference p%"−p* would never become larger than the specified differential amount mentioned above, and rightly so. The speed with which a power increase is required by the operator is thus important and must be considered. This is accomplished by means of the spring/dash-pot/swith construction shown in FIG. 21 and described in a previous section. When the gas pedal is brusquely released by the operator from a high value of p%", when the acceleration phase is stopped purposedly by the operator, p%"−p* may still be large and in excess of the specified differential amount mentioned above. The dash-pot construction then provides in reverse the slowing down effect required in the decrease rate of p%", so as to allow the difference p%"−p* to become more easily and correctly detectable.

Control System Integration and Functional Block Diagram:

The five basic control system arrangements previously discussed are presented in a form indicating how they may be easily integrated in an overall system, in FIG. 21. The various mechanisms and elements entering into the construction of each control system for each mode of control operation have previously been described and are shown separately and individually. It was earlier mentioned that the operation of a manually-operated system, as initially described, is incompatible with that of a fully automatic system because of the necessity of coordinating the strokes of the two ring actuating mechanisms. This restriction can be removed with the use of actuating mechanisms that require two different levels of servo-fluid pressures, one higher and the other lower, one level for each one of the two ring structures. In such a construction, the positions D1 to D5 of the lever setting $r_{p/m}$ for instance, if one uses only the drive positions as an example, correspond to these two servo-pressure levels as follows: D1 to D3 correspond to three servo-pressure levels in zone I, D4 and D5 correspond to two servo-pressure levels in zone II, of FIG. 9 graph. The five pressure levels are indicated by a tack mark and the identification 1→5 parallel to the ordinate axis. As was previously noted, with such an actuating mechanism construction, to a set servo-pressure level corresponds a quasi-set position of each ring structure, in a manner similar to that which is described in the previous section for automatic control systems. In such an arrangement of the manual control system, the operation thereof becomes fully compatible with and identical to that of a fully automatic control system. This assumption of course implies that the only difference between the manual and automatic adjustments of $r_{p/m}$ resides in the manner by which servo-fluid pressures are adjusted or controlled. This is the basis of the following discussion.

In an overall integrated control system, the manual system represents only an additional control operating option and the actuating mechanisms of the rings respond to a single servo-fluid pressure level, regardless of the manner by which it is generated, be it indirectly by means of the operator adjusting a gear ratio or independently from the operator in response to an engine/vehicle operating-parameter variation. It is self evident that the manual semi-automatic control option is of little interest in an integrated control system. It is not considered in the following. The reader may also wonder whether a manual option added to the various automatic options already available has merit. The answer is none in the case of most operators. However, it constitutes an emergency option that is available to the operator if and when a failure occurs in any of the elements participating in the operation of either one of the automatic control systems.

The overall integrated control system typically thus offers at least four control options to the operator: (1) emergency, or manual, (2) minimum specific fuel consumption, (3) constant vehicle speed, and (4) optimum acceleration. Additional automatic control options may easily be incorporated in such integrated control system. It includes an option-selection master switch under operator's control and having four positions in the present case. To simplify handling by the operator, position D1 may correspond to both manual and automatic options. Shifting from position D1 to any other D-position, automatically causes the control system to remain on manual, or emergency. Conversely, remaining in position D1 and reaching an engine rpm value higher than a set level $N_{em}$ by accelerating the vehicle will automatically switch to minimum specific fuel consumption control and keep that option in force until and unless one of the following actions is taken by the operator: (1) switch to another automatic option, (2) switch the engine off, or (3) shift to D2 or any higher D-position. In the present case, one three-position option-selection knob is required so that the operator can switch either to vehicle constant speed control or to optimum acceleration control, or keep either one of the two other options in force (null position of the knob).

Either one of these four possibilities, by way of selective and programmed electrical signal switching, corresponds to a set position of one master control switch which has four possible positions in the present case. In the first position, the pressurized flow from the servo-fluid supply source is ducted to a five-level pressure regulator. The regulated-pressure servo-flow then is channelled to the ring actuating systems. Each pressure level is adjusted by means of the D-position, imposed by the operator. In the second position of the master control switch, the servo-flow is ducted to speed governor 156' and torque regulator 155, so as to enable the minimum specific fuel consumption control system to take over. In the third position of the master control switch, the servo-flow is ducted to torque regulator 155 and to speed governor 156, so that the vehicle speed control system may then assume control of the power transmission system. The master control switch fourth position again causes the servo-flow to be ducted to speed regulator 156' and to torque regulator 155.

It is now obvious that additional electrical signals must be generated and additional servo-fluid rerouting must be performed concomitantly. Also, set values of rpm, vehicle speed and/or torque as may be applicable must be provided to the controlling elements in charge, from signal lines, be they of an electrical or hydraulic nature. For each one of the three automatic control systems to be integrated together, complete descriptions and discussions were previously given, and are summarized in FIG. 21. It is not deemed necessary to repeat here what these signal and connecting lines are. It should suffice to indicate that the master control switch functions also include those of effectuating such signal generating, switching and rerouting. Thus, each one of the three automatic control positions of the master control switch also causes these additional operational functions to be performed automatically and simultaneously, as earlier indicated.

In conclusion, the basic embodiment of the present invention and its various construction forms herein described provide a hydraulic power transmission system that enables a vehicle operator to optimize the performance of a vehicle equipped therewith, for any one of the three vehicle operation modes of most interest. The end results are: (1) appreciable fuel saving, (2) minimizing driving stress, (3) facilitating vehicle handling, (4) somewhat reducing the production of pollutants, (5) minimizing strain on and wear of some engine and/or vehicle components, (6) helping engine cold starts, (7) minimizing the risks of engine stalling, (8) enhancing engine braking, and (9) facilitating vehicle "rocking" when bogged down in snow, sand, mud, etc. . . . Other advantages in vehicle operation will be evident to readers familiar with the art, but need not be mentioned here. The major advantage being the obvious fuel saving of course. The reduction in pollutant production results mostly from enabling the engine operation to be steadily optimized, especially during city driving.

Therefore, it is thought that the variable speed power-transmitting system and method of the present invention and many of its attendant advantages will be understood from the foregoing description and it will be apparent that various changes may be made in the form, construction and arrangement of the parts thereof without departing from the spirit and scope of the invention or sacrificing any and all of its material advantages, the form hereinbefore described being merely a preferred or examplary embodiment thereof.

Having thus described my invention, I now claim:

1. A power-transmission system for a land vehicle comprising:
    an outer structural body for mounting between a power engine and a power axle for using said power to propel the vehicle;
    an input shaft for connecting an engine power-delivery shaft to the system;
    an output shaft for connecting the system to the power axle;
    a plurality of pistons radially slidable in a first rotor rotating about a first longitudinal axis, said pistons having their axes substantially located in a plane substantially perpendicular to the rotor longitudinal axis of rotation, each piston having a closed end protruding beyond said first rotor outer surface;

means for connecting the input shaft to the first rotor;

a plurality of pistons radially slidable in a second rotor rotating about a second longitudinal axis, said pistons having their axes substantially located in a plane substantially perpendicular to the rotor longitudinal axis of rotation, each piston having a closed end protruding beyond said second rotor outer surface;

means for connecting the output shaft to the second rotor;

a structural wall located between the first rotor and the second rotor and fixed to the outer body, said wall having a trunnion positioned on each one of its two sides for providing support to each one of the two rotors in its rotation thereabout;

a first non-rotatable structural ring slidable along a plane perpendicular to the first longitudinal axis and surrounding the assembly of first rotor and associated pistons, said ring having an inner surface for restraining the piston closed ends and for controlling the radial strokes of said pistons;

a second non-rotatable structural ring slidable along a plane perpendicular to the second longitudinal axis and surrounding the assembly of second rotor and associated pistons, said ring having an inner surface for restraining the piston closed ends and for controlling the radial strokes of said pistons;

a source of hydraulic fluid and associated ducting means located in the wall and the trunnions for enabling the pistons to admit said fluid in and expel said fluid out of rotor radial cavities in which said pistons are housed and radially slide;

automatic valving means located at the rotor/trunnion interfaces on the rotor inner cylindrical surface and on the cooperating cylindrical outer surface of the corresponding trunnion for timely controlling the fluid flow in and out of said piston housing rotor cavities;

means for adjusting the transversal position of each ring in response to a signal representative of the amount of eccentricity to be set between the axis of the ring inner surface and the longitudinal axis of its associated trunnion and of rotation of the associated rotor-piston assembly; and means for insuring permanent contact between the piston closed ends and the inner surface of their associated ring;

whereby fluid is admitted in the piston housing cavities of the first rotor during one half of each one of its revolutions and then pumped out therefrom under high pressure during the other half thereof as the first rotor rotates (pump), and whereby the fluid pumped out of the first rotor cavities is then forced inside the piston housing cavities of the second rotor (motor) and then expelled out therefrom under low pressure as the second rotor pistons are urged to respond to the inwardly directed driving action exerted by their associated off-centered ring inner surface, thus causing the first rotor pistons to exert side forces on the walls of their housing cavities during their inwardly-directed radial stroke and said side forces cooperating to generate a rotational-motion resisting torque applied onto the input shaft, and conversely causing the second rotor pistons to exert side forces on the walls of their housing cavities during their outwardly-directed radial stroke and said forces cooperating to generate a rotational-motion driving torque applied onto the output shaft for transmitting the power received by the input shaft.

2. The system according to claim 1 wherein the volume of fluid pumped under pressure out of the first rotor cavities is substantially equal to the volume of fluid forced into the second rotor cavities, whereby the product of rotational speed by torque for the input shaft (engine power) always remains substantially equal to the corresponding product for the output shaft (propulsive power required by the vehicle), said system further comprising:

a low pressure boost pump for supplying fluid to the first rotor piston cavities; and a fluid sump for holding said fluid.

3. The system according to claim 2 wherein the fluid admitted into the piston-housing cavities of the first rotor as supplied by the boost pump under low pressure urges said pistons outwardly, said system further comprising:

a coiled compression spring mounted inside each piston for further enabling said piston to constantly push against its associated ring inner surface and maintain contact therewith; and means for preventing the spring coils from contacting the internal surface of the piston;

whereby the fluid boost pressure, the spring force and the centrifugal force exerted on the piston as the rotor rotates all cooperate to insure a complete stroke of the piston within the limiting boundaries imposed by the ring structure position.

4. The system according to claim 1 wherein the ratios between the torques and rotational speeds of the input and output shafts are substantially determined by the ratio of the distances separating the ring inner surface axes from the corresponding longitudinal axes, said distances defining the ring transversal displacement, or eccentricity, and the associated rotor piston strokes, thus the volume of fluid displaced during each rotor revolution, and wherein the signal setting the amount of such eccentricity of each ring is represented by the pressure level of a servo-fluid flow which adjusts the position of a ring actuating mechanism which further comprises:

a set of hydraulic piston-cylinder and associated rod for attachment to the ring structure, for responding to the servo-fluid pressure; and means for adjusting the servo-fluid pressure level in response to a signal representative of an engine/vehicle operation parameter selected to control said operation.

5. The system according to claim 4 wherein the construction of the attachment of the hydraulic piston/cylinder rod to the ring structure includes means for providing a complying articulation that allows small angular and side relative motions between the rod and the ring, whereby construction and assembling misalignments are prevented from creating side loads on either part.

6. The system according to claim 5 wherein two sets of two actuating piston-cylinder and rod assemblies are symmetrically installed in opposition and hydraulically interconnected in a manner such that opposing sets are enabled to cooperate so as to insure that a determined ring transversal position corresponds to a set level of the servo-fluid pressure, and further including:

means for ducting the servo-fluid to the cylinders asymmetrically with respect to a vertical plane of symmetry perpendicular to the ring transversal travel path and symmetrically with respect to a horizontal plane of symmetry containing both the longitudinal and transversal axes; and means for identically adjusting the pressure differential existing across the pistons in each one of the two cylinders of one set of piston-cylinder assemblies located on the same side of the vertical plane of symmetry;

whereby the resultant sum of the forces exerted by the four piston rods on the associated ring is applied in the horizontal plane of symmetry and in direct opposition to the resultant sum of the forces exerted by the rotor pistons on the ring inner surface, thereby substantially preventing the application of side forces and torques on the ring structure.

7. The system according to claim 5 wherein one set of actuating pistons and associated rods is located on one side of the ring and the actuating forces developed thereby are opposed by forces developed by compression springs and ring reactions to its associated rotor pistons in a manner such that all such forces are caused to remain automatically balanced, and further including:

means for ducting the servo-fluid to each cylinder; and means for identically and symmetrically adjusting the pressure levels existing in each cylinder and thus the actuating forces developed by the pistons therein;

whereby all ring-actuating forces are solely applied in the direction of the ring transversal displacement and a determined ring transversal position corresponds to a set level of the servo-fluid pressure.

8. The system according to claim 7 wherein a positioning pilot valve located in each ring actuating mechanism piston provides a means for imposing a set fixed position onto said piston, hence a set ring transversal displacement, and said system further comprising:

means for supplying servo-fluid flow under pressure to the pilot valve;

means for positioning the valve along the piston axis at a set position with respect to the piston cylinder; and means for coordinating the setting of each pilot valve position in response to vehicle operator input;

whereby the position of each valve, hence of its associated ring, determines the ratio between the input and output shaft rotational speeds and the equivalent of a gear ratio of the system operation.

9. The system according to claim 4 wherein each ring is enabled to occupy any eccentric position between both ends of its stroke and thus to adjust the fluid volumetric flow delivered by the first rotor and received by the second rotor in an infinitely variable manner, so that the ratio of the rotational speeds of both rotors, hence of the input and output shafts, is rendered infinitely variable and is substantially equal to the ratio of the eccentric displacements of the first ring and of the second ring, when the first piston-rotor and the second piston-rotor assemblies are identical, said system further including:

means for adjusting the eccentric displacements of each ring so as to define a set overall rotational speed ratio (gearing ratio) for the power-transmission system; and means for automatically adjusting each ring position to cause each ring displacement to contribute a set amount to the determination of said overall gearing ratio.

10. The system according to claim 9 wherein the engine/vehicle operation parameters of interest for adjusting and maintaining a system gearing ratio value that allows a selected engine/vehicle operation to become and remain optimized are: (1) engine torque, (2) engine rpm, and (3) power axle rpm, whereby a set combination of specified ones of said parameters is required for an operator-selected mode of engine/vehicle operation, said system further comprising:

an engine torque regulator for continuously sensing the level of said torque and generating a signal indicative of whether any set value thereof is being reached and exceeded; and a shaft speed governor for continuously sensing the rpm level of said shaft speed and generating a signal indicative of whether any set value thereof is being reached and exceeded;

whereby, in the most general application of the system for which all three parameters are used, a torque regulator and a speed governor are mounted on the input shaft, and a speed governor is mounted on the output shaft, thereby providing means for controlling said selected engine/vehicle operation mode.

11. The system according to claim 10 wherein said torque regulator comprises:

means for detecting and transforming the differential angular position between the engine power-delivery shaft and the input shaft into a linear displacement of an actuating stem along a fixed axis;

means for adjusting the actuating function of said stem displacement so as to adjust the torque level at which torque control becomes effective; and means for causing servo-fluid pressure to be controlled by means of the direct action of said adjusted stem displacement;

whereby a hydraulic servo-pressure signal is generated so as to enable the engine torque to act as a controlling parameter of the engine operation.

12. The system according to claim 10 wherein the speed governor comprises:

means for automatically transforming variations of the angular speed of the shaft on which it is mounted into variations of area of a first variable size restricting orifice, said orifice being mounted in series with a second restricting orifice of adjustable size, said variable area and said angular speed varying inversely with respect to one another;

means for adjusting the area of the second orifice; and means for utilizing the servo-fluid pressure existing between said orifices to position the ring actuating mechanisms;

whereby a variation of regulated shaft angular speed causes a concomitant variation in area of the first orifice and a concomitant variation of the servo-fluid pressure which causes the system gearing ratio to adjust in a manner such that the shaft angular speed is caused to adjust, thus creating an automatic regulating action on the shaft angular speed, and whereby an adjustment of the area of the second orifice provides a means for setting the angular speed value at which said shaft speed is to be automatically regulated.

13. The system according to claim 12 wherein the speed governor, when mounted on one single shaft, further includes:
- means for simultaneously detecting a plurality of shaft rotational speed levels; and
- means for simultaneously generating a plurality of corresponding servo-fluid pressures, one pressure level for each one of the speed levels being detected;
- whereby one speed governor is enabled to simultaneously control a plurality of engine operation parameters and levels thereof, said parameters requiring to be set and controlled at different shaft rpm levels.

14. The system according to claim 13 wherein a torque regulator is mounted on the input shaft, a speed governor is mounted on the input and the output shafts, and further comprising:
- a complying linkage having a variable and adjustable length mounted between the gas pedal and a fuel-metering delivery system for temporarily biasing the gas pedal command;
- a rate-sensing linkage for detecting fast variations of gas pedal position which correspond to rapid increases in fuel delivery rates, said sensor automatically switching an acceleration control system on when the gas pedal position rate-of-change exceeds a set value;
- a programmed element establishing a relationship between engine rpm and torque for any set value of fuel delivery rate for setting two values, one at which engine rpm is to be maintained and the other one at which engine torque is to be regulated at any and all times during a vehicle acceleration, a first servo-fluid pressure being thereby generated by the speed governor for monitoring the complying linkage length and thus the fuel delivery rate to the engine, a second servo-fluid pressure being also thereby generated by the torque regulator for monitoring the acutating mechanisms of the rings and thus the system overall gearing ratio;
- a dash-pot and one-way linkage located at the end of a gas pedal command rod and attached to a fixed structure for preventing rapid rates of decrease of the fuel flow delivered to the engine, during a vehicle acceleration whenever the operator releases the gas pedal in a brusque manner;
- a master switch for enabling a system operator to select an arrangement combination of said control members and components so as to selectively form a control system for a specific engine/vehicle operation mode; and
- a plurality of interconnected servo-fluid lines and associated hydraulic switches, of electrical signal lines and associated switches, and of mechanical linkage couplings for enabling the master switch to formulate the operator selection;
- whereby the operator is enabled to choose between five of the most common modes of operating a vehicle when equipped with said system: all manual control, minimum specific fuel consumption control, constant vehicle speed control, optimum vehicle acceleration control, and operator-monitored vehicle acceleration combined with minimum specific fuel consumption control, by means of a single selection knob.

15. The system according to claim 10 wherein the vehicle operator is enabled to select one of several modes of operation of the engine/vehicle, each operation mode corresponding to a type of performance which the engine/vehicle is caused to automatically provide regardless of extraneous conditions under which the engine/vehicle is at times caused to operate, and further comprising:
- means for selecting one set operation mode;
- means for automatically shifting from one operation mode to another operation mode when said extraneous conditions are changed by the operator; and
- means for automatically adjusting other engine/vehicle operation parameters such as fuel delivery rate to the engine and variation rates thereof in response to changes in engine and vehicle operations;
- whereby conflicting commands to the engine and the vehicle are prevented from taking effect, and switching of all servo-fluid connections and energizing electrical signals are caused to become effective simultaneously when a shift of operation mode is caused to take place.

16. The system according to claim 15 wherein the servo-fluid signals generated by the torque regulator and the speed governor, both mounted on the input shaft, are both utilized so as to maintain a set relationship between engine rpm and engine torque as a function of fuel delivery rate (gas pedal position), whereby the engine is automatically caused to operate constantly and continuously at its peak efficiency (minimum specific fuel consumption) regardless of extraneous variations in external conditions of the vehicle operation, said system further including:
- means for setting engine rpm and torque values at which the engine is to keep operating for a set position of the gas pedal;
- means for comparing said set values to actual instantaneous values sensed by the regulator and the governor;
- means for generating servo-fluid pressures as a result of said comparison; and
- means for causing said servo-fluid pressures to adjust the transversal displacements of the rings so as to concomitantly adjust the system overall gearing ratio;
- whereby an optimum relationship between the three engine operating parameters (instantaneous fuel consumption or engine load, torque and rpm) is continuously maintained by controlling engine torque and rpm in a manner such that they both remain at set values imposed by the engine power level demanded by the operator.

17. The system according to claim 10 wherein the overall gearing ratio is constantly and continuously being adjusted so as to insure that the vehicle maintains a predetermined constant vehicle velocity regardless of variations in external vehicle operating conditions such as road grade and wind speed/direction, said system further comprising:
- means for setting the vehicle velocity at a value which the vehicle is to maintain by adjusting the position of a gas pedal;
- means for locking the gas pedal in the position which yields the desired vehicle velocity;
- means for activating a complying linkage between the locked gas pedal and a fuel-metering delivery system, said complying linkage having a variable and adjustable length for causing the fuel delivery rate to remain adjustable;

a speed governor mounted on the output shaft for regulating the power axle rotational speed, hence the vehicle velocity at a set value defined at the time the gas pedal is locked in place;

a torque regulator mounted on the input shaft for regulating the engine torque at a set value determined by the gas pedal locked position;

means for connecting a servo-fluid pressure line between the speed governor and the ring actuating mechanisms to enable said pressure to adjust the system overall gearing ratio; and means for connecting a servo-fluid pressure line between the torque regulator and the complying linkage so as to adjust the fuel delivery rate to the engine in order to insure that the power delivered by the engine corresponds to the power required by the vehicle to maintain its velocity at the constant set value, in a continuous and automatic manner;

whereby the adjustments in engine power required are controlled by variations in engine torque caused in turn by variations of vehicle velocity away from the set regulated value, and adjustments in overall gearing ratio result directly from variations in vehicle velocity around the set value at which said velocity is to be regulated.

18. The system according to claim 10 wherein the overall gearing ratio, the engine rpm and torque and the fuel delivery rate are continuously automatically adjusted during vehicle accelerations so as to optimize vehicle acceleration rates whilst minimizing fuel consumption, and wherein the input-shaft-mounted torque regulator and speed governor are both used for adjusting the servo-fluid pressure which causes the fuel delivery rate to vary in a programmed manner as a function of engine rpm and torque, and the gearing ratio, said system further including:

a complying linkage having a variable and adjustable length mounted between the gas pedal and a fuel-metering delivery system for temporarily biasing the gas pedal command;

a rate-of-change sensor for detecting fast variations of gas pedal position which correspond to rapid increases in fuel delivery rates, said sensor automatically switching the acceleration control system on when the gas pedal position rate-of-change exceeds a set value;

a programmed element establishing a relationship between engine rpm and torque for any set value of fuel delivery rate for setting two values, one at which engine rpm is to be maintained and the other one at which engine torque is to be regulated at any and all times during the vehicle acceleration, a first servo-fluid pressure being thereby generated by the speed governor for monitoring the complying linkage length and thus the fuel delivery rate to the engine, a second servo-fluid pressure being also thereby generated by the torque regulator for monitoring the actuating mechanisms of the rings and thus the system overall gearing ratio; and a dash-pot and one-way linkage located at the end of the gas pedal command rod and attached to a fixed structure for preventing rapid rates of decrease of the fuel flow delivered to the engine, during said vehicle acceleration whenever the operator brusquely releases the gas pedal;

whereby the fuel delivery rate and the overall gearing ratio are being continuously adjusted as the vehicle accelerates in a manner such that the engine delivers the maximum power which it is capable of delivering at the instantaneous biased fuel delivery rate that it is then receiving, thereby enabling the vehicle to optimally accelerate so as to prevent excessive fuel waste.

19. The system according to claim 9 wherein each ring position is monitored so that the motor ring is constantly and continuously adjusted at its largest stroke compatible with an imposed system overall gearing ratio whilst the pump ring is caused to adjust its stroke up and down accordingly, and further comprising:

means for automatically switching the servo-fluid pressure from one ring actuating mechanism to the other ring actuating mechanism whenever either ring mechanism reaches a maximum-stroke position; and means for automatically causing the pump ring to preferentially adjust its stroke downward whenever the motor ring is at a maximum-stroke position;

whereby the contributions from the pump and the motor rings to the determination of the system overall gearing ratio are simultaneously adjusted in a manner such that the motor ring is always in a position for which the motor efficiency remains high at all engine/vehicle regimes and for all operation modes, the pump efficiency being much less sensitive to its ring position.

20. The system according to claim 1 wherein each piston closed end is fitted with an articulated slip pad for slidable motion against and along the ring inner surface, and further including:

means for channelling fluid between the pad sliding surface and the ring inner surface so as to prevent sliding contact between said two surfaces during their relative sliding motion; and means for lubricating the piston-pad articulation.

21. The system according to claim 20 wherein the slip pad sliding surface is provided with two shallow cavities, each cavity being located symmetrically with respect to the pad plane of symmetry in which the pad articulation axis lies, and further including:

means for causing the hydraulic pressure in each cavity to vary inversely with the mean distance separating the pad sliding surface around said cavity from the ring inner surface; and means for automatically preventing the pressure variations in one cavity from substantially directly affecting the pressure existing in the other cavity;

whereby the tilting of the slip pad caused by the reactive forces exerted between the pistons and the ring is automatically regulated by means of said hydraulic pressures, thereby automatically preventing solid contact between the slip pad and the ring inner surface for all radial positions of the piston at all eccentric positions of the ring.

22. The system according to claim 1 wherein means is provided for connecting each one shaft to its associated rotor so as to provide a degree of positioning compliance, such that the rotor is free to center itself on and about its associated trunnion during its rotation thereabout.

23. The system according to claim 1 wherein each structural ring is guided between and restrained by opposite walls of the outer body, and further including:

a set of two linear needle bearings each one located between two facing flat tracks located on said wall inner surface and on a flat cooperating structure extension of the ring structure; and means for preventing lateral movement of the ring structure.

24. The system according to claim 1 wherein means is provided for enabling the longitudinal axis of the second ring structure to move in its transversal motion on either side of the rotor axis of rotation, whereby the second rotor/piston assembly is caused to rotate in one direction when said ring axis is positioned on the one side of the rotor axis of rotation and to rotate in the opposite direction when the ring axis is positioned on the other side of the rotor axis, thereby providing means for reversing the rotation direction of the output shaft for a given set rotation direction of the input shaft by causing the second ring to invert its transversal displacement with respect to the output shaft axis fixed position.

25. The system according to claim 1 wherein a fluid-flow inverting valve is provided between the first rotor (pump) valving means and the second rotor valving means, said valve including:

means for simultaneously inverting the fluid ducting connections between fluid inlet and outlet valving means of the second rotor (motor);

means for simultaneously enabling the inverted motor valving means to be connected to the pump outlet and to the motor outlet;

and means for actuating said valve;

whereby both input and output shafts rotate in the same direction (forward vehicle speed) when said valve is in one first position, and the input and the output shafts rotate in inverse directions (reverse vehicle speed) when said valve is in one second position for which the admission of high pressure fluid to the motor and the exit of low pressure fluid out of the motor have exchanged positions as compared to those which they occupy when the valve is in the first position.

26. The system according to claim 1 wherein the automatic valving means for timely controlling the fluid flow in and out of the piston-housing cavities in both rotors comprises:

a plurality of short circular ducts, one duct extending from each one of the piston-housing cavities up to the rotor inner cylindrical surface and forming a cavity port opening therewith;

two shallow cavities extending along the circumference of the trunnion outer cylindrical surface for registering with the cavity port openings, adjacent ends of the shallow cavities being separated by a land on the trunnion outer surface having a width slightly larger than the diameter of the duct port opening, so as to prevent communication between the two shallow cavities for any relative angular position of either rotor with respect to its trunnion, the lands being centered about the transversal axis along which the ring transversal displacements take place; and means for connecting each shallow cavity to hydraulic fluid inlet and outlet ducts located in and between the trunnions;

whereby the lands and the portions of rotor inner cylindrical surface act as sliding gate valves during the rotor angular motion between the in-flowing and the out-flowing fluids, thereby automatically performing the needed valving function.

* * * * *